(12) United States Patent
Saphier et al.

(10) Patent No.: US 12,527,651 B2
(45) Date of Patent: Jan. 20, 2026

(54) REAL-TIME BITE ARTICULATION

(71) Applicant: ALIGN TECHNOLOGY, INC., San Jose, CA (US)

(72) Inventors: Ofer Saphier, Rehovot (IL); Avi Kopelman, Palo Alto, CA (US); Moti Ben Dov, Tel Mond (IL); Ran Katz, Hod Hasharon (IL); Shai Farkash, Hod Hasharon (IL); Roy Fahn, Petach Tikva (IL); Michael Chang, Zurich (CH); Niko Benjamin Huber, Zug (CH); Eric P. Meyer, Zurich (CH); Gustavo Ismael, Mainz (DE); Zelko Relic, Pleasanton, CA (US); Maik Gerth, Hessen (DE)

(73) Assignee: Align Technology, Inc., San Jose, CA (US)

( * ) Notice: Subject to any disclaimer, the term of this patent is extended or adjusted under 35 U.S.C. 154(b) by 256 days.

(21) Appl. No.: 18/360,161

(22) Filed: Jul. 27, 2023

(65) Prior Publication Data
US 2024/0033057 A1 Feb. 1, 2024

Related U.S. Application Data

(60) Provisional application No. 63/370,065, filed on Aug. 1, 2022.

(51) Int. Cl.
*A61C 9/00* (2006.01)
(52) U.S. Cl.
CPC .................. *A61C 9/0053* (2013.01)

(58) Field of Classification Search
CPC ......... A61C 19/04; A61C 19/08; A61C 7/002; A61C 7/18; A61C 2007/004
USPC .......................................................... 433/24
See application file for complete search history.

(56) References Cited

U.S. PATENT DOCUMENTS

| | | | |
|---|---|---|---|
| 6,099,314 A | 8/2000 | Kopelman et al. |
| 6,334,772 B1 | 1/2002 | Taub et al. |
| 6,334,853 B1 | 1/2002 | Kopelman et al. |
| 6,463,344 B1 | 10/2002 | Pavlovskaia et al. |
| 6,542,249 B1 | 4/2003 | Kofman et al. |
| 6,633,789 B1 | 10/2003 | Nikolskiy et al. |

(Continued)

*Primary Examiner* — Sunil K Singh
(74) *Attorney, Agent, or Firm* — FisherBroyles, LLP

(57) ABSTRACT

A method may include obtaining a first 3D model of an upper jaw of a patient using an intraoral scanner and obtaining a second 3D model of the lower jaw of the patient using the intraoral scanner. The method may also include capturing a series of 2D images of the upper and lower jaws of the patient as the patient is moves the upper jaw and lower jaw in dynamic occlusion and processing the captured series of 2D images to identify features associated with the upper jaw of the patient and the lower jaw of the patient. For each 2D image in the captured series of 2D images, the method may include identifying a relative position of the first 3D model and the second 3D model based on alignment of features in the first 3D model and second 3D model with the features identified in the 2D image to generate a series of relative positions of the first 3D model and the second 3D model. The method may also include modeling dynamic occlusion of the upper jaw and the lower jaw of the patient based on the series of relative positions of the first 3D model and the second 3D model.

19 Claims, 28 Drawing Sheets

(56) References Cited

U.S. PATENT DOCUMENTS

| | | |
|---|---|---|
| 6,664,986 B1 | 12/2003 | Kopelman et al. |
| 6,697,164 B1 | 2/2004 | Babayoff et al. |
| 6,845,175 B2 | 1/2005 | Kopelman et al. |
| 6,979,196 B2 | 12/2005 | Nikolskiy et al. |
| 7,030,383 B2 | 4/2006 | Babayoff et al. |
| 7,202,466 B2 | 4/2007 | Babayoff et al. |
| 7,255,558 B2 | 8/2007 | Babayoff et al. |
| 7,286,954 B2 | 10/2007 | Kopelman et al. |
| 7,319,529 B2 | 1/2008 | Babayoff |
| 7,373,286 B2 | 5/2008 | Nikolskiy et al. |
| 7,507,088 B2 | 3/2009 | Taub et al. |
| 7,545,372 B2 | 6/2009 | Kopelman et al. |
| 7,698,068 B2 | 4/2010 | Babayoff |
| 7,916,911 B2 | 3/2011 | Kaza et al. |
| 8,108,189 B2 | 1/2012 | Chelnokov et al. |
| 8,244,028 B2 | 8/2012 | Kuo et al. |
| 8,587,582 B2 | 11/2013 | Matov et al. |
| 8,948,482 B2 | 2/2015 | Levin |
| 8,998,608 B2 * | 4/2015 | Imgrund ................ A61C 19/04 433/24 |
| D742,518 S | 11/2015 | Barak et al. |
| 9,192,305 B2 | 11/2015 | Levin |
| 9,261,356 B2 | 2/2016 | Lampert et al. |
| 9,261,358 B2 | 2/2016 | Atiya et al. |
| 9,299,192 B2 | 3/2016 | Kopelman |
| D760,901 S | 7/2016 | Barak et al. |
| 9,393,087 B2 | 7/2016 | Moalem |
| 9,408,679 B2 | 8/2016 | Kopelman |
| 9,431,887 B2 | 8/2016 | Boltanski |
| 9,439,568 B2 | 9/2016 | Atiya et al. |
| 9,451,873 B1 | 9/2016 | Kopelman et al. |
| D768,861 S | 10/2016 | Barak et al. |
| D771,817 S | 11/2016 | Barak et al. |
| 9,491,863 B2 | 11/2016 | Boltanski |
| D774,193 S | 12/2016 | Makmel et al. |
| 9,510,757 B2 | 12/2016 | Kopelman et al. |
| 9,660,418 B2 | 5/2017 | Atiya et al. |
| 9,668,829 B2 | 6/2017 | Kopelman |
| 9,675,430 B2 | 6/2017 | Verker et al. |
| 9,693,839 B2 | 7/2017 | Atiya et al. |
| 9,717,402 B2 | 8/2017 | Lampert et al. |
| 9,724,177 B2 | 8/2017 | Levin |
| 9,844,426 B2 | 12/2017 | Atiya et al. |
| 10,076,389 B2 | 9/2018 | Wu et al. |
| 10,098,714 B2 | 10/2018 | Kuo |
| 10,108,269 B2 | 10/2018 | Sabina et al. |
| 10,111,581 B2 | 10/2018 | Makmel |
| 10,111,714 B2 | 10/2018 | Kopelman et al. |
| 10,123,706 B2 | 11/2018 | Elbaz et al. |
| 10,136,972 B2 | 11/2018 | Sabina et al. |
| 10,380,212 B2 | 8/2019 | Elbaz et al. |
| 10,390,913 B2 | 8/2019 | Sabina et al. |
| 10,453,269 B2 | 10/2019 | Furst |
| 10,456,043 B2 | 10/2019 | Atiya et al. |
| 10,499,793 B2 | 12/2019 | Ozerov et al. |
| 10,504,386 B2 | 12/2019 | Levin et al. |
| 10,507,087 B2 | 12/2019 | Elbaz et al. |
| 10,517,482 B2 | 12/2019 | Sato et al. |
| 10,695,150 B2 | 6/2020 | Kopelman et al. |
| 10,708,574 B2 | 7/2020 | Furst et al. |
| 10,772,506 B2 | 9/2020 | Atiya et al. |
| 10,813,727 B2 | 10/2020 | Sabina et al. |
| 10,888,399 B2 | 1/2021 | Kopelman et al. |
| 10,952,816 B2 | 3/2021 | Kopelman |
| 10,980,613 B2 | 4/2021 | Shanjani et al. |
| 11,013,581 B2 | 5/2021 | Sabina et al. |
| D925,739 S | 7/2021 | Shalev et al. |
| 11,096,765 B2 | 8/2021 | Atiya et al. |
| 11,238,586 B2 | 2/2022 | Minchenkov et al. |
| 11,367,192 B2 | 6/2022 | Kopelman et al. |
| 11,455,727 B2 | 9/2022 | Minchenkov et al. |
| 11,478,132 B2 | 10/2022 | Kopelman et al. |
| 11,563,929 B2 | 1/2023 | Saphier et al. |
| 11,633,268 B2 | 4/2023 | Moalem et al. |
| 11,707,238 B2 | 7/2023 | Moshe et al. |
| RE49,605 E | 8/2023 | Kopelman |
| 11,744,681 B2 | 9/2023 | Kopelman et al. |
| 11,759,277 B2 | 9/2023 | Shalev et al. |
| 11,759,295 B2 * | 9/2023 | Sabina ................ A61B 6/512 348/66 |
| 12,251,281 B2 * | 3/2025 | Wood ................ G06T 17/00 |
| 2013/0218530 A1 | 8/2013 | Deichmann et al. |
| 2018/0263731 A1 * | 9/2018 | Pokotilov ............ G16H 20/40 |
| 2019/0388193 A1 | 12/2019 | Saphier et al. |
| 2020/0268495 A1 | 8/2020 | Ryakhovsky et al. |
| 2021/0059796 A1 | 3/2021 | Weiss et al. |
| 2021/0121049 A1 | 4/2021 | Rudnitsky et al. |
| 2021/0128281 A1 | 5/2021 | Peleg |
| 2021/0137653 A1 | 5/2021 | Saphier et al. |
| 2021/0196152 A1 | 7/2021 | Saphier et al. |
| 2021/0244502 A1 | 8/2021 | Farkash et al. |
| 2023/0181295 A1 * | 6/2023 | Pesach ................ A61C 9/0053 382/128 |
| 2023/0225839 A1 * | 7/2023 | Li ................ A61C 19/045 433/213 |

* cited by examiner

REAL-TIME BITE ARTICULATION

RELATED APPLICATIONS

This application claims the benefit under 35 U.S.C. § 119(e) of U.S. Provisional Patent Application No. 63/370,065, filed Aug. 1, 2022, and titled "REAL-TIME BITE ARTICULATION WITH 2D IMAGES," which is incorporated, in its entirety, by this reference.

BACKGROUND

Creating a virtual bite articulation model using three-dimensional models of a patient's dentition generated with intraoral scanners is less than ideal for a number of reasons. During the process of digitally aligning an upper jaw with a lower jaw, a 3D scan of a small portion of a patient's jaws in occlusion may be used to determine the patient's bite in occlusion. However, such practices result in inaccuracies that negatively impact the quality of the determined bite and associated articulation. For example, patients often bite their teeth during scanning operations in a way that is unnatural and not in their normal bite position. The intraoral scanner may also interfere with the patient's natural and normal bite by imparting forces on the cheek, jaws, and/or mouth. The scanning of a small portion of the patient's jaws may also result in a lack of scan data for accurately aligning the upper and lower jaws. Patients often also bite with forces high enough to cause their teeth to move from their open bite position which may also result in difficulty and accurately aligning the upper and lower jaws.

Scans of the patient's jaw may also include errors. The scanning of only a small portion of the jaws also may not account for scan errors, such as accumulated scan errors when building 3D models of the patient's jaw. For example, the absolute position of teeth on the right side of the jaw and the left side of the jaw may be different due to accumulated scan error during the scanning process. Such accumulated errors may approach 0.5 mm.

SUMMARY

Accordingly, as will be described in greater detail below, the present disclosure describes various systems and methods for generating bite articulation with a combination of three-dimensional and two-dimensional imaging techniques. The systems and methods disclosed herein may be used to generate an accurate real-time bite articulation model of a patient's dentition.

In addition, the systems and methods described herein may improve the functioning of a computing device and related systems by reducing computing resources and overhead for acquiring scan data and generating three-dimensional bite articulation models of the patient's dentition, thereby improving processing efficiency of the computing device over conventional approaches. These systems and methods may also improve the field of dental treatment, including prosthodontics and orthodontics, by analyzing data and carrying out methods that lead to more efficient use of dental resources and more accurate bite articulation models.

INCORPORATION BY REFERENCE

All patents, applications, and publications referred to and identified herein are hereby incorporated by reference in their entirety and shall be considered fully incorporated by reference even though referred to elsewhere in the application.

BRIEF DESCRIPTION OF THE DRAWINGS

A better understanding of the features, advantages and principles of the present disclosure will be obtained by reference to the following detailed description that sets forth illustrative embodiments, and the accompanying drawings of which.

DETAILED DESCRIPTION

The following detailed description and figures provide a better understanding of the features and advantages of the inventions described in the present disclosure in accordance with the embodiments disclosed herein. Although the detailed description and figures include many specific embodiments, these are provided by way of example only and should not be construed as limiting the scope of the inventions disclosed herein.

Figure 1:
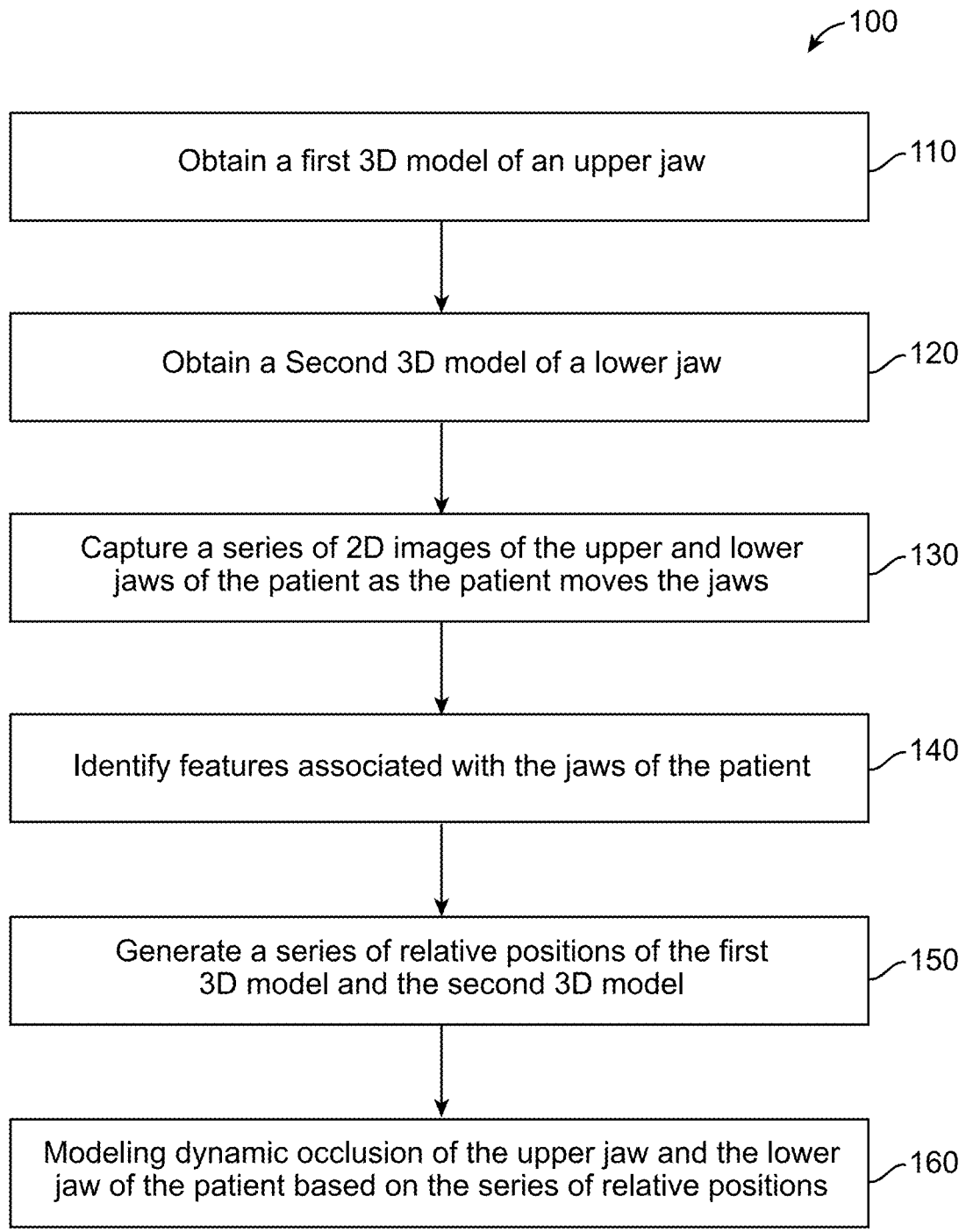
FIG. 1 shows a flow diagram for generating a dynamic occlusion model of a patient's dentition, in accordance with some embodiments.

As shown in FIG. 1, an embodiment of a method 100 for generating a dynamic occlusion model of a patient's dentition is shown to include obtaining a first 3D model of an upper jaw of a patient at block 110, obtaining a second 3D model of a lower jaw of a patient at block 120, capturing a series of 2D images of the upper and lower jaws of the patient as the patient moves its jaws in dynamic occlusion at block 130, identifying surface features associated with the jaws of the patient at block 140, generating a series of relative positions of the first 3D model and the second 3D model based on the identified surface features in the three-dimensional models and the 2D images at block 150, and modeling a dynamic occlusion of the upper jaw and the lower jaw of the patient based on the series of relative positions at block 160.

Figure 2:
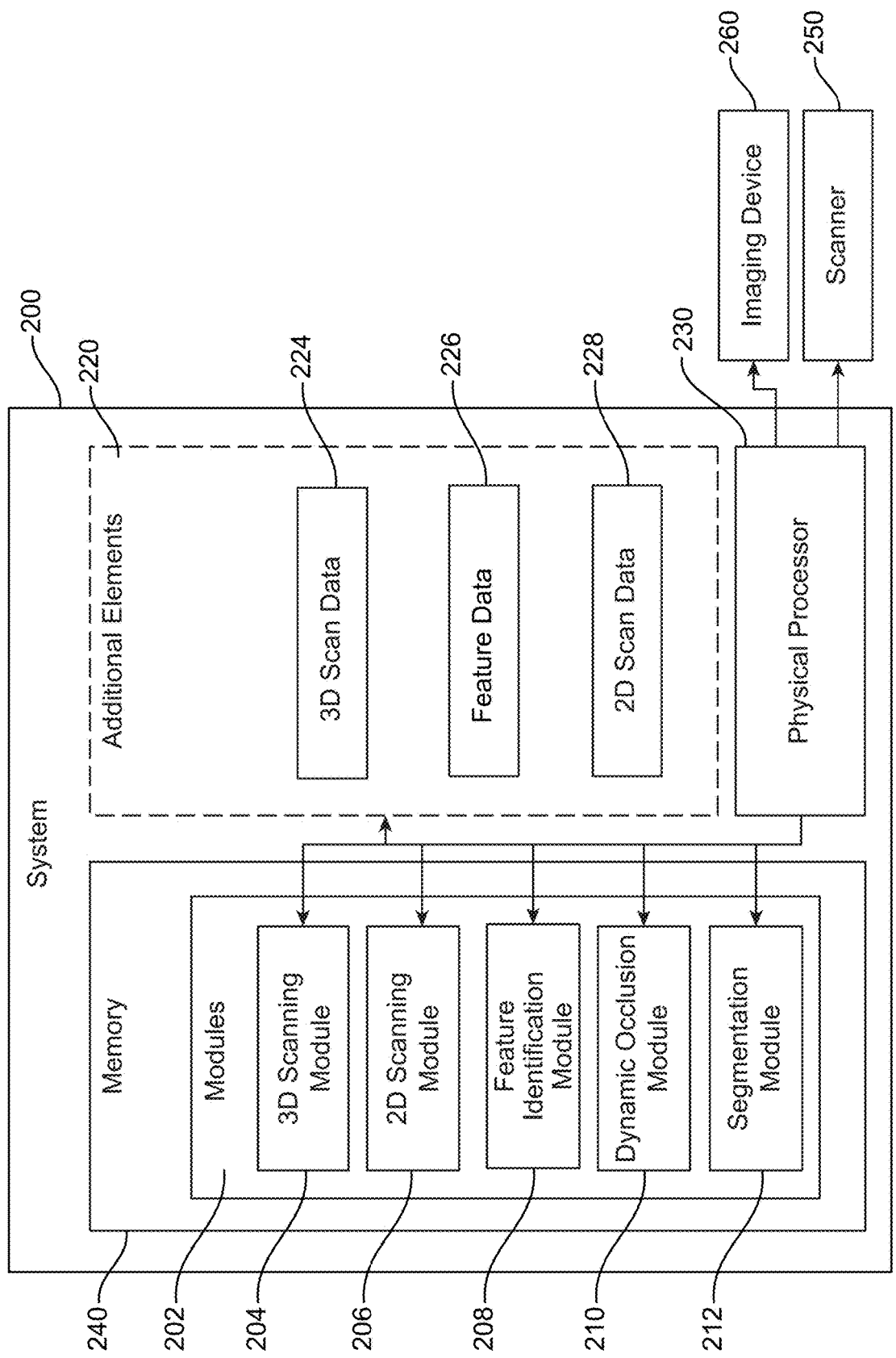
FIG. 2 shows a block diagram of an example system for generating a dynamic occlusion model of a patient's dentition, in accordance with some embodiments.
Figure 12:
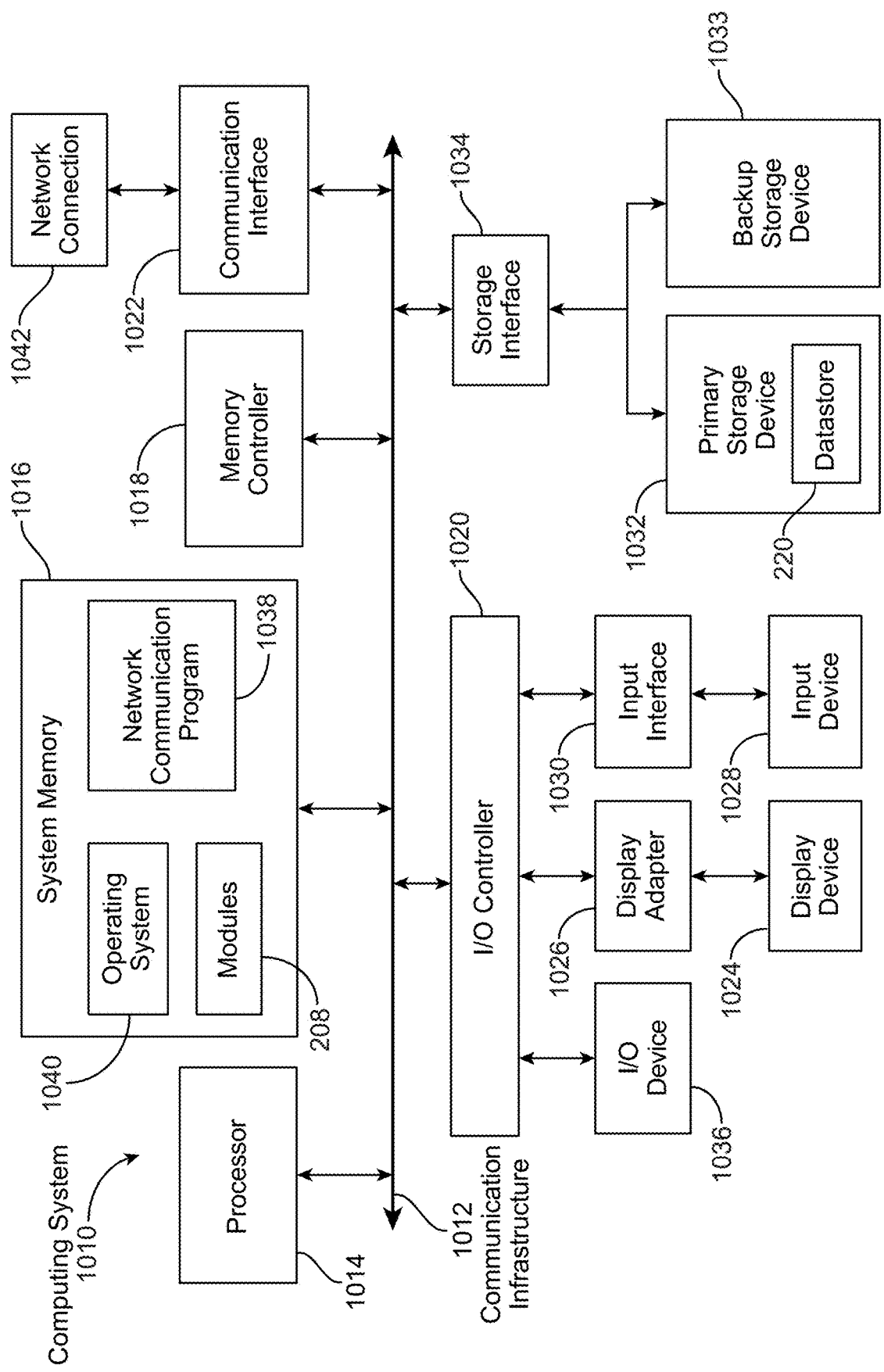
FIG. 12 shows a block diagram of an example computing system capable of implementing one or more embodiments described and/or illustrated herein, in accordance with some embodiments.
Figure 13:
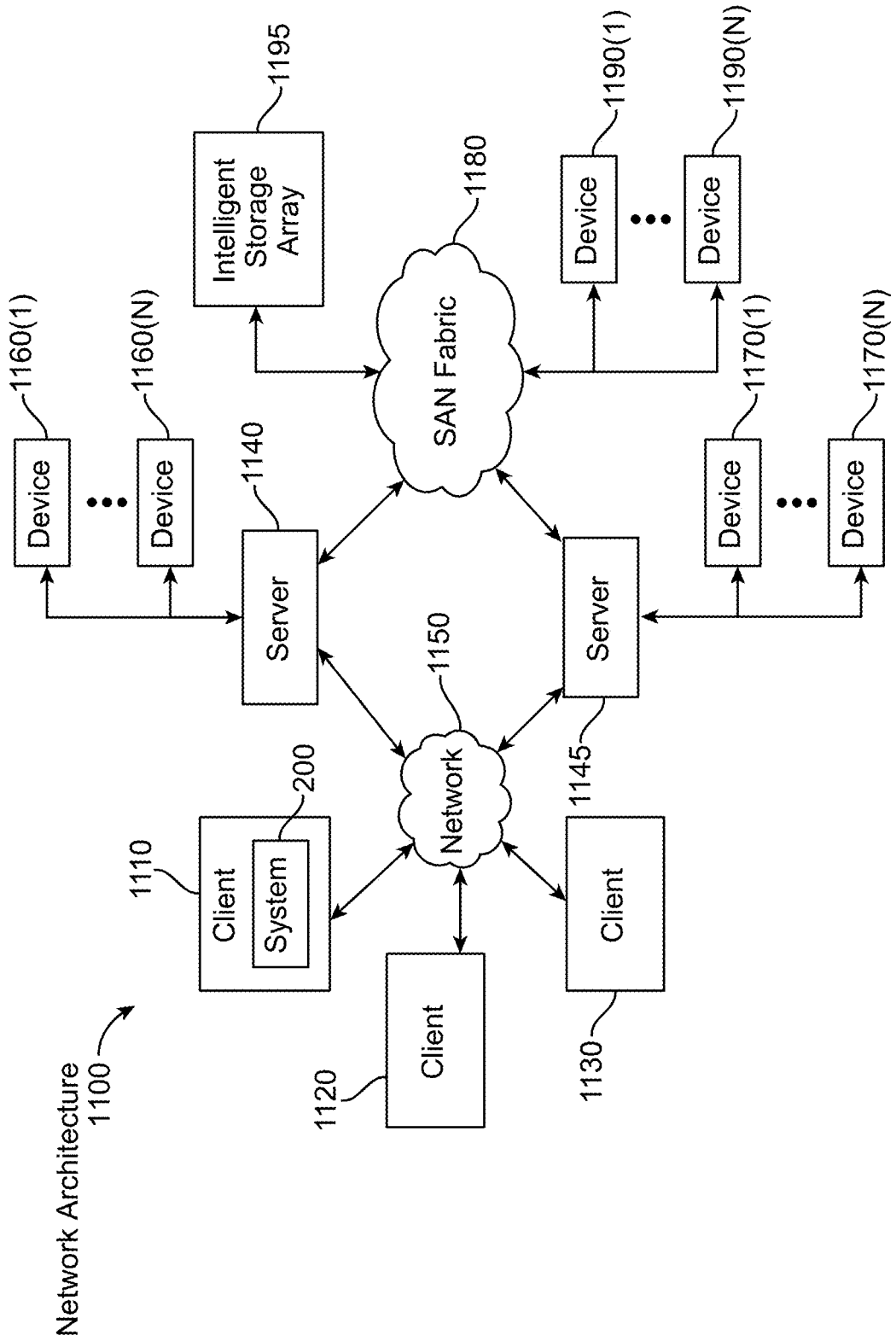
FIG. 13 shows a block diagram of an example computing network capable of implementing one or more of the embodiments described and/or illustrated herein, in accordance with some embodiments.

The process shown in FIG. 1 may be performed by any suitable computer-executable code and/or computing system, including the system(s) illustrated in FIGS. 2, 12, and 13. In one example, each of the steps of the process 100 shown in FIG. 1 may represent an algorithm whose structure includes and/or is represented by multiple sub-steps, examples of which will be provided in greater detail below.

At block 110, the method may include obtaining a first 3D model of an upper jaw of a patient. A scanner, such as an intraoral scanner, may be used to generate scan data, such as surface topography data, by scanning the patient's dentition. The surface topography data can be generated by directly scanning the intraoral cavity, a physical model (positive or negative) of the intraoral cavity, or an impression of the intraoral cavity, using a suitable scanning device (e.g., a handheld scanner, desktop scanner, coordinate measuring machine, etc.). During the scanning process, individual frames or images of the patient's teeth may be used to generate the first 3D model of the upper jaw the patient. The first 3D model of the upper jaw of the patient may include 3D data representing the surface contours and shape of the patient's dentition along with color data representing the color of the patient's anatomy associated with the surface of the patient's teeth, gums, and other oral anatomy. The scan data may be stitched together to generate a 3D model of the patient's dentition, such as the upper jaw of the patient. The 3D model of the patient's dentition may include lingual, buccal, and occlusal surfaces of the patient's teeth along with buccal and lingual surfaces of the patient's gingiva. The scan data may include digital representations of a patient's teeth. The digital representation, such as the two-dimensional or three-dimensional models may include surface topography data for the patient's intraoral cavity (including teeth, gingival tissues, etc.). The surface topography data can be generated by directly scanning the intraoral cavity, using a suitable scanning device (e.g., a handheld scanner).

In some embodiments, the scan data may include near infrared images and data representing subsurface structures and features of the patient's dentition or other parts of the oral cavity, such as the gingiva. Near infrared illumination can penetrate the surface of the patient's teeth and gingiva to illuminate subsurface features for capture by an image sensor that is sensitive to near infrared wavelengths of light. The subsurface data may be aligned with the three-dimensional model of the patient's teeth during the scanning process. In some embodiments the 3D model may be a volumetric model and the subsurface data may be added at subsurface locations of the 3D model that correspond to the subsurface locations of the features in the physical world.

In some embodiments, obtaining the first 3D model of the upper jaw of the patient may include capturing images of features associated with the patient's dentition. In some embodiments, the features may include natural features, such as anatomic features of the patient's dentition. In some embodiments, the features may include artificial features, such as features added to the patient's dentition in order to more clearly identify locations associated with the patient's jaw, as discussed herein.

At block 120, the method may include obtaining a second 3D model of a lower jaw of a patient. A scanner, such as an intraoral scanner, may be used to generate scan data by scanning the patient's dentition. During the scanning process, individual frames or images of the patient's teeth may be used to generate the first 3D model of the lower jaw the patient. The first 3D model of the lower jaw of the patient may include 3D data representing the surface contours and shape of the patient's dentition along with color data representing the color of the patient's anatomy associated with the surface of the patient's teeth. The scan data may be stitched together to generate a 3D model of the patient's dentition, such as the lower jaw of the patient. The 3D model of the patient's dentition may include lingual, buccal, and occlusal surfaces of the patient's teeth along with buccal and lingual surfaces of the patient's gingiva. The scan data may include digital representations of a patient's teeth. The digital representation, such as the two-dimensional or three-dimensional models may include surface topography data for the patient's intraoral cavity (including teeth, gingival tissues, etc.). The surface topography data can be generated by directly scanning the intraoral cavity, using a suitable scanning device (e.g., a handheld scanner).

In some embodiments, the scan data may include near infrared images and data representing subsurface structures and features of the patient's dentition. Near infrared illumination can penetrate the surface of the patient's teeth and gingiva to illuminate subsurface features for capture by an image sensor that is sensitive to near infrared wavelengths of light. The subsurface data may be aligned with the three-dimensional model of the patient's teeth during the scanning process. In some embodiments, the 3D model may be a volumetric model and the subsurface data may be added at subsurface locations of the 3D model that correspond to the subsurface locations of the features in the physical world.

In some embodiments, obtaining the first 3D model of the lower jaw of the patient may include capturing images of features associated with the patient's dentition. In some embodiments, the features may include natural features, such as anatomic features of the patient's dentition. In some embodiments, the features may include artificial features, such as features added to the patient's dentition in order to more clearly identify locations associated with the patient's jaw, as discussed herein.

At block 130, the method may include capturing a series of 2D images of the upper and lower jaws of the patient as the patient moves its jaws in dynamic occlusion. A scanner, such as an intraoral scanner, may be used to generate 2D scan data by imaging the patient's dentition. The scanner may be the same scanner used to generate the 3D models of the upper and lower jaw of the patient. In some embodiments, the scanner may be a different scanner than the scanner used to generate the 3D models of the upper and lower jaws of the patient. During the scanning process, individual frames or images of the patient's teeth may be captured while the patient moves their upper and lower jaws relative to each other. In some embodiments, the images may capture the patient as they move their jaws from a normal open occlusion through initial occlusion and to a hard fight occlusion. In some embodiments, the captured series of 2D images may include various motions of the jaws while in various states of occlusion such as while moving their jaws in the posterior-anterior direction and/or in a side-to-side motion in lateral directions. Such movements capture the dynamic aspects of the patient's jaw and aid in generating an accurate digital three-dimensional real-time articulation model of the patient's upper and lower jaws. The paths of the repeated motions may be averaged to determine an average or target trajectory of the patient's teeth during dynamic occlusion.

Each frame of 2D scan data generated by the scanner includes features of both the upper and lower jaws of the patient. The first 2D scan data may include color and other feature data representing the colors and features of the patient's anatomy associated with the surface of the patient's teeth. In some embodiments, the individual frames or images of the 2D scan data may be stitched together to generate larger images of the patient's dentition, including both the upper and lower jaw. The 2D images of the patient's dentition may include predominantly images of the buccal surfaces of the patient's dentition. In some embodiments, the images may include a buccal, incisal, and/or the occlusal surfaces of the patient's dentition.

In some embodiments, the 2D scan data may include near infrared images and data representing subsurface structures and features of the patient's dentition. Near infrared illumination can penetrate the surface of the patient's teeth and gingiva and illuminate subsurface features for capture by an image sensor that is sensitive to near infrared wavelengths of light. The subsurface data may be aligned with the 2D surface images of the patient's dentition.

In some embodiments, 2D images of the patient's dentition may include capturing images of features associated with the patient's dentition. In some embodiments, the features may include natural features, such as anatomic features of the patient's dentition. In some embodiments, the features may include artificial features, such as features added to the patient's dentition in order to more clearly identify locations associated with the patient's jaw, as discussed herein.

At block 140, the method may include identifying features associated with the jaws of the patient. The method may include identifying the features in the 2D data, the 3D model of the patient's upper jaw, and/or the 3D model of the patient's lower jaw. The features may be anatomic surface or subsurface features of the patient's anatomy, as discussed herein. In some embodiments, the features may be artificial features such as features added to the patient's dentition, as discussed herein. In some embodiments the features may be targets adhered to or placed on the patient's dentition. For example, as shown and described with respect to FIGS. 3, 4, and 5. In some embodiments, the features may be anatomic features, such as colors or coloring of the patient's gingiva, blood vessels and arteries visible through the patient's gingiva, particular features of the patient's gingiva, such as the interdental papillia. For example, as shown and described with respect to FIGS. 6 and 7. In some embodiments, the features may be artificial features such as dyed portions of the patient's dentition such as a plaque dye applied to the patient's dentition, or other artificially colored portions of the patient's dentition. For example, as shown and described with respect to FIG. 9.

In some embodiments, the features may be surface features of the patient's teeth and/or gingiva that may be captured from multiple directions and/or determined based on a projection of the two-dimensional images onto the three-dimensional model of the patient. For example, such as shown with respect to FIGS. 8 and 10, respectively.

In some embodiments, the features may be subsurface features or other features imaged using near infrared imagery, as discussed herein.

In some embodiments, the 2D data may be captured at high rates such as is much as 30 frames per second, 50 frames per second, or 100 frames per second or more to oversample the motion of the patient's teeth and jaw. Capturing the movement of the patient's jaw at such a high rate allows for simplified tracking of the features of the patient's jaw between frames and also allows for a sufficient quantity of 2D data to be captured within a relatively short period of time. This adds to the patient's comfort by limiting the amount of time the patient's teeth are scanned.

In some embodiments the motion of the patient's teeth may be repeated several times in a row in order to gather data related to the patient's teeth in similar positions over time. For example, a patient may be requested to do a dynamic bite motion multiple times, to slide their teeth against each other and a lateral and/or anterior or posterior direction, or in another manner. In some embodiments, the 2D images may be captured from different positions during the repeated movement of the patient's teeth. In this way similar movements are captured from different angles which may then be combined in order to more accurately determine the location of the patient's teeth during dynamic bite motion, such as for example, as discussed at blocks 150 and 160.

At block 150, a series of relative positions of the first 3D model and the second 3D model may be generated based on the identified surface features in the three-dimensional models and the 2D images. At block 150, the method 100 locates features in the 3D model of the patient's upper jaw and in the 3D model of the patient's lower jaw that are also in the 2D images of the patient's upper and lower jaw and uses these commonly found features to align the upper jaw and the lower jaw in the series of relative positions. For example, the 3D model of the upper jaw may include one or more of an artificial feature, such as a first target affixed to the patient's upper jaw or a stained location of plaque, and anatomical feature, such as blood vessels in the gingiva, an outline of the patient's tooth (such as shown and described with respect to FIG. 10), or other features on the upper jaw of the patient's dentition. Similarly, the 3D model of the lower jaw may include one or more of an artificial feature, such as a second target affixed to the patient's lower jaw, or anatomical features such as blood vessels and the lower gingiva in outline of a tooth of the patient's lower jaw, or other features on the lower jaw of the patient's dentition.

The 2D images, either individually or when stitched together, may include images of the features of both the upper jaw and the lower jaw in order to facilitate alignment of the upper jaw with the lower jaw. For example, a single image or a stitched image of the patient's upper and lower jaw and dynamic occlusion may include the first target affixed to the upper jaw and the second target affixed to the lower jaw and may also include one or more other identified features discussed herein associated with the upper jaw the lower jaw. Using the common features found in the 3D model of the upper jaw and the 2D image along with common features found in the 3D model of the lower jaw and the 2D image, a relative position and orientation of the upper jaw with respect to the lower jaw can be determined. This process may be repeated many times over the series of 2D images in order to generate a series of relative positions of the first 3D model of the upper jaw with respect to the second 3D model of the lower jaw.

In some embodiments, the features may be used for the 2D images and not the 3D models. For example, the features may be imaged from multiple locations during the 2D imaging at block 130. Then, at block 140, the location of the features, such as targets, may be determined based on the differences in perspectives in two or more 2D images from two or more locations. The positions of the targets relative to the teeth may also be determined based on the 2D images. In some embodiments, at block 160 the 2D images may be used to model the dynamic occlusion with the 3D models of the upper and lower jaw.

At block 160, modeling a dynamic occlusion of the upper jaw and the lower jaw of the patient based on the series of relative positions. The dynamic occlusion of the upper and lower jaw may then be modeled based on the positions determined at block 150. The model of the dynamic occlusion may be modified as part of a treatment planning process. For example, a dental professional may modify the 3D model of the upper jaw or the lower jaw with a crown, bridge, implant, or other prosthetic. The modified 3D model may then be used in the dynamic occlusion model in order to determine the effect of the prosthetic on the patient's bite. For example, the dynamic occlusion model may be used to determine undesirable tooth contacts or interference or undesirable guidance during dynamic occlusion. In this way, the dynamic occlusion model may be used in place of, for example, a dental articulator.

As shown in FIG. 2, a system 200 for generating a dynamic occlusion model of a patient's dentition may include one or more modules 202. In one example, all or a portion of the functionality of modules 202 may be performed by the system 200 and/or any other suitable computing system. As will be described in greater detail below, one or more of modules 202 from FIG. 2 may, when executed by at least one processor 230 of the system 200, which may be a computing device, enable the system 200 to provide for the generation of a digital dynamic articulation model. For example, and as will be described in greater detail below, one or more of modules 202 may cause the system 200 to carry out the steps of a method according to FIG. 1.

System 200 generally represents any type or form of computing device capable of reading computer-executable instructions and are capable of storing and analyzing data. System 200 may be, for example, an intraoral scanner and 3D treatment planning computer or may include a scanner 240, such as an intraoral scanner or be operably connected to the scanner. Additional examples of system 200 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Additional examples of system 200 include, without limitation, security servers, application servers, web servers, storage servers, and/or database servers configured to run certain software applications and/or provide various security, web, storage, and/or database services. Although illustrated a single entity in FIG. 2, computing device 200 may include and/or represent a plurality of computing devices that work and/or operate in conjunction with one another.

As illustrated in FIG. 2, system 200 may include one or more memory devices, such as memory 240. Memory 240 generally represents any type or form of volatile or non-volatile storage device or medium capable of storing data and/or computer-readable instructions. In one example, memory 240 may store, load, and/or maintain one or more of modules 202. Examples of memory 240 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 2, system 200 may also include one or more physical processors, such as physical processor 230. Physical processor 230 generally represents any type or form of hardware-implemented processing unit capable of interpreting and/or executing computer-readable instructions. In one example, physical processor 230 may access and/or modify one or more of modules 202 stored in memory 240. Additionally or alternatively, physical processor 230 may execute one or more of modules 202. Examples of physical processor 230 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 2, the system 200 may include a scanner 250. The scanner 250 may have a probe at distal end of a handheld wand. The scanner may be a multi-modal scanner that may capture images in near infrared, white light, and/or narrower band lights, such as green light, red light, or other monochromatic light. The scanner may also include a structure light scanning system or a confocal scanning system for capturing and generating a 3D surface model of the patient's dentition. The scanner may include one or more imaging systems for capturing images from multiple perspectives at a time, such as simultaneously.

The system 200 may include an imaging device 260. The imaging device 260 may be a 2D or 3D imaging device that captures still or video images of the patient's anatomy such as their face and teeth. A 2D imaging device may include a color or RGB camera that captures still images of the patient's face and dentition. In some embodiments the to the imaging device may include a color or RGB camera that captures video of the patient's face and dentition. In some embodiments, a 3D imaging device such as a freebie scanner may be used to capture death the data of the patient's face and dentition. In some embodiments, the 3D imaging device may be a multi-perspective imaging device that captures data from multiple perspectives at the same time and then generate a 3D model based on the images. In some embodiments, the imaging device may be portable imaging device, such as a camera of a cellphone or smartphone. In the embodiments, disclosed herein, the imaging device 260 may be remote from the system 200 and may transmit 2D or 3D image data, to the system for processing accordingly to the methods disclosed herein.

The system 200 may be connected to a network. A network may be any medium or architecture capable of facilitating communication or data transfer. In one example, a network may facilitate elements of the system 200. The network may facilitate communication or data transfer using wireless and/or wired connections. Examples of a network include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Additional elements 220 generally represents any type or form of data that may be used for designing and fabricating temporary and permanent crown, as discussed herein.

As will be explained in greater detail below, modules 202 may include a 3D scanning module 204, a 2D scanning module 206, feature identification module 208, and dynamic occlusion module 210. Although illustrated as separate elements, one or more of modules 202 in FIG. 2 may represent portions of a single module or application.

In certain embodiments, one or more of modules 202 in FIG. 2 may represent one or more software applications or programs that, when executed by a computing device, may cause a computing device, such as system 200, and associated hardware to perform one or more tasks. For example, and as will be described in greater detail below, one or more of modules 202 may represent modules stored and configured to run on one or more computing devices, such as the system 200. One or more of modules 202 in FIG. 2 may also represent all or portions of one or more special-purpose computers configured to perform one or more tasks.

The 3D scanning module 204 running on system 200 may communicate with the scanner 240 to generate an intraoral scan of the patient's dentition. The 3D scanning module 204 may provide a user interface that is shown on a display, where the user interface enables the dental practitioner to interact with a user interface associated with 3D scanning module 204 through manipulation of graphical elements such as graphical icons and visual indicators such as buttons, menus, and so on. The 3D scanning module 204 may include a number of modes, such as a scanning mode.

The scan mode allows the dental practitioner to capture images and/or video of a dental site of the patient's dentition, such as of lower arch, upper arch, bite segment, and/or a prepared tooth. The images and/or video may be used to generate a virtual 3D model of the dental site. While in the scan mode, scanning module 204 may register and stitch together intraoral images from the intraoral scanner 240 and generate a virtual 3D model of a dental arch.

The 3D scanning module 204 may carry out the process or processes of blocks 110 and 120 of method 100. For example, the 3D scanning module 204 may generate a first 3D model of an upper jaw of a patient and a second 3D model of a lower jaw of a patient, as discussed with respect to FIG. 1.

The 3D scanning module 204 running on system 200 may communicate with the scanner 250 to generate an intraoral scan of the patient's dentition. The 3D scanning module 204 may provide a user interface that is shown on a display, where the user interface enables the dental practitioner to interact with a user interface associated with scanning module 204 through manipulation of graphical elements such as graphical icons and visual indicators such as buttons, menus, and so on. The 3D scanning module 204 may include a number of modes, such as a scanning mode.

The scan mode allows the dental practitioner to capture images and/or video of a dental site of the patient's dentition, such as the lower and upper arches in occlusion, including dynamic occlusion, lower arch, upper arch, bite segment, and/or a prepared tooth. The images and/or video may be used to generate one or more 2D images of the dental site. While in the scan mode, 3D scanning module 204 may register and stitch together intraoral 3D images from the intraoral scanner 240.

The 2D scanning module 206 may carry out the process or processes of block 130 of method 100. For example, capturing a series of 2D images of the upper and lower jaws of the patient as the patient moves its jaws in dynamic occlusion.

The feature identification module 208 may identify features associated with the upper and lower jaws of the patient within the 3D and 2D scan data, such as the 3D models and the 2D images. For example, the feature identification module 208 may carry out the process or processes of block 140. In some embodiments, the feature identification module 208 may identify features in the 2D data, the 3D model of the patient's upper jaw, and/or the 3D model of the patient's lower jaw. The feature identification module 208 may identify features that are anatomical features, such as surface features or subsurface features of the patient's anatomy, as discussed herein. In some embodiments, the feature identification module 208 may identify features that are artificial features such as features added to the patient's dentition, as discussed herein. In some embodiments, the feature identification module 208 may identify features that are targets adhered to or placed on the patient's dentition. For example, as shown and described with respect to FIGS. 3, 4, and 5. In some embodiments, the feature identification module 208 may identify features that are anatomic features, such as colors or coloring of the patient's gingiva, blood vessels and arteries visible through the patient's gingiva, particular features of the patient's gingiva, such as the interdental papilla. For example, as shown and described with respect to FIGS. 6 and 7. In some embodiments, the feature identification module 208 may identify features that are artificial features such as dyed portions of the patient's dentition such as a plaque dye applied to the patient's dentition, or other artificially colored portions of the patient's dentition. For example, as shown and described with respect to FIG. 9.

In some embodiments, the feature identification module 208 may identify features that are surface features of the patient's teeth and/or gingiva that may be captured from multiple directions and/or determined based on a projection of the two-dimensional images onto the three-dimensional model of the patient. For example, such as shown with respect to FIGS. 8 and 10, respectively. In some embodiments, the feature identification module 208 may identify features that are subsurface features or other features imaged using near infrared imagery, as discussed herein. In some embodiments, the feature identification module 208 may identify features that are captured at high rates such as is much as 30 frames per second, 50 frames per second for 100 frames per second or more to oversample the motion of the patient's teeth and jaw.

The dynamic occlusion module 210 may use the data generated and gathered by the other modules and additional elements in order to generate a dynamic occlusion model and/or to derive an articulator model or articulator settings for an articulator model of the patient's dentition, such as described in the methods herein.

As illustrated in FIG. 2, example system 200 may also include one or more additional elements 220, such as 3D scan data 224, feature data 226, and 2D scan data 228. The 3D scan data 224 may include one or more three-dimensional models of the patient's anatomy such as their face including their eyes, cheeks, nose, lips, mouth, chin and other facial features and intraoral structure including scans of their dentition, prepared teeth, gingiva, features, and etc. The 3D scan data, also referred to herein as 3D image data and 3D data, may include 3D digital representations of a patient's anatomy, such as the face and dentition, including the teeth and gingiva and may include point clouds, 3D models, such as 3D surface models, and other 3D representations. The digital representation, such as three-dimensional models, may include surface topography data for the patient's face and intraoral cavity (including teeth, gingival tissues, features etc.). The surface topography data can be generated by directly scanning the intraoral cavity, using a suitable scanning device (e.g., scanner 240) or using an extraoral imaging device, such as a multiview or other 3D imaging device. In some embodiments, 3D data may be multiview 3D data captured from multiple perspectives using multiple imaging sensors and a fixed or known special relationship.

The feature data may be 2D or 3D data representing the features of the patient's intraoral cavity and face. The feature data may include projections of 2D or 3D data, such as 2D data projected on a 3D model or a 3D model projected in two-dimensions. The feature data may include color, shape, 3D orientation, and 3D location information related to the features.

The 2D scan data 228 may include one or more two-dimensional images of the patient's anatomy such as their face and intraoral structure including scans of their dentition, prepared teeth, gingiva, features and etc. The 2D scan data may include digital representations of a patient's teeth. The digital representation, such as two-dimensional images, may include surface and subsurface image data of the patient's intraoral cavity (including teeth, gingival tissues, features etc.). The image data can be generated by directly scanning the intraoral cavity, using a suitable scanning device (e.g., scanner 240).

Accurately generating a series of relative positions of two 3D models such as the 3D model of the upper jaw and the 3D model of the lower jaw using captured 2D images may use stable features. Stable features are features that remain in the same relative position with respect to an upper jaw or the lower jaw during the scanning process. For example, if a feature is used in the 3D scanning of the upper jaw and 2D images of the upper jaw and lower jaw in dynamic occlusion then the feature should remain in the same or very close to the same position relative to the upper jaw during the 3D scanning and 2D imaging process. Similarly, if a feature is used in the 3D scanning of the lower jaw and the 2D imaging of the upper jaw and lower jaw in dynamic occlusion then the feature should remain in the same or very close to the same position relative to the lower jaw during the 3D scanning and 2D imaging process. In some embodiments, for example when the features are used only in the 2D imaging process, and the feature would remain in the same position relative to a respective one of the upper jaw and the lower jaw 2D imaging process.

Figure 3:
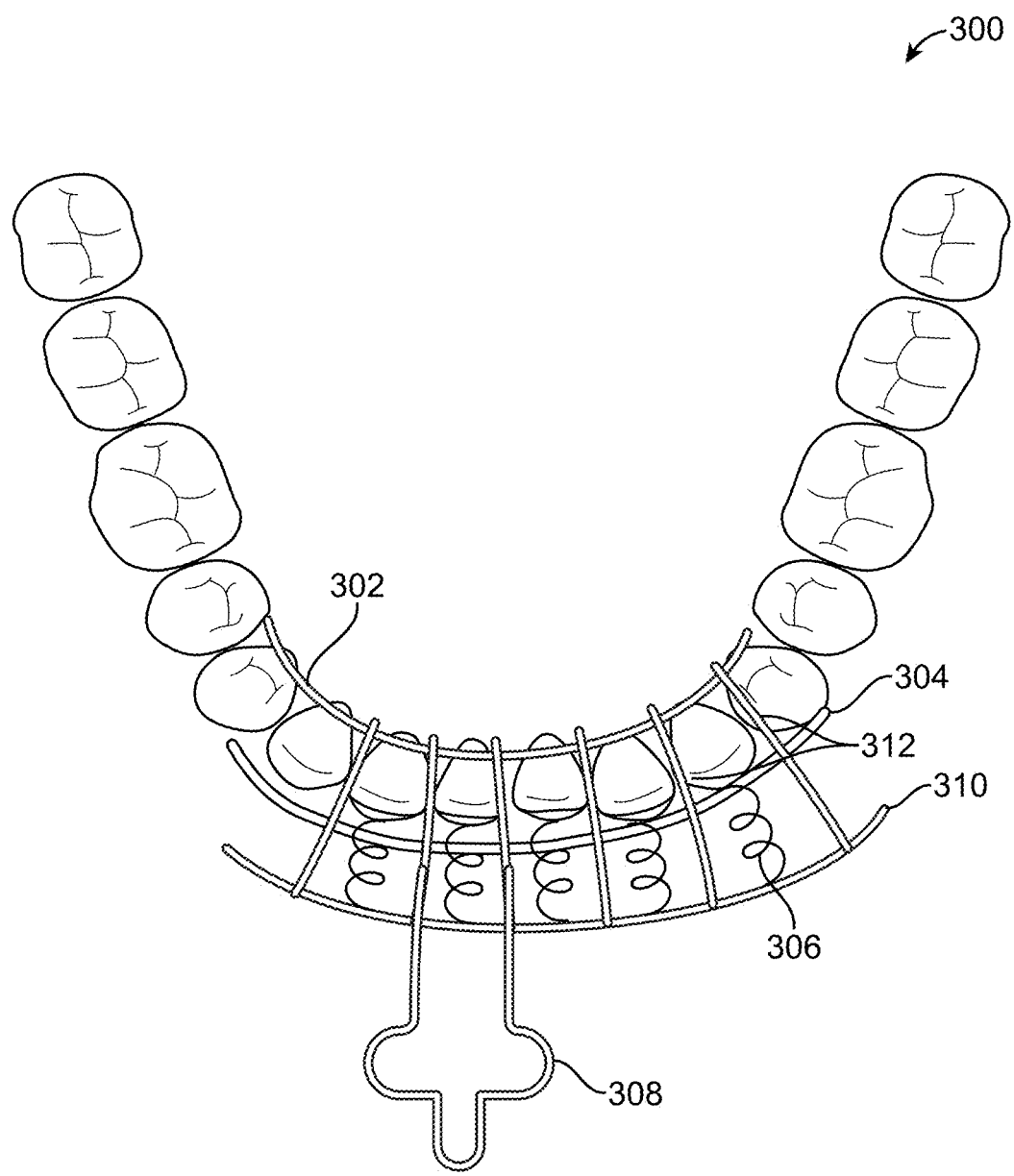
FIG. 3 shows an example apparatus for affixing registration targets on a patient's dentition, in accordance with some embodiments.

Many types of artificial and anatomical features may be used to model the dynamic occlusion of an upper jaw and a lower jaw. For example, FIG. 3 depicts a target mounting system 300 for use in stably mounting a registration target 308 to a patient's teeth. The system 300 may include a lingual support that may be arcuate in shape and shaped to abut or clamp against a lingual surface of one or more of the patient's teeth and a buccal support 304 that may be arcuate in shape and shaped to abut or clamp against a buccal surface of one or more of the patient's teeth. The lingual and buccal supports 302, 304 may be rigid or flexible. A rigid support may maintain its shape during use while a flexible support may deform and take on, at least partially, the shape of the buccal or lingual surface of the patient's teeth. The system 300 may also include third support 310 that is coupled to the buccal support or the lingual support with one or more deformable, force supplying, members 306, such as springs. The springs 306 apply a clamping force between the buccal support and the lingual support and the teeth.

The mounting system 300 may also include one or more interproximal extensions 312 that extend between the lingual support the buccal support and the third support in order to connect the three and retain them. In some embodiments, the interproximal extensions limit the travel of the third support and apply a counteracting force against the clamping force imparted by the springs.

A registration target 308 may be coupled to the mounting system 300. In some embodiments the registration target may be coupled to the buccal support or the third support. The registration target 308 may have many shapes such as a cross or crosshair shape, a round or spherical shape, or other shape. The clamping force against the patient's teeth hold the registration target 308 in a stable position relative to the arch to which it is attached during the 3D scanning and/or the 2D imaging process.

Figure 4:
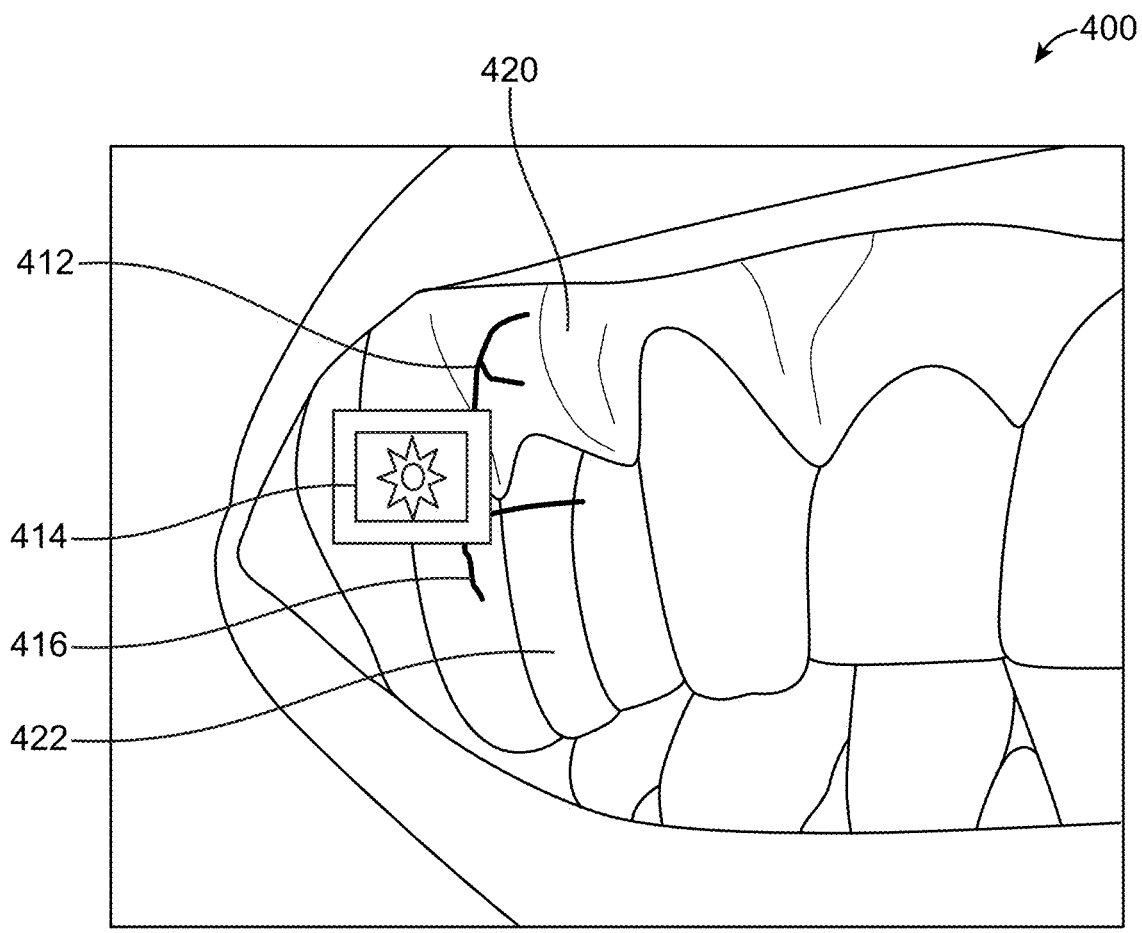
FIG. 4 shows an example apparatus for affixing registration targets on a patient's dentition, in accordance with some embodiments.

FIG. 4 depicts a stable target system 400. The stable target system 400 may include a target 414 stably coupled to one or more mounting fixtures 412, 416. The mounting features 412, 416 may be temporarily coupled to the teeth 422 or the gingiva 420 of the patient's dentition. In some embodiments, a temporary adhesive may be used to couple the mounting fixtures 412, 416 to the patient's dentition. In some embodiments, suction cups may be used to stably couple the mounting fixtures 412, 416 to the patient's dentition. In some embodiments, a combination of temporary adhesive and suction cups or other suction features may be used to temporarily and stably attach the target 414 relative to the patient's upper or lower jaw.

Figure 5:
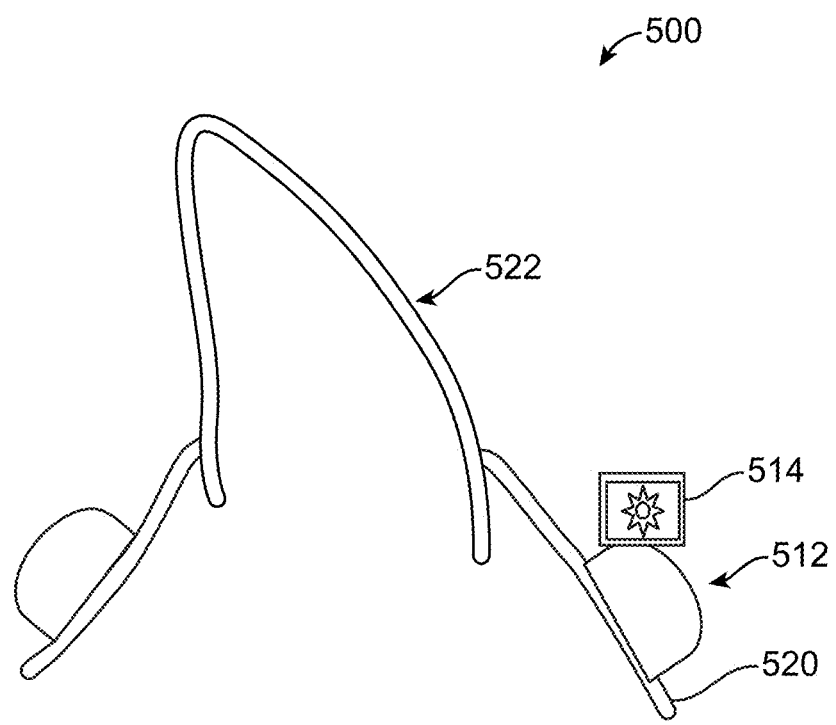
FIG. 5 depicts an example apparatus for affixing registration targets on a patient's teeth or gingiva, in accordance with some embodiments.

FIG. 5 depicts an embodiment of a stable target system 500. The stable target system 500 may include a target 514 stably coupled to a mounting fixture 512. The mounting fixture 512 may be temporarily coupled to the gingiva 520 of the patient's dentition approximate the patient's tooth 522. The mounting fixture 512 may be a suction cup or other vacuum adhesion device may be temporarily affixed to the patient's gingiva. In some embodiments the vacuum adhesion device may be coupled to a buccal surface of the patient's teeth.

Figure 6:
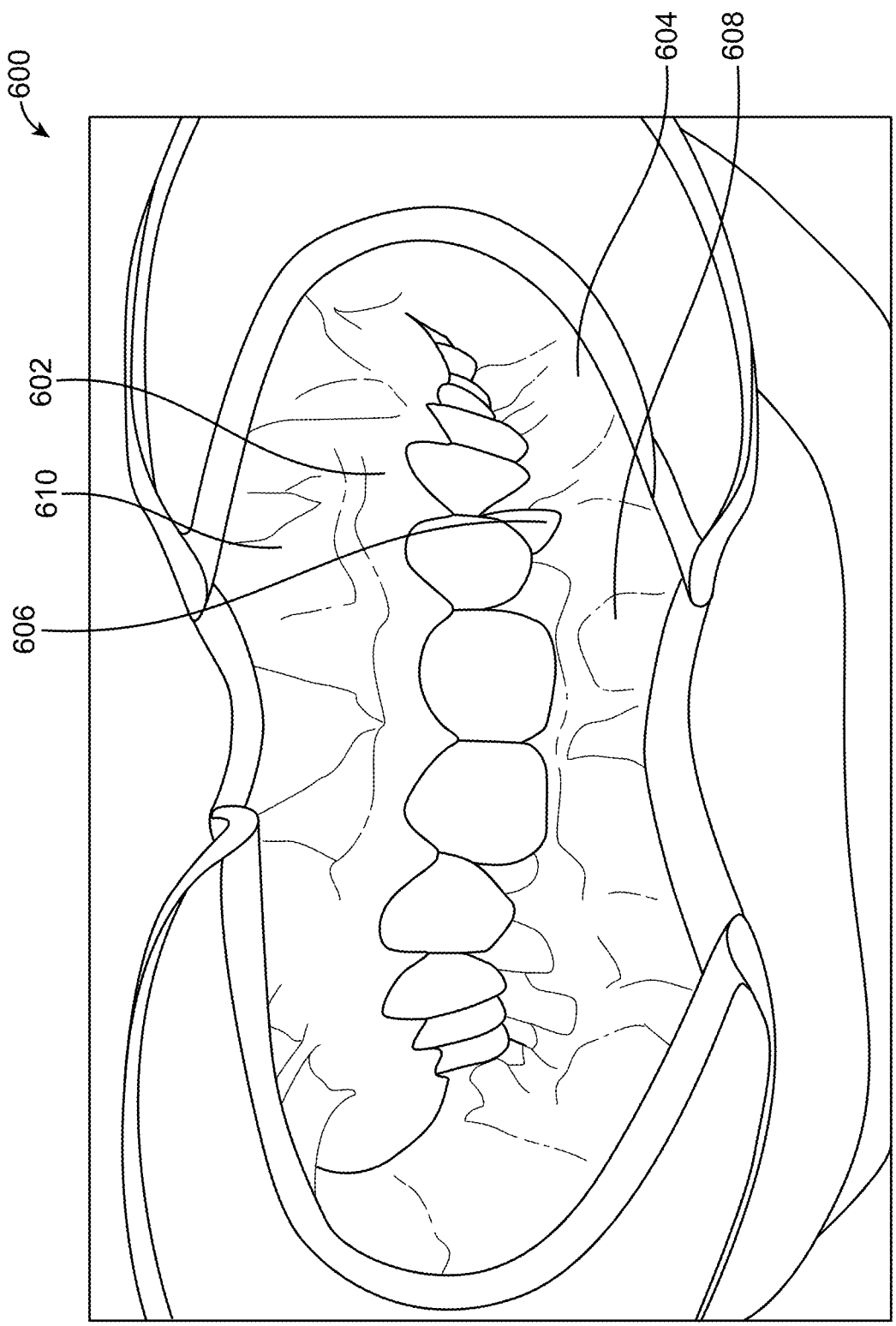
FIG. 6 shows an example of using anatomic features for the gingiva for feature identification and registering images, in accordance with some embodiments.

In some embodiments, anatomical features may be used. FIG. 6 depicts and image 600 that includes anatomical features 608, 610 associated with the lower arch or jaw 604 and the upper arch or jaw 602. In the image 600, the teeth 606 of the patient's lower jaw are occluded or blocked by the teeth of the patient's upper jaw 602. In such an embodiment, surface features of the patient's teeth may not be visible during the two-dimensional imaging process and may not be used for aligning the upper jaw with a lower jaw in dynamic occlusion. In addition, the surface condors of the gingiva, which are visible, are relatively flat and devoid of easily identifiable surface contours that may be used to determine the location of the patient's lower jaw. The patient's lower jaw does have visible colored and subsurface features 608 that may be used to determine the location and position of the patient's lower jaw. Anatomical features such as the patient's veins and arteries and blood vessels may be located in stable positions during the scanning process and may be imaged using the color or monochromatic 2D imaging device and then used in method 100 for determining the dynamic occlusion of the patient's upper and lower jaws. Similarly, even though the teeth of the patient's upper jaw 602 are visible, the anatomical features 610 of the upper jaw may also be used to determine the relative position of the upper jaw with the lower jaw based on the 2D images. In some embodiments, near infrared wavelengths may be used to show the blood vessels in higher contrast with respect to the gingiva and other surrounding tissue.

Figure 7:
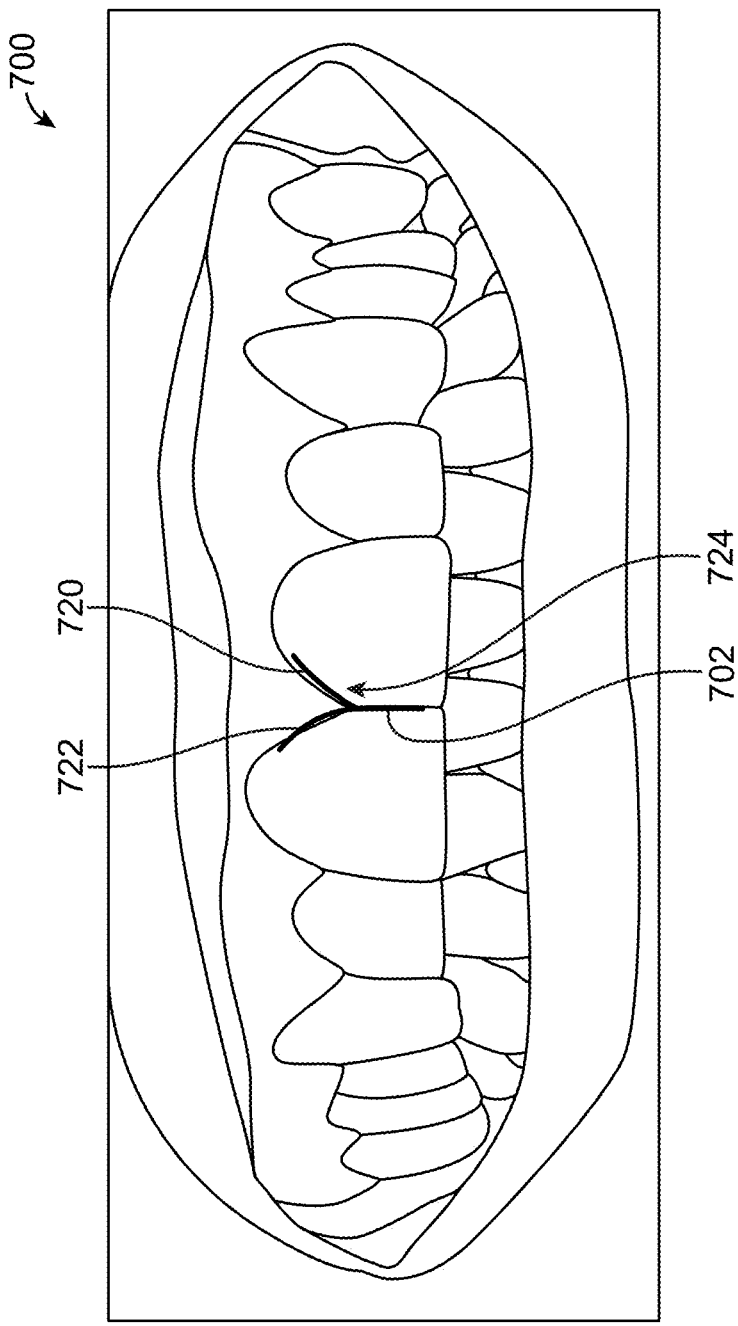
FIG. 7 shows an example of using anatomic features for the gingiva for feature identification and registering images, in accordance with some embodiments.

The patient's dentition may include other anatomical features visible in two-dimensional imaging that may be used for determining the relative location of the patient's upper jaw. For example, FIG. 7 depicts an image 700 of the patient's teeth in occlusion and uses the apex of the interdental papillia between the upper central incisors as an anatomical feature for determining the position of the patient's upper jaw. The apex of the interdental papillia 724 is the intersection of the gingival lines 722 and 720 and the interproximal center line 702 between the patient's central incisors. In some embodiments, the location of multiple apex's of multiple interdental papillia may be used as anatomical features for determining the position of the patient's upper and lower jaws. The location of the interdental papillia may also be easily identified in the original 3D scans of the patient's upper and lower jaws.

Figure 8:
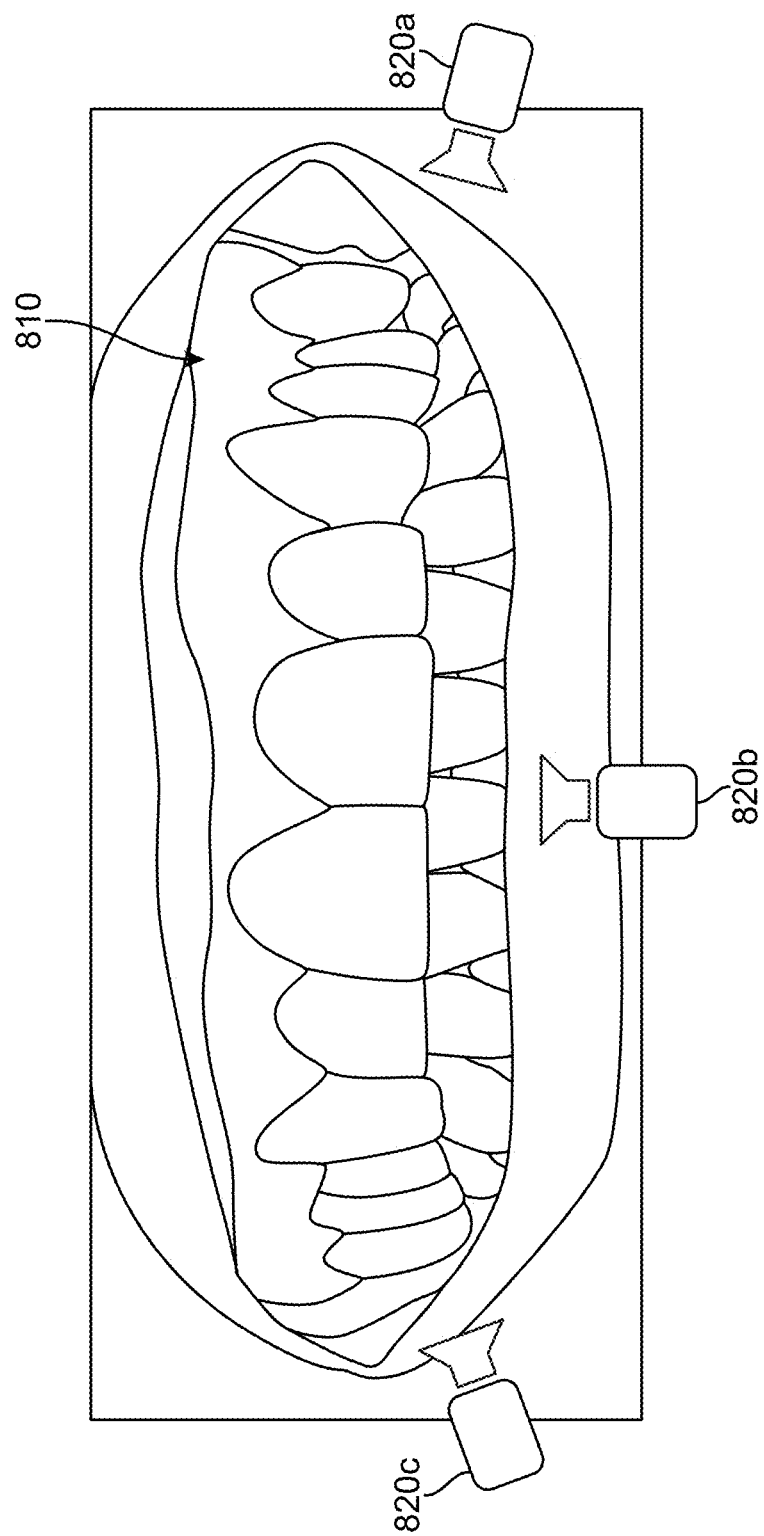
FIG. 8 shows an example of multiple perspective imaging for feature identification and registering images, in accordance with some embodiments.

FIG. 8 depicts an embodiment wherein the relative position of the patient's upper jaw and lower jaw is captured simultaneously from multiple known camera locations. In some embodiments, multiple cameras 820a, 820b, 820c, may simultaneously capture images of the patient's dentition 810 from known left, right, and center positions and orientations relative to the patient's dentition. By using simultaneous image capture from multiple cameras, the patient's upper and lower jaws may be imaged in dynamic occlusion. The multiple viewing angles of the cameras may allow for determination of the three-dimensional location of the patient's lower and upper jaws during the dynamic occlusion.

Figure 9:
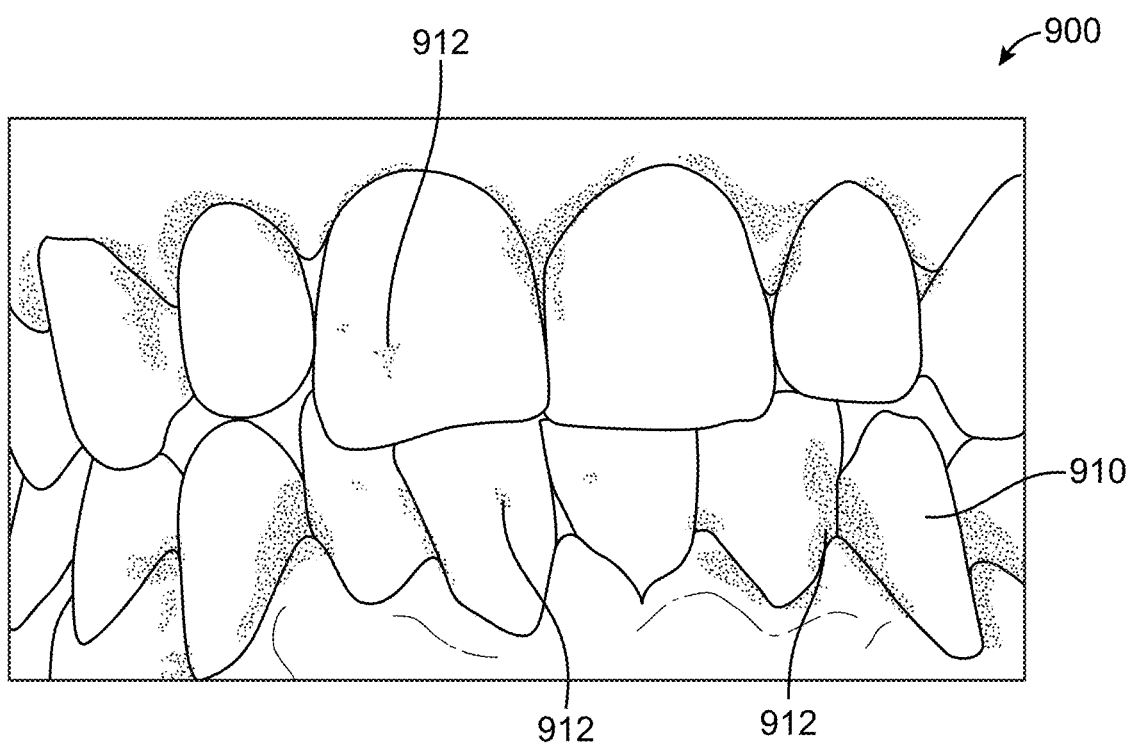
FIG. 9 shows an example of using dye on a patient's dentition for feature identification and registering images, in accordance with some embodiments.

FIG. 9 depicts an image 900 of dyed or stained teeth 910 for use in generating stable features. A dye or stain may be applied to the patient's teeth to provide a contrasting color that may be imaged by an intraoral scanner. The dye or stain may adhere or be absorbed to plaque, caries, or demineralized locations 912 of the patient's teeth. The stain may come in the form of an oral tablet that is chewed and swished around in the patient's mouth. During this process the stain is absorbed by the plaque, caries and/or the demineralized portions of the patient's teeth. Stains may be colored with a dye in the visible light spectrum such as a red, blue, or purple. In some embodiments, stains may be colored with dyes visible in the near infrared or ultraviolet wavelengths of light. In some embodiments the stains may fluoresce when exposed to certain wavelengths of light.

The dyed or stained plaque, caries, or demineralized areas of the patient's teeth which the die or stain is absorbed or adheres is stable or fixed on the patient's teeth and do not move during the short time period of the 3D and 2D scanning process. In this way, the dyed plaque, caries or demineralized areas may be used as features 912 for determining the relative location and orientation of the patient's upper and lower jaws.

Figure 10:
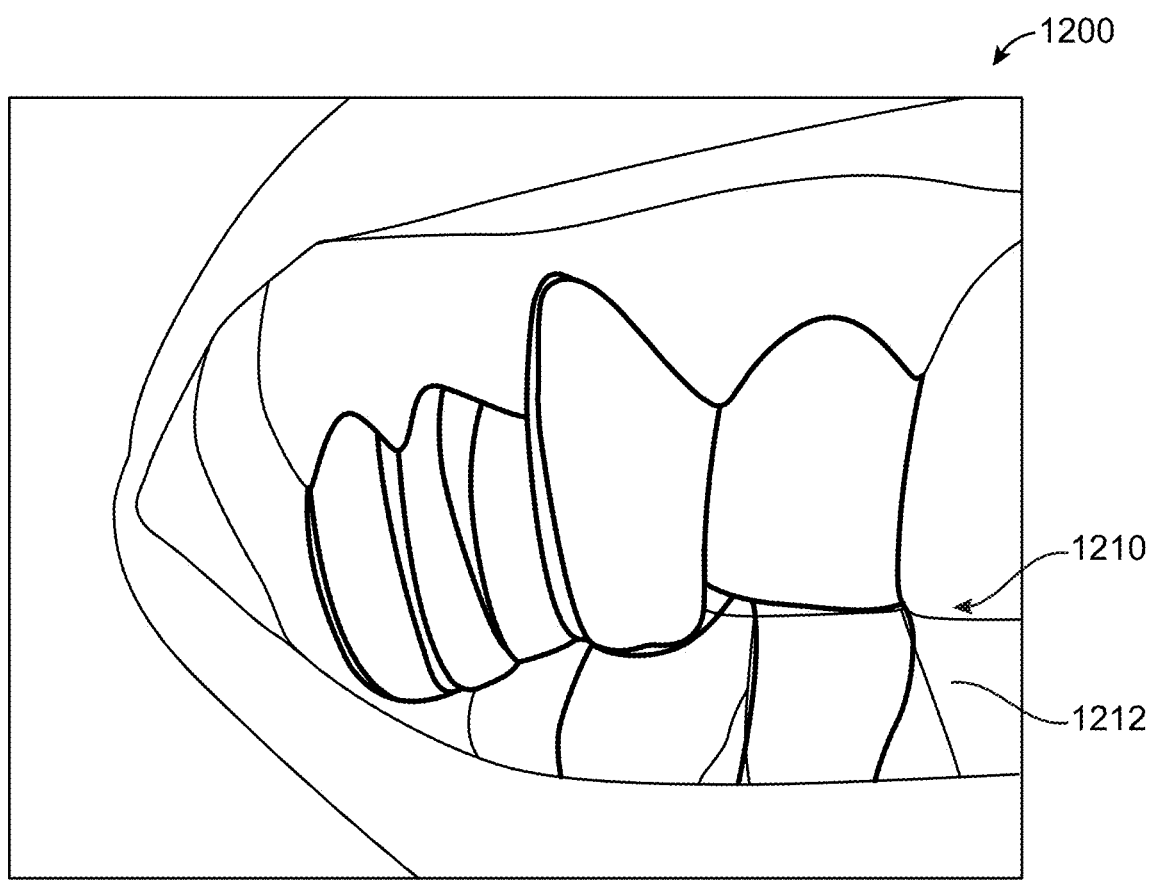
FIG. 10 shows an example of using two-dimensional to three-dimensional projection of tooth features for feature identification and registering images, in accordance with some embodiments.
Figure 11:
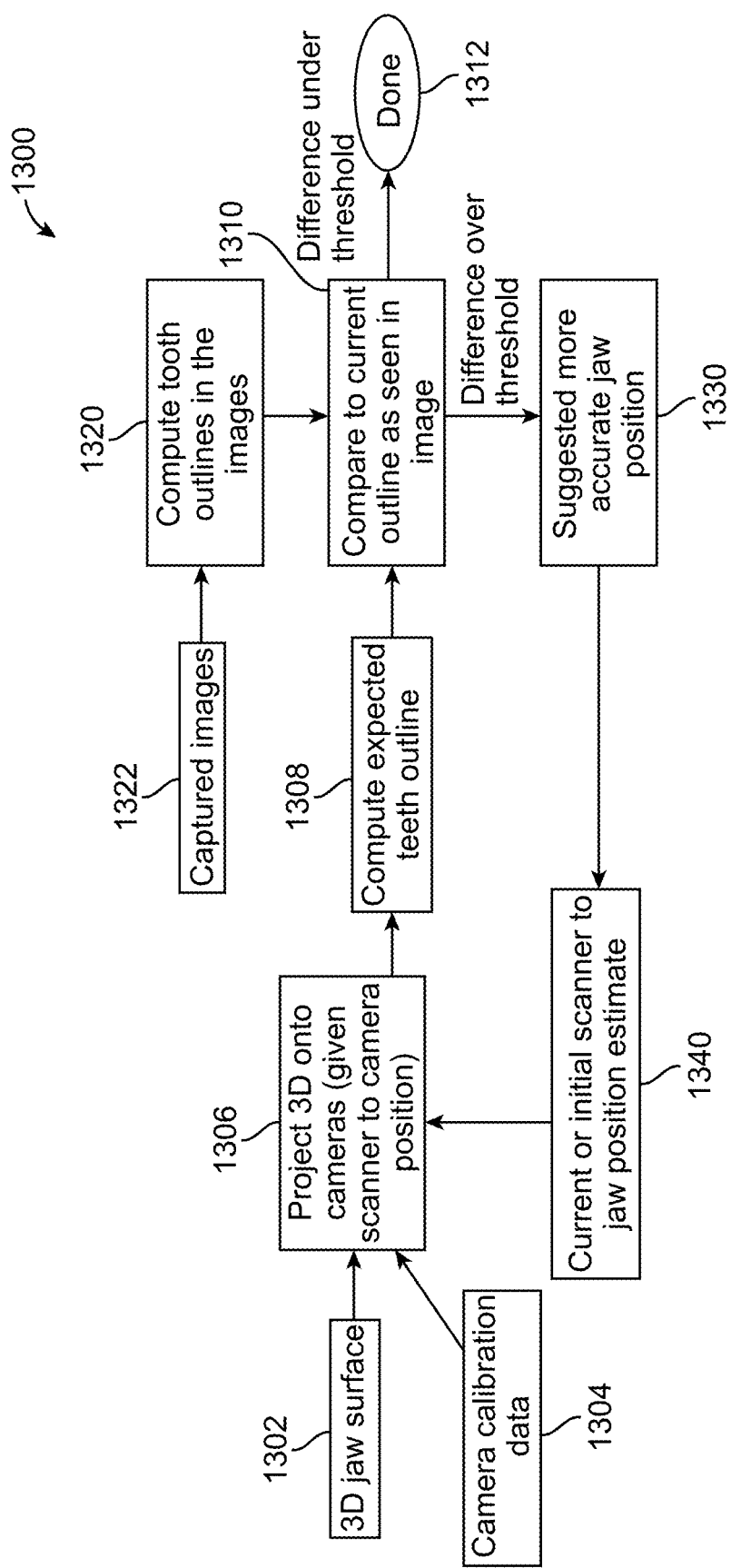
FIG. 11 shows a flow diagram for using two-dimensional to three-dimensional projection of tooth features for feature identification and registering images, in accordance with some embodiments.

With reference to FIGS. 10 and 11, a method for using less stable or unstable surface features with two-dimensional images of the patient's dentition for aligning and determining the relative positions of a patient's upper and lower jaw is depicted. Less stable or unstable surface features may be less stable or unstable for multiple reasons. For example, in some embodiments, less stable surface features may appear to be in different or difficult to determine spatial positions based on the angle at which the features are imaged. A patient's teeth which may have relatively flat and featureless surfaces may be such less stable or unstable features. Method 1300 may be used to determine the relative position of a patient's jaw 1210 based on 2D images 1200 of the patient's jaw. At block 1306 a 3D model of the patient's upper and/or lower jaw 1302 and camera calibration data 1304 of a camera along with an estimate of the scanner's position and orientation 1340 relative to the patient's jaw may be used to project the 3D jaw surface onto an estimate of the cameras focal plane. At block 1308 the expected tooth outline of the projected 3D model is generated. At block 1320 the outlines 1212 of teeth in the captured two-dimensional images 1322 are computed. The tooth outlines 1212 may be computed using image processing techniques such as edge detection techniques and/or machine learning or other techniques for determining the shapes and locations of the edges of the patient's teeth within the captured images. At block 1310 the computed expected tooth outline 1212 determined at block 1308 is compared to the computed tooth outlines 1212 in the images determined at block 1320. If the difference between the expected positions and the actual positions is under a threshold, such as an average difference between tooth centers and/or less than a maximum distance, then the positions of the upper and lower jaw are determined and the method proceeds to step 1312 and is finished. If the difference between the location of the teeth computed at block 1320 as compared to the expected tooth outlines computed and 1308 exceeds a threshold then, at block 1330 a more accurate jaw position is suggested.

The difference in positions may be an average difference in the expected center location of each of the patient's teeth between the 2D image in the projected 3D image. In some embodiments, the difference may be a sum of the difference in the expected center location of each of the patient's teeth. In some embodiments other methods may be used to determine a difference between the computed tooth outlines from the 2D images at block 1302 and the computed expected tooth outlines from block 1308.

Any known algorithm for iteratively converging on the solution may be used. For example, an affine transformation variation of the iterative closest point algorithm may be used to suggest a new jaw-to-scanner position 1340 use in a second or next step of the iterative method 1300.

This method 1300 may be repeated for each frame in the series of 2D images of the upper and lower jaws of the patient captured at block 130 of method 100 to determine the relative positions of the upper 3D jaw and lower 3D jaw at block 150 of method 100.

Figure 14A:
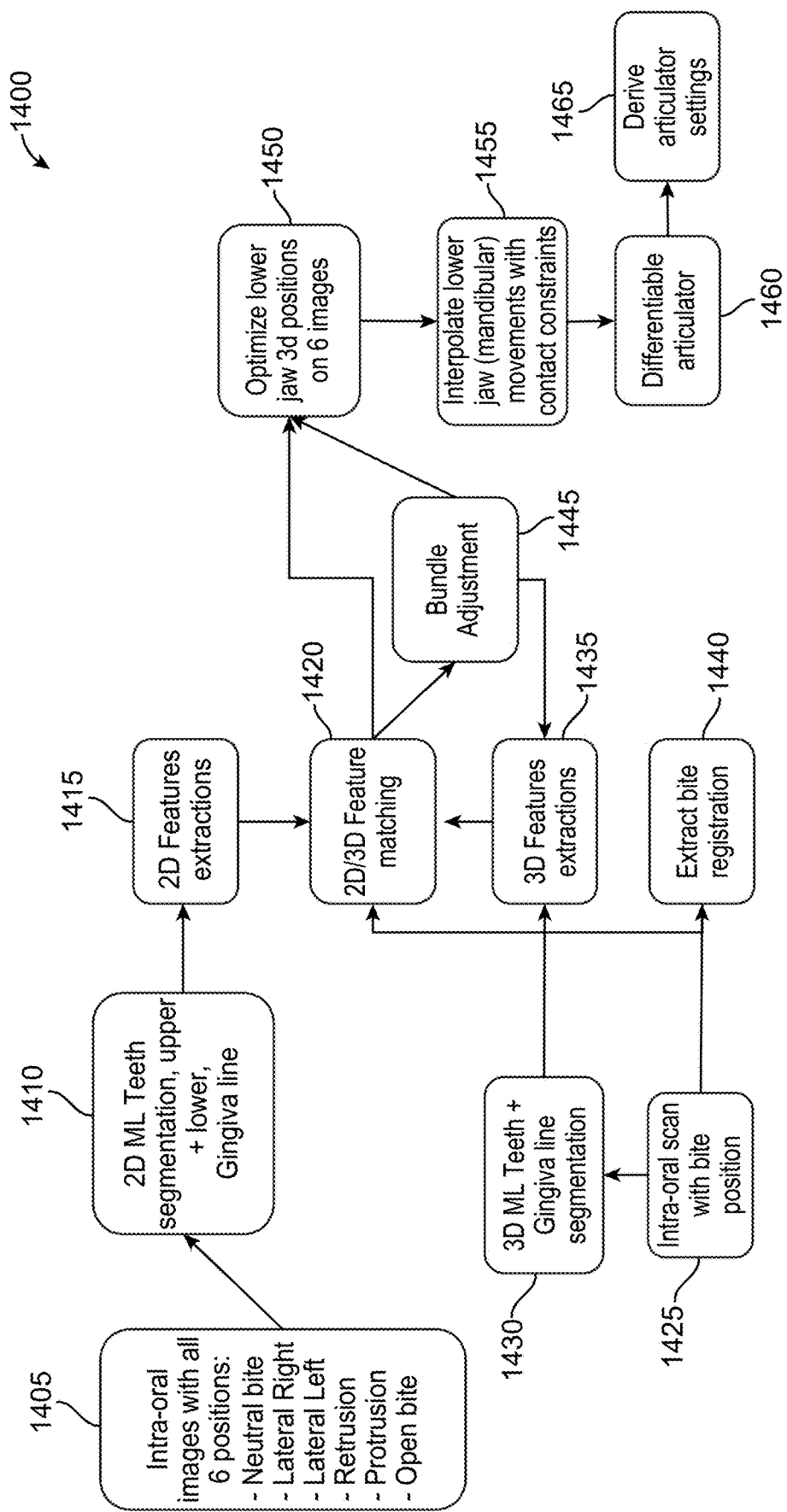
FIG. 14A shows a flow diagram for a method for generating a dynamic occlusion model of a patient's dentition, in accordance with some embodiments.

FIG. 14A shows a flow diagram for a method 1400 for generating a dynamic occlusion model of lower jaw dynamics of a patient's dentition from six images of a patient's dentition with cheek retractors.

At block 1405 intra-oral images of the patient's dentition are generated. The images of the patient's intraoral cavity 1512 may be captured while a patient wears a cheek retractor 1514, such as a rubber cheek retractor. The images may be received from an extraoral imaging device, or other dental imaging system, such as imaging device 260. In some embodiments, the extraoral aiming device may be a camera on a portable device, such as a smartphone. In order to determine the articulation movements of the patient's dentition, the images may include six images of the patient's dentition, each image being captured while the patient is their lower jaw in different positions. The different positions may aid in determining the close contact articulation of the patient's dentition. Dental close contact articulation refers to the way in which the upper and lower teeth come into contact or fit together when the jaws are closed. Achieving proper dental close contact articulation is provides for optimal oral function, comfort, and overall oral health for the patient.

When the teeth come together during the closing of the jaws, they should make simultaneous and harmonious contact. Ideally, all the teeth should touch evenly, distributing the biting forces across the dental arches. This even contact allows for efficient chewing, speaking, and swallowing, as well as maintaining the stability and health of the teeth and supporting structures.

Figure 15:
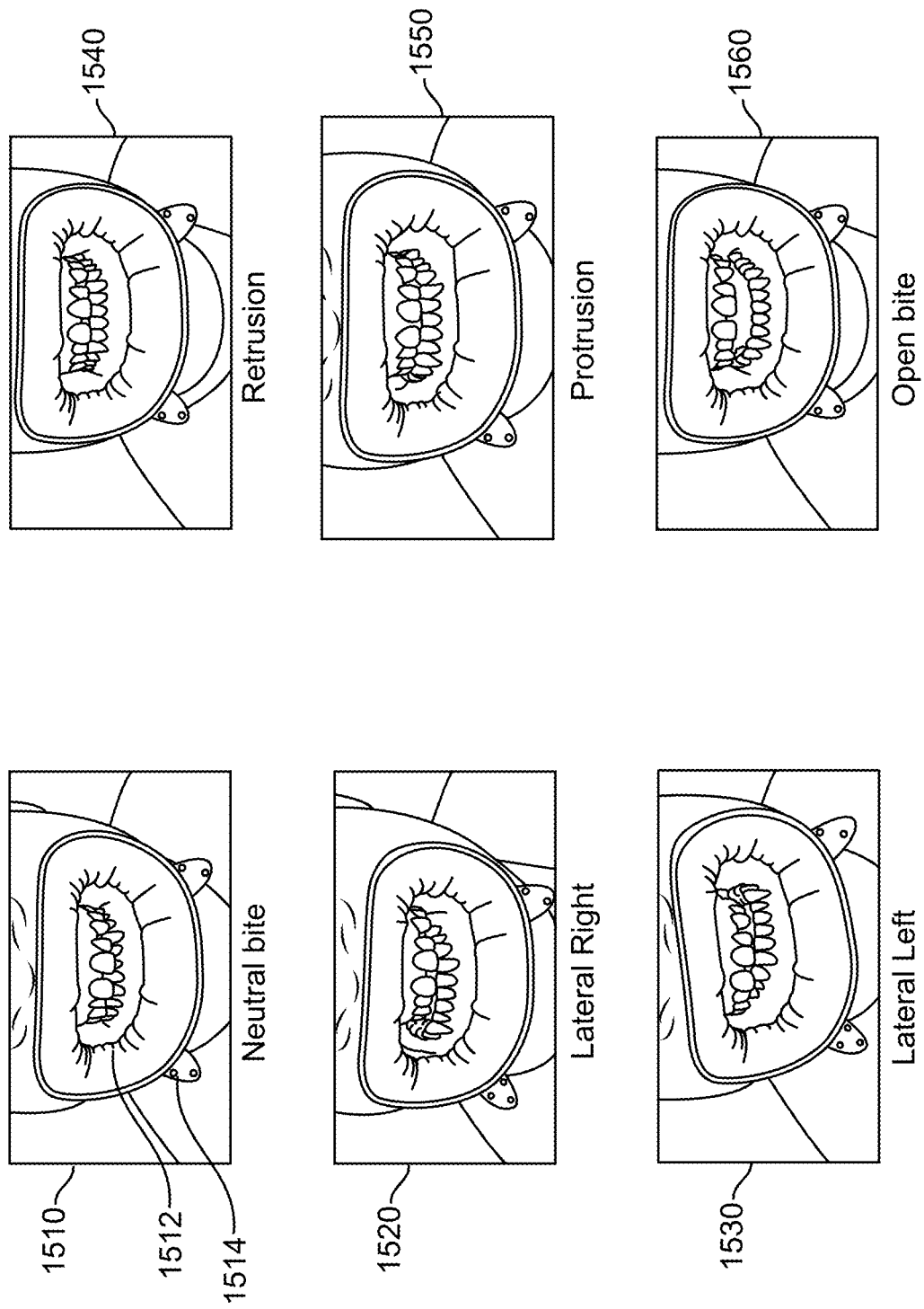
FIG. 15 shows images captured at various jaw positions, in accordance with some embodiments.

FIG. 15 shows images captured at various jaw positions. The six positions are the natural bite 1510, the lateral right 1520, the lateral left 1530, retrusion 1540, protrusion 1550, and opened bite 1560. The natural bite 1510 of the upper and lower jaw refers to the way in which the teeth of the upper and lower dental arches come together when the jaws are in their relaxed, resting position. It represents the habitual or physiologically stable position of the jaws and teeth, also known as the centric occlusion or the bite of maximum intercuspation.

For the left lateral bite image 1520, the patient moves their lower jaw to the left of their upper jaw while in occlusion. Lateral left bite, also known as left lateral occlusion or left lateral excursion, refers to the movement of the lower jaw (mandible) to the left side during chewing or any sideways motion. It describes the contact and alignment of the upper and lower teeth when the lower jaw moves laterally or towards the left side.

During a lateral left bite, the lower teeth on the left side come into contact with the corresponding upper teeth on the left side. This contact occurs while the opposing teeth on the right side maintain a disocclusion or separation to avoid interference during the lateral movement.

For the right lateral bite image 1530, the patient moves their lower jaw to the right of their upper jaw while in occlusion. Right lateral bite, also known as right lateral occlusion or right lateral excursion, refers to the movement of the lower jaw (mandible) to the right side during chewing or any sideways motion. It describes the contact and alignment of the upper and lower teeth when the lower jaw moves laterally or towards the right side.

During a right lateral bite, the lower teeth on the right side come into contact with the corresponding upper teeth on the right side. This contact occurs while the opposing teeth on the left side maintain a disocclusion or separation to avoid interference during the lateral movement.

In the retrusion image 1540 the patient retracts their lower jaw inwards or towards the neck while the teeth are in occlusion. Retrusion occlusion, also known as retruded contact position (RCP) or centric relation (CR), refers to the specific position of the mandible when it is in its most retruded or posteriorly positioned relationship to the maxilla (upper jaw).

Retrusion occlusion is often considered a reference point in dentistry and is used for various dental procedures, including the fabrication of dental restorations, occlusal adjustments, and the evaluation of occlusion. It is distinct from the habitual bite or centric occlusion, discussed above, and is determined by the anatomical relationship of the temporomandibular joints, muscles, and teeth.

In the protrusion image 1550 the patient extends their lower jaw outwards or away the neck while the teeth are in occlusion. Protrusion occlusion, also known as protrusive contact position or protrusive interocclusal position, refers to the position of the mandible when it is protruded or moved forward from the retruded contact position. It represents the relationship between the upper and lower teeth when the lower jaw is in its most advanced position.

Protrusion occlusion provides information about the functional contact between the upper and lower teeth during forward jaw movements. Understanding and evaluating protrusion occlusion is used for diagnosing and treating various dental conditions, including malocclusions, temporomandibular joint disorders (TMDs), and the fabrication of dental restorations.

In the open bite image 1560, the patient's lower jaw is open relative to their upper jaw. An open bite refers to a jaw position in which there mandible is displaced vertically lower to cause separation, such as no contact, between the upper and lower jaws.

Referring back to FIG. 14A, at block 1410 the teeth in the images captured at block 1405 are segmented to generate segmented tooth data. The teeth may be segmented by the segmentation module 212. The segmentation module 212 may segment the teeth using a machine learning model trained with tagged or labeled images of teeth. Tooth segmentation of a 2D image may include determining which teeth are in the image and/or which pixels in the image correspond to each of the teeth. The shape, area, edge, or outline of the teeth in the image may be determined during tooth segmentation. In some embodiments, the gingiva, such as the gingiva line may also be segmented from the image. The gingiva may be segmented for each tooth and each gingiva segment may be assigned to a corresponding tooth of the patient.

Figure 16:
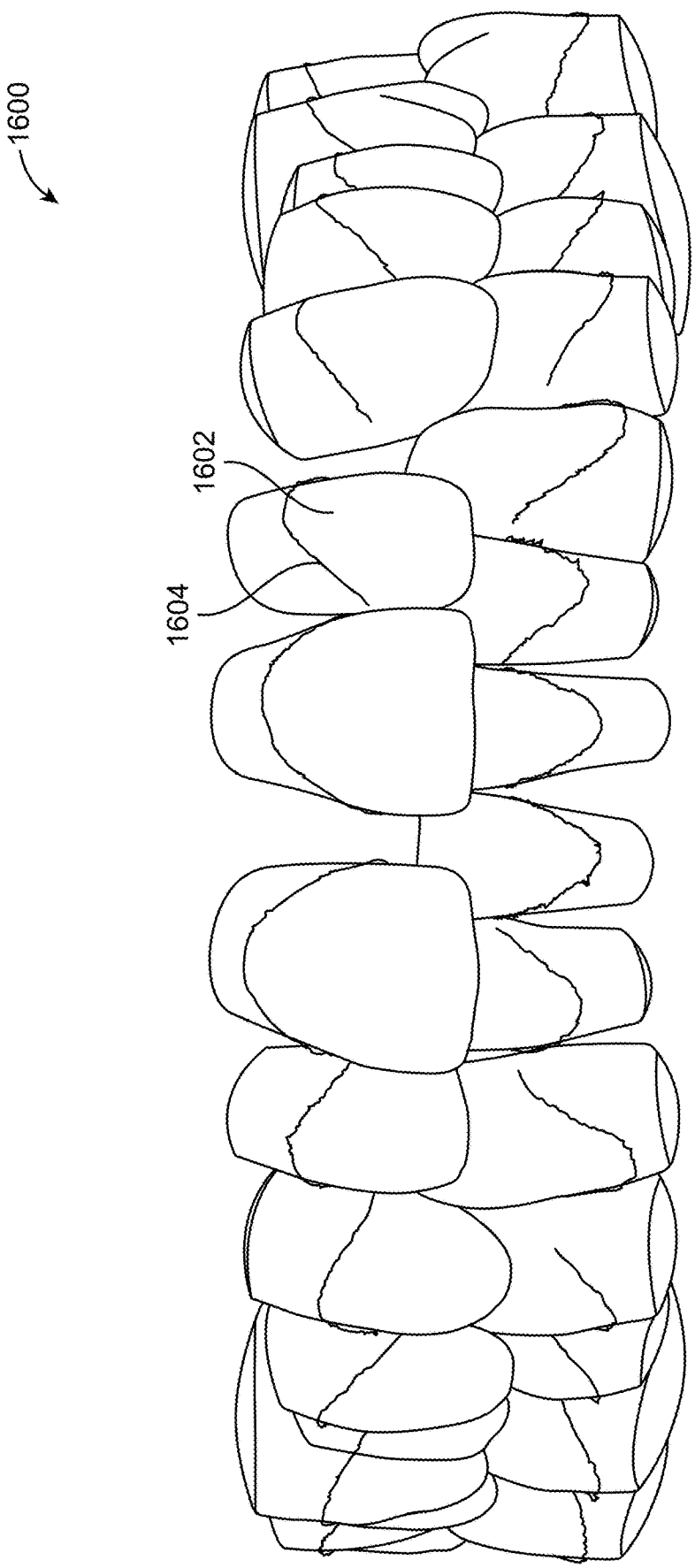
FIG. 16 shows 3D segmentation of a digital model of the patient's detention, in accordance with some embodiments

FIG. 16 depicts a segmented model of the dentition 1600 that includes a segmented gingiva line 1604 and segmented teeth 1602.

At block 1415, 2D features are extracted from the segmented tooth data. The 2D features may include the center points of each tooth. The center points may include the centroid of the tooth in the captured image. The 2D features may also include the contours or edges of the teeth in the image.

At block 1425 intra-oral 3D scan data of the patient's dentition is generated. The 3D scan data may include a 3D model of the intraoral cavity of the patient and may include the teeth and gingiva of the patient. The images may be received from a scanner, such as scanner 250 and may be carried out by the 3D scanning module 204.

At block 1430 the teeth in the 3D scan data captured at block 1425 are segmented to generate segmented tooth data. The teeth may be segmented by the segmentation module 212. The segmentation module 212 may segment the teeth using a machine learning model trained with tagged or labeled 3D images or scan data of teeth. Tooth segmentation of a 3D image may include determining which teeth are in the 3D scan data and/or which locations in the scan data (such as point cloud points) correspond to each of the teeth and then generating a 3D model of each individual tooth in the dentition. In some embodiments, the gingiva, such as the gingiva line may also be segmented from the 3D scan data. The gingiva may be segmented for each tooth and each gingiva segment may be assigned to a corresponding tooth of the patient.

In some embodiments, the upper and lower arches of the patient are scanned separating and an upper arch model is built from the upper arch 3D scan data and a lower arch model is build from the lower arch 3D scan data. In some embodiments, the teeth of the patient may be scanned while in occlusion to align the upper and lower arches in occlusion in order to determine the occlusal relationship, such as tooth contacts, between the upper and lower teeth. At block 1440, bite registration data, including tooth contacts and occlusal distances or an occlusal map (a map for each location on the teeth of the distance between corresponding teeth in occlusion) may be extracted from the intra-oral scan data.

At block 1435 3D features are extracted from the segmented tooth data. The 3D features may include the center points of each tooth. The center points may include the centroid of each tooth as shown in a 2D projection of a 3D model of the segmented teeth. The 3D features may also include the contours or edges of each tooth as shown in a 2D projection of a 3D model of the segmented teeth. The projection may be based on a virtual camera focal length, field of view, and/or distance between the virtual camera and the teeth. In some embodiments, the projection may be made based on data from the 2D images. For example, the 2D images may include meta data, such as the focal length and focus distance, which may be used for projecting the 3D image. For example, the virtual camera may have the focal length of the focal length in the 2D images and the distance between the virtual camera and the 3D model may be the focus distance in the meta data of the 2D images.

At block 1420 the segmented 3D teeth are matched with the segmented 2D teeth in each of the intra-oral images. In some embodiments, the segmented teeth are aligned based on the extracted 2D features and the extracted 3D features. Aligning the extracted 3D features with the extracted 2D features may include attempting to align the center points of each tooth, the contours of each tooth, the edges of each tooth, and/or the gingiva associated with each tooth in the 3D data with the corresponding features in the 2D data.

Matching the segmented 3D teeth are matched with the segmented 2D teeth in each of the intra-oral images may be performed for an entire arch at once, such as for the upper arch separately from the lower arch.

Aligning a whole arch may be contrasted with aligning each tooth in the segmented 3D data with the location of the corresponding tooth in the 2D data on a tooth by tooth basis. When aligning on a tooth-by-tooth basis, the relative positions of the teeth in the arch may change. However, when aligning an entire arch the relative positions of the teeth may not change. For example, when the 2D images are captured close in time with the 3D scan or otherwise without tooth movement between capturing the 2D images and the 3D scan, then an arch may be considered static. Aligning the data may include finding a best fit of the 3D features with the visible 2D features.

If the alignment is successful, the process may proceed to block 1450. If the alignment is not successful, then the process may proceed to block 1445.

At block 1445, a bundle adjustment may be performed on the 3D segmented data. Bundle adjustment may include making adjustments to the projection of the 3D data and/or 3D features on the 2D image plane. The adjustments may include adjusting one or more of the focal length of the virtual camera, the field of view of the virtual camera, the distance between the virtual camera and the 3D model of the teeth, and/or changes to the optical or lens distortion of the projection. For example, if it is determined that that virtual camera was too close or to far from the 3D model, then the distance may be increased or decreased accordingly. Similarly, if the projection is wide or too narrow, the field of view or the focal length may be changed.

After the bundle adjustment is completed, the process may proceed to block 1435 for feature extraction and then to block 1420 for feature matching again. The process may iterate through blocks 1445, 1435, and 1420 until the features are matched within an acceptable margin of error.

At block 1450, the optimized lower jaw positions relative to the upper jaw for each of the six images from block 1420 are saved. These may be 3D models of the positions or data that represented the relative positions of the jaws in 3D space.

At block 1455, the jaw movements between each of the positions of the optimized lower jaw positions relative to the upper jaw may be interpolated and adjusted based on contact constraints. For example, to simulate the movement of the lower jaw from the right to the left or from the front to the back, the lower jaw may be incrementally moved from left to right or front to back. In each incremental position, the 3D models of the teeth of the lower and upper arch are checked to put them in contact and for any penetration of the models of the teeth of the lower jaw into the teeth of the upper jaw. Since the teeth are solid in real life, they cannot penetrate one another. If a penetration is detected, the lower jaw may be moved away from the upper jaw until the teeth contact without penetration. In some embodiments, a minimal amount of penetration may be allowed, such as less than 0.1 mm of penetration. The interpolation may be between lateral left and neutral bite, later right and neutral bite, retraction and neutral bite, and protrusion and neutral bite.

Figure 14B:
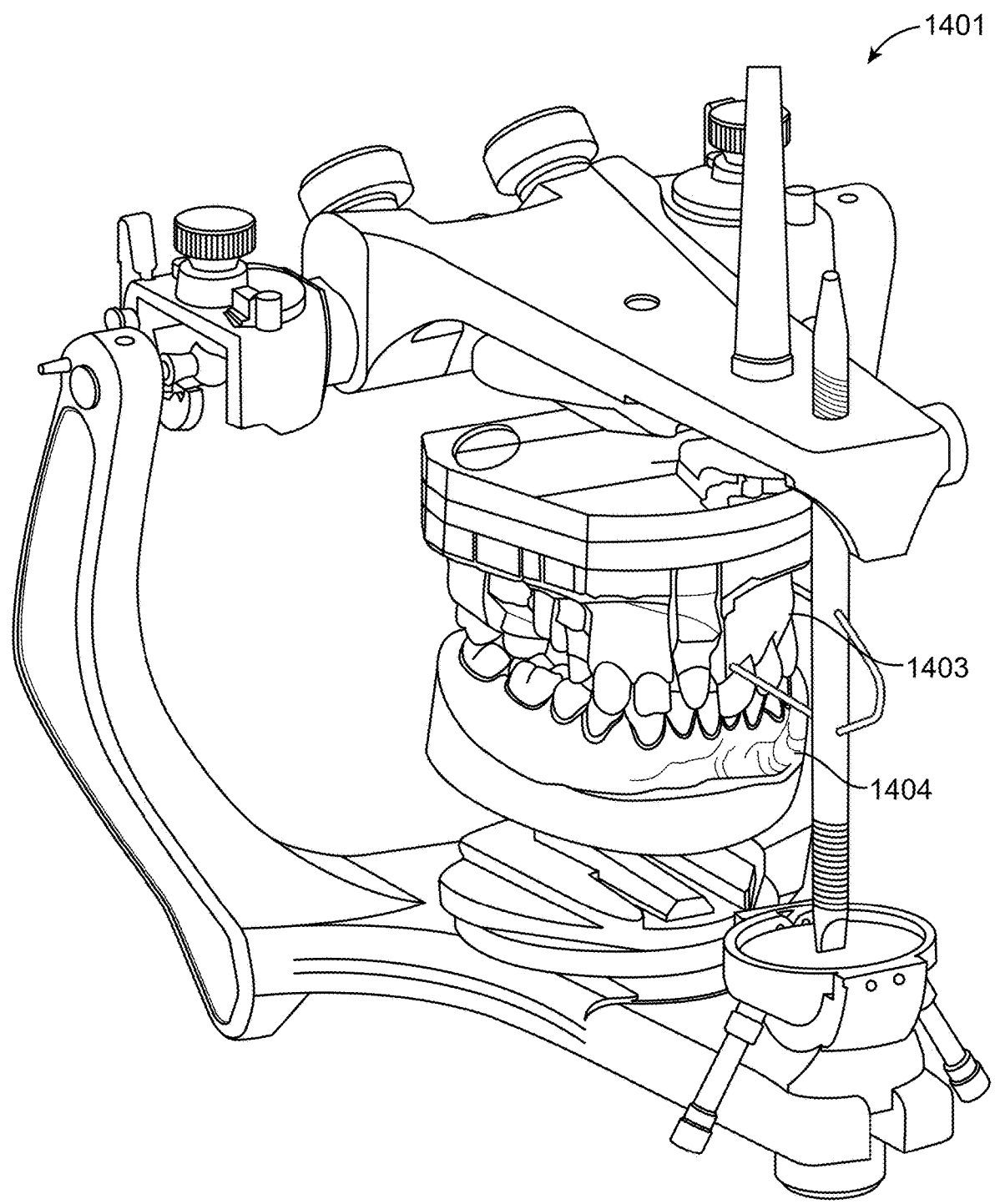
FIG. 14B a virtual articular, in accordance with some embodiments.

At block 1460 the interpolated movement of the upper arch 1403 and lower arch 1404 may be used in a virtual articular, such as the virtual articulator 1401 shown in FIG. 14B. The movement of the lower arch 1404 relative to the upper arch 1403 within the articular may be used to derive the articular settings output at block 1465. The articular settings may include the range of motion of the patient's condyle, which is the surface for articulation with the articular disk of the temporomandibular joint and play a role in defining the patient's jaw movements. These settings may be used for treatment planning and progress tracking. For example, a crown or bridge may be placed on the patient's arches using the 3D models and the derived articular settings to determine the jaw to jaw tooth contacts. In some embodiments, a patient's teeth may be captured with 2D images during orthodontic treatment to track the patient's treatment progress. The individual teeth in the 3D data may be aligned with the teeth in the 2D progress tracking images to generate a model of the patient's upper and lower arch during treatment.

The optimized lower jaw position and interpolated lower jaw positions may be used to inverse articulation motion in an articular simulation to determine and extract articulator settings such as Benett angles, condylar angles, condylar positions.

Patient specific neural networks may be trained from generated articulator movements with different settings. Once the neural network is trained, the patient specific trained neural network may be used to estimate the articulator settings. This approach could be extended to non-patient specific training and registered jaw scans.

The articulator in the simulation may be a constrained non-linear least square problem, this would take into account occlusal collisions. The parameters optimized through this would correspond to the articulator settings.

The process may include generating from the virtual articulator (starting from average values) and the 3d jaw scan, the radial basis function subspace. Then generating from the lower jaw dynamics and 3d jaw scan the RBF subspace.

Using Radial basis function from the virtual articular and radial basis function from the lower jaw dynamics and the 3D jaw space, the articulator settings are derived.

This model may be used in a virtual articular with the derived settings from block 1465 to perform analysis of the patient's bite during treatment.

In some embodiments, at block 1460, the dynamic occlusion of the upper and lower teeth and jaws may be modeled based on the upper and lower jaw transform from block 1450 and the interpolation at block 1455. The modeling may result in one or more occlusal maps for different arrangements of the upper and lower jaw. The modeling and the resulting occlusal maps may be used during treatment planning. For example, the upper or lower arch of the patient may be modified with a crown and bridge or other prosthetic or the teeth or jaw position may be changed based on a proposed orthodontic treatment. These modifications and changes to the upper and lower arch may then be modeled based on the upper and lower jaw transform, taking into account the change in contacts between the upper and lower arches caused by the changed tooth positions or prosthetics.

Figure 17:
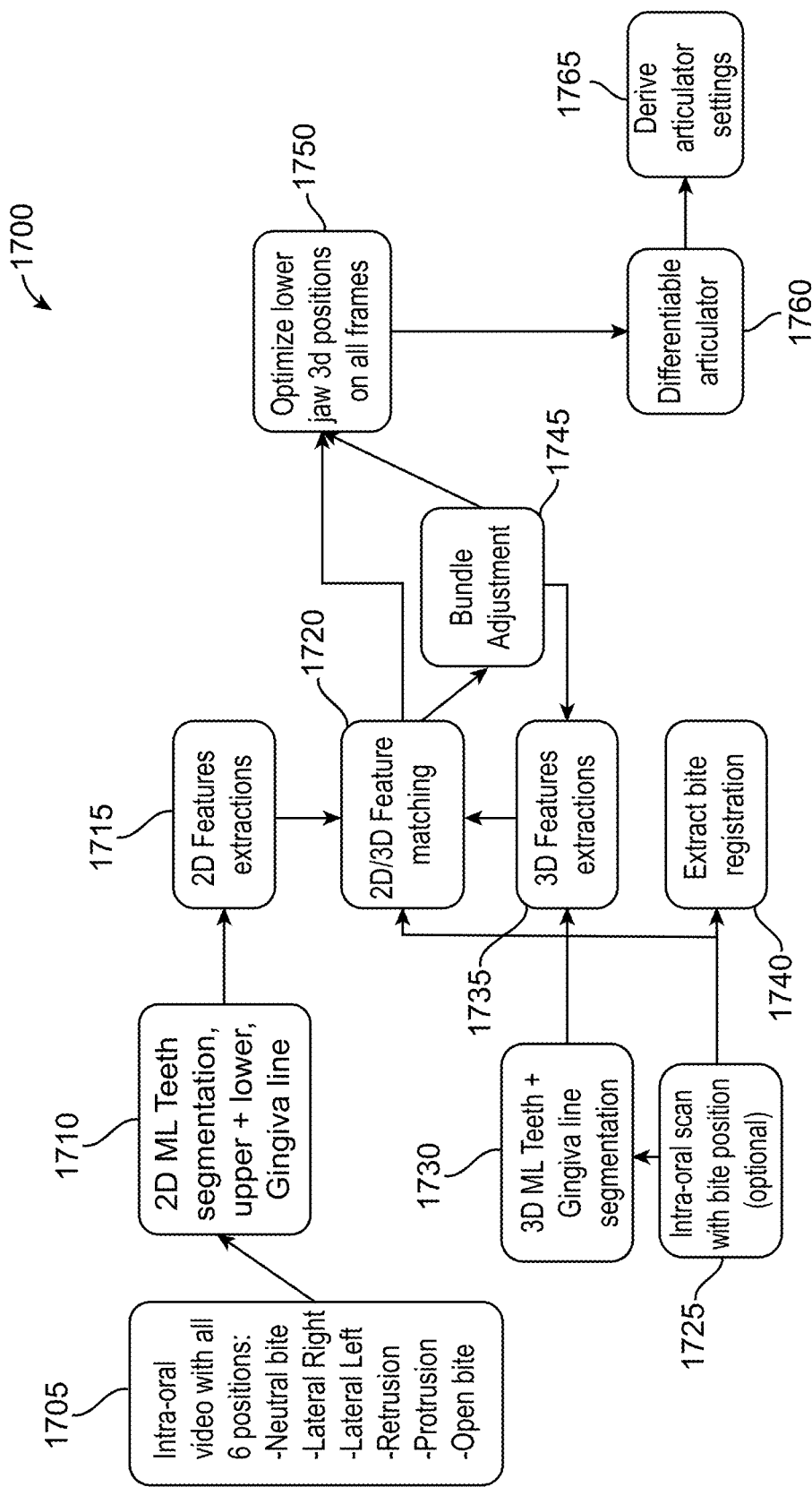
FIG. 17 shows a flow diagram for a method for generating a dynamic occlusion model of a patient's dentition, in accordance with some embodiments.

FIG. 17 shows a flow diagram for a method 1700 for generating a dynamic occlusion model of lower jaw dynamics of a patient's dentition from video of a patient's dentition with cheek retractors.

At block 1705 intra-oral video of the patient's dentition are generated. The video of the patient's intraoral cavity may be captured while a patient wears a cheek retractor, such as a rubber cheek retractor. The video may be received from an extra oral imaging device, or other dental imaging system, such as imaging device 260. In order to determine the articulation movements of the patient's dentition, the video may be recorded or otherwise generated as the patient moves their detention in occlusion through the five occlusion positions plus the open bite, as shown and described with reference to FIG. 15. The movement through the positions may aid in determining the close contact articulation of the patient's dentition.

At block 1710 the teeth in the video captured at block 1705 are segmented to generate segmented tooth data. In some embodiments, the teeth in each frame of the video or in a plurality of frames in the video between each of the six positions are extracted. The teeth may be segmented by the segmentation module 212. The segmentation module 212 may segment the teeth using a machine learning model trained with tagged or labeled images or video of teeth. Tooth segmentation of a 2D video may include determining which teeth are in the video and/or which pixels in the video correspond to each of the teeth. The shape, area, edge, or outline of the teeth in the video or each frame of the video may be determined during tooth segmentation. In some embodiments, the gingiva, such as the gingiva line may also be segmented from the video. The gingiva may be segmented for each tooth and each gingiva segment may be assigned to a corresponding tooth of the patient.

At block 1715, 2D features are extracted from the segmented tooth data. The 2D features may include the center points of each tooth in each frame of the video. The center points may include the centroid of the tooth in the captured image. The 2D features may also include the contours or edges of the teeth in each frame of the video.

At block 1725 intra-oral 3D scan data of the patient's dentition is generated. The 3D scan data may include a 3D model of the intraoral cavity of the patient and may include the teeth and gingiva of the patient. The images may be received from a scanner, such as scanner 250 and may be carried out by the 3D scanning module 204.

At block 1730 the teeth in the 3D scan data captured at block 1725 are segmented to generate segmented tooth data. The teeth may be segmented by the segmentation module 212. The segmentation module 212 may segment the teeth using a machine learning model trained with tagged or labeled 3D images or scan data of teeth. Tooth segmentation of a 3D image may include determining which teeth are in the 3D scan data and/or which locations in the scan data (such as point cloud points) correspond to each of the teeth and then generating a 3D model of each individual tooth in the dentition. In some embodiments, the gingiva, such as the gingiva line may also be segmented from the 3D scan data. The gingiva may be segmented for each tooth and each gingiva segment may be assigned to a corresponding tooth of the patient.

In some embodiments, the upper and lower arches of the patient are scanned separating and an upper arch model is built from the upper arch 3D scan data and a lower arch model is build from the lower arch 3D scan data. In some embodiments, the teeth of the patient may be scanned while in occlusion to align the upper and lower arches in occlusion in order to determine the occlusal relationship, such as tooth contacts, between the upper and lower teeth. At block 1740, bite registration data, including tooth contacts and occlusal distances or an occlusal map (a map for each location on the teeth of the distance between corresponding teeth in occlusion) may be extracted from the intra-oral scan data.

At block 1735 3D features are extracted from the segmented tooth data. The 3D features may include the center points of each tooth. The center points may include the centroid of each tooth as shown in a 2D projection of a 3D model of the segmented teeth. The 3D features may also include the contours or edges of each tooth as shown in a 2D projection of a 3D model of the segmented teeth. The projection may be based on a virtual camera focal length, field of view, and/or distance between the virtual camera and the teeth. In some embodiments, the projection may be made based on data from the 2D video. For example, the 2D video may include meta data, such as the focal length and focus distance, which may be used for projecting the 3D image. For example, the virtual camera may have the focal length of the focal length in the 2D video and the distance between the virtual camera and the 3D model may be the focus distance in the meta data of the 2D video.

At block 1720 the segmented 3D teeth are matched with the segmented 2D teeth in each frame of the 2D video. In some embodiments, the segmented teeth are aligned based on the extracted 2D features and the extracted 3D features. Aligning the extracted 3D features with the extracted 2D features may include attempting to align the center points of each tooth, the contours of each tooth, the edges of each tooth, and/or the gingiva associated with each tooth in the 3D data with the corresponding features in the 2D data.

Matching the segmented 3D teeth are matched with the segmented 2D teeth in each of the frames of the 2D video may be performed for an entire arch at once, such as for the upper arch separately from the lower arch.

Aligning a whole arch may be contrasted with aligning each tooth in the segmented 3D data with the location of the corresponding tooth in the 2D data on a tooth by tooth basis. When aligning on a tooth-by-tooth basis, the relative positions of the teeth in the arch may change. However, when aligning an entire arch the relative positions of the teeth may not change. For example, when the 2D video is captured close in time with the 3D scan or otherwise without tooth movement between capturing the 2D video and the 3D scan, then an arch may be considered static. Aligning the data may include finding a best fit of the 3D features with the visible 2D features.

If the alignment is successful, the process may proceed to block 1750. If the alignment is not successful, then the process may proceed to block 1745.

At block 1745, a bundle adjustment may be performed on the 3D segmented data. Bundle adjustment may include making adjustments to the projection of the 3D data and/or 3D features on the 2D image plane of the frames of the 2D video. The adjustments may include adjusting one or more of the focal length of the virtual camera, the field of view of the virtual camera, the distance between the virtual camera and the 3D model of the teeth, and/or changes to the optical or lens distortion of the projection. For example, if it is determined that that virtual camera was too close or too far from the 3D model, then the distance may be increased or decreased accordingly. Similarly, if the projection is wide or too narrow, the field of view or the focal length may be changed.

After the bundle adjustment is completed, the process may proceed to block 1735 for feature extraction and then to block 1720 for feature matching again. The process may iterate through blocks 1745, 1735, and 1720 until the features are matched within an acceptable margin of error.

At block 1750, the optimized lower jaw positions relative to the upper jaw for each of the frames of the 2D video from block 1720 are saved. These may be 3D models of the positions or data that represented the relative positions of the jaws in 3D space.

Because the video includes images of the jaw as it moves between each of the position in occlusion, the process 1700 may not include interpolation, such as described at block 1455 of process 1400.

In some embodiments, at block 1760, the dynamic occlusion of the upper and lower teeth and jaws may be modeled based on the upper and lower jaw transform from block 1750. The modeling may result in one or more occlusal maps for different arrangements of the upper and lower jaw. The modeling and the resulting occlusal maps may be used during treatment planning. For example, the upper or lower arch of the patient may be modified with a crown and bridge or other prosthetic or the teeth or jaw position may be changed based on a proposed orthodontic treatment. These modifications and changes to the upper and lower arch may then be modeled based on the upper and lower jaw transform, taking into account the change in contacts between the upper and lower arches caused by the changed tooth positions or prosthetics.

At block 1760 the movement of the upper arch and lower arch captured in the video and the corresponding 3D models of the positions or data that represent the relative positions of the jaws in 3D space may be used in a virtual articular, such as the virtual articulator 1401 shown in FIG. 14B. The movement of the lower arch 1404 relative to the upper arch 1403 within the articular may be used to derive the articular settings output at block 1765. The articular settings may include the range of motion of the patient's condyle, which is the surface for articulation with the articular disk of the temporomandibular joint and play a role in defining the patient's jaw movements. These settings may be used for treatment planning and progress tracking. For example, a crown or bridge may be placed on the patient's arches using the 3D models and the derived articular settings to determine the jaw to jaw tooth contacts. In some embodiments, a patient's teeth may be captured with 2D video during orthodontic treatment to track the patient's treatment progress. The individual teeth in the 3D data may be aligned with the teeth in the 2D progress tracking images or video to generate a model of the patient's upper and lower arch during treatment. This model may be used in a virtual articular with the derived settings from block 1765 to perform analysis of the patient's bite during treatment.

Figure 18:
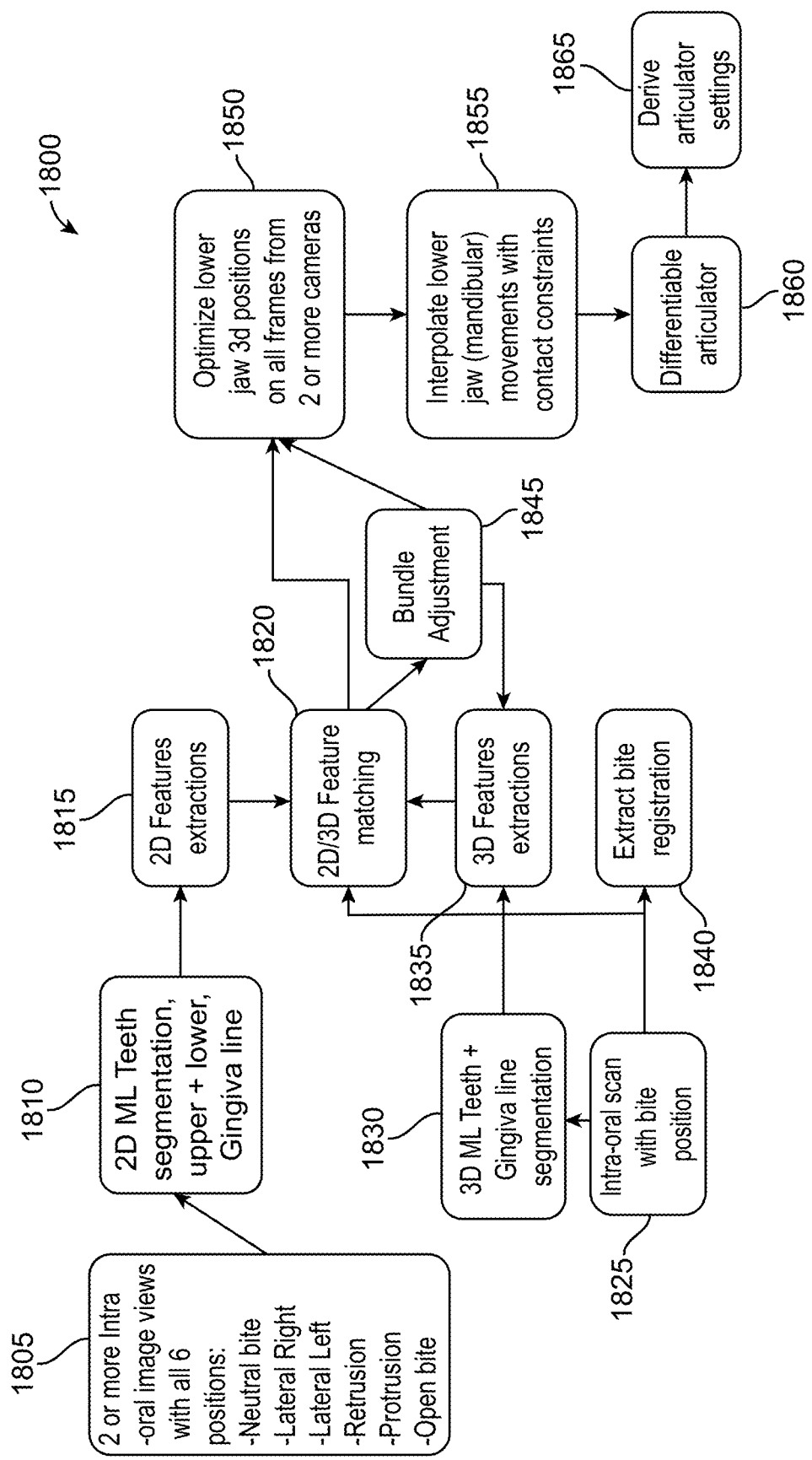
FIG. 18 shows a flow diagram for a method for generating a dynamic occlusion model of a patient's dentition, in accordance with some embodiments.

FIG. 18 shows a flow diagram for a method 1800 for generating a dynamic occlusion model of lower jaw dynamics of a patient's dentition from images of a patient's dentition with cheek retractors taken from multiple angles at the same time, such as multiple cameras at different positions.

At block 1805 intra-oral images of the patient's dentition are generated. The images of the patient's intraoral cavity may be captured while a patient wears a cheek retractor 1514, such as a rubber cheek retractor. The images may be received from an extra oral imaging device, or other dental imaging system, such as imaging device 260. In order to determine the articulation movements of the patient's dentition, multiple images, each from a different camera position or location are taken of each of the patient's dentition at the same time while the patient holds the position of their lower jaw in each of multiple different positions. The positions may be one or more of the six positions shown and described with respect to FIG. 15. For example, multiple images for different locations may be taken at the same time while the patient holds their jaw the a first position, then multiple images for different locations may be taken at the same time while the patient holds their jaw the a second position, and so on. The different positions may aid in determining the close contact articulation of the patient's dentition. Dental close contact articulation refers to the way in which the upper and lower teeth come into contact or fit together when the jaws are closed. Achieving proper dental close contact articulation is provides for optimal oral function, comfort, and overall oral health for the patient. In some embodiments, the images for each jaw position may be captured within less than 500 ms of each other. In some embodiments, the images for each jaw position may be captured within less than 250 ms or less than 100 ms of each other.

When the teeth come together during the closing of the jaws, they should make simultaneous and harmonious contact. Ideally, all the teeth should touch evenly, distributing the biting forces across the dental arches. This even contact allows for efficient chewing, speaking, and swallowing, as well as maintaining the stability and health of the teeth and supporting structures.

At block 1810 the teeth in the images captured at block 1805 are segmented to generate segmented tooth data. The teeth may be segmented by the segmentation module 212. The segmentation module 212 may segment the teeth using a machine learning model trained with tagged or labeled images of teeth. Tooth segmentation of a 2D image may include determining which teeth are in the image and/or which pixels in the image correspond to each of the teeth. The shape, area, edge, or outline of the teeth in the image may be determined during tooth segmentation. In some embodiments, the gingiva, such as the gingiva line may also be segmented from the image. The gingiva may be segmented for each tooth and each gingiva segment may be assigned to a corresponding tooth of the patient.

At block 1815, 2D features are extracted from the segmented tooth data. The 2D features may include the center points of each tooth. The center points may include the centroid of the tooth in the captured image. The 2D features may also include the contours or edges of the teeth in the image.

At block 1825 intra-oral 3D scan data of the patient's dentition is generated. The 3D scan data may include a 3D model of the intraoral cavity of the patient and may include the teeth and gingiva of the patient. The images may be received from a scanner, such as scanner 250 and may be carried out by the 3D scanning module 204.

At block 1830 the teeth in the 3D scan data captured at block 1825 are segmented to generate segmented tooth data. The teeth may be segmented by the segmentation module 212. The segmentation module 212 may segment the teeth using a machine learning model trained with tagged or labeled 3D images or scan data of teeth. Tooth segmentation of a 3D image may include determining which teeth are in the 3D scan data and/or which locations in the scan data (such as point cloud points) correspond to each of the teeth and then generating a 3D model of each individual tooth in the dentition. In some embodiments, the gingiva, such as the gingiva line may also be segmented from the 3D scan data. The gingiva may be segmented for each tooth and each gingiva segment may be assigned to a corresponding tooth of the patient.

In some embodiments, the upper and lower arches of the patient are scanned separating and an upper arch model is built from the upper arch 3D scan data and a lower arch model is build from the lower arch 3D scan data. In some embodiments, the teeth of the patient may be scanned while in occlusion to align the upper and lower arches in occlusion in order to determine the occlusal relationship, such as tooth contacts, between the upper and lower teeth. At block 1840, bite registration data, including tooth contacts and occlusal distances or an occlusal map (a map for each location on the teeth of the distance between corresponding teeth in occlusion) may be extracted from the intra-oral scan data.

At block 1835 3D features are extracted from the segmented tooth data. The 3D features may include the center points of each tooth. The center points may include the centroid of each tooth as shown in a 2D projection of a 3D model of the segmented teeth. The 3D features may also include the contours or edges of each tooth as shown in a 2D projection of a 3D model of the segmented teeth. The projection may be based on a virtual camera focal length, field of view, and/or distance between the virtual camera and the teeth. In some embodiments, the projection may be made based on data from the 2D images. For example, the 2D images may include meta data, such as the focal length and focus distance, which may be used for projecting the 3D image. For example, the virtual camera may have the focal length of the focal length in the 2D images and the distance between the virtual camera and the 3D model may be the focus distance in the meta data of the 2D images.

At block 1820 the segmented 3D teeth are matched with the segmented 2D teeth in each of the intra-oral images. In some embodiments, the segmented teeth are aligned based on the extracted 2D features and the extracted 3D features. Aligning the extracted 3D features with the extracted 2D features may include attempting to align the center points of each tooth, the contours of each tooth, the edges of each tooth, and/or the gingiva associated with each tooth in the 3D data with the corresponding features in the 2D data.

Matching the segmented 3D teeth are matched with the segmented 2D teeth in each of the intra-oral images may be performed for an entire arch at once, such as for the upper arch separately from the lower arch.

Aligning a whole arch may be contrasted with aligning each tooth in the segmented 3D data with the location of the corresponding tooth in the 2D data on a tooth by tooth basis. When aligning on a tooth-by-tooth basis, the relative positions of the teeth in the arch may change. However, when aligning an entire arch the relative positions of the teeth may not change. For example, when the 2D images are captured close in time with the 3D scan or otherwise without tooth movement between capturing the 2D images and the 3D scan, then an arch may be considered static. Aligning the data may include finding a best fit of the 3D features with the visible 2D features.

If the alignment is successful, the process may proceed to block 1850. If the alignment is not successful, then the process may proceed to block 1845.

At block 1845, a bundle adjustment may be performed on the 3D segmented data. Bundle adjustment may include making adjustments to the projection of the 3D data and/or 3D features on the 2D image plane. The adjustments may include adjusting one or more of the focal length of the virtual camera, the field of view of the virtual camera, the distance between the virtual camera and the 3D model of the teeth, and/or changes to the optical or lens distortion of the projection. For example, if it is determined that that virtual camera was too close or to far from the 3D model, then the distance may be increased or decreased accordingly. Similarly, if the projection is wide or too narrow, the field of view or the focal length may be changed.

After the bundle adjustment is completed, the process may proceed to block 1835 for feature extraction and then to block 1820 for feature matching again. The process may iterate through blocks 1845, 1835, and 1820 until the features are matched within an acceptable margin of error.

In some embodiments, the 2D features of the teeth may be combined and/or triangulated using each of the views for each jaw position. For example, the center points of the teeth, may be determined for each of the views for each jaw position and then the location in space may be triangulated based on the different camera angles from the different imaging devices. Similarly, tooth edges or contours and the gingival edges or contours gingival edges or contours may be triangulated. In some embodiments, different parts of the gingival edges or contours and the tooth edges and contours may be visible from different camera positions. The data related to the edges and contours may be used combined to form ore complete edges or contours. The data may also be triangulated to determine the location in space of the edges and contours.

At block 1850, the optimized lower jaw positions relative to the upper jaw for each of the six jaw positions and views from block 1820 are saved. These may be 3D models of the positions or data that represented the relative positions of the jaws in 3D space.

At block 1855, the jaw movements between each of the positions of the optimized lower jaw positions relative to the upper jaw may be interpolated and adjusted based on contact constraints. For example, to simulate the movement of the lower jaw from the right to the left or from the front to the back, the lower jaw may be incrementally moved from left to right or front to back. In each incremental position, the 3D models of the teeth of the lower and upper arch are checked to put them in contact and for any penetration of the models of the teeth of the lower jaw into the teeth of the upper jaw. Since the teeth are solid in real life, they cannot penetrate one another. If a penetration is detected, the lower jaw may be moved away from the upper jaw until the teeth contact without penetration. In some embodiments, a minimal amount of penetration may be allowed, such as less than 0.1 mm of penetration. The interpolation may be between lateral left and neutral bite, later right and neutral bite, retraction and neutral bite, and protrusion and neutral bite.

At block 1860 the interpolated movement of the upper arch and lower arch may be used in a virtual articular, such as the virtual articulator shown in FIG. 14B. The movement of the lower arch relative to the upper arch within the articular may be used to derive the articular settings output at block 1865. The articular settings may include the range of motion of the patient's condyle, which is the surface for articulation with the articular disk of the temporomandibular joint and play a role in defining the patient's jaw movements. These settings may be used for treatment planning and progress tracking. For example, a crown or bridge may be placed on the patient's arches using the 3D models and the derived articular settings to determine the jaw to jaw tooth contacts. In some embodiments, a patient's teeth may be captured with 2D images during orthodontic treatment to track the patient's treatment progress. The individual teeth in the 3D data may be aligned with the teeth in the 2D progress tracking images to generate a model of the patient's upper and lower arch during treatment. This model may be used in a virtual articular with the derived settings from block 1865 to perform analysis of the patient's bite during treatment.

In some embodiments, at block 1860, the dynamic occlusion of the upper and lower teeth and jaws may be modeled based on the upper and lower jaw transform from block 1850 and the interpolations at block 1855. The modeling may result in one or more occlusal maps for different arrangements of the upper and lower jaw. The modeling and the resulting occlusal maps may be used during treatment planning. For example, the upper or lower arch of the patient may be modified with a crown and bridge or other prosthetic or the teeth or jaw position may be changed based on a proposed orthodontic treatment. These modifications and changes to the upper and lower arch may then be modeled based on the upper and lower jaw transform, taking into account the change in contacts between the upper and lower arches caused by the changed tooth positions or prosthetics.

Figure 19:
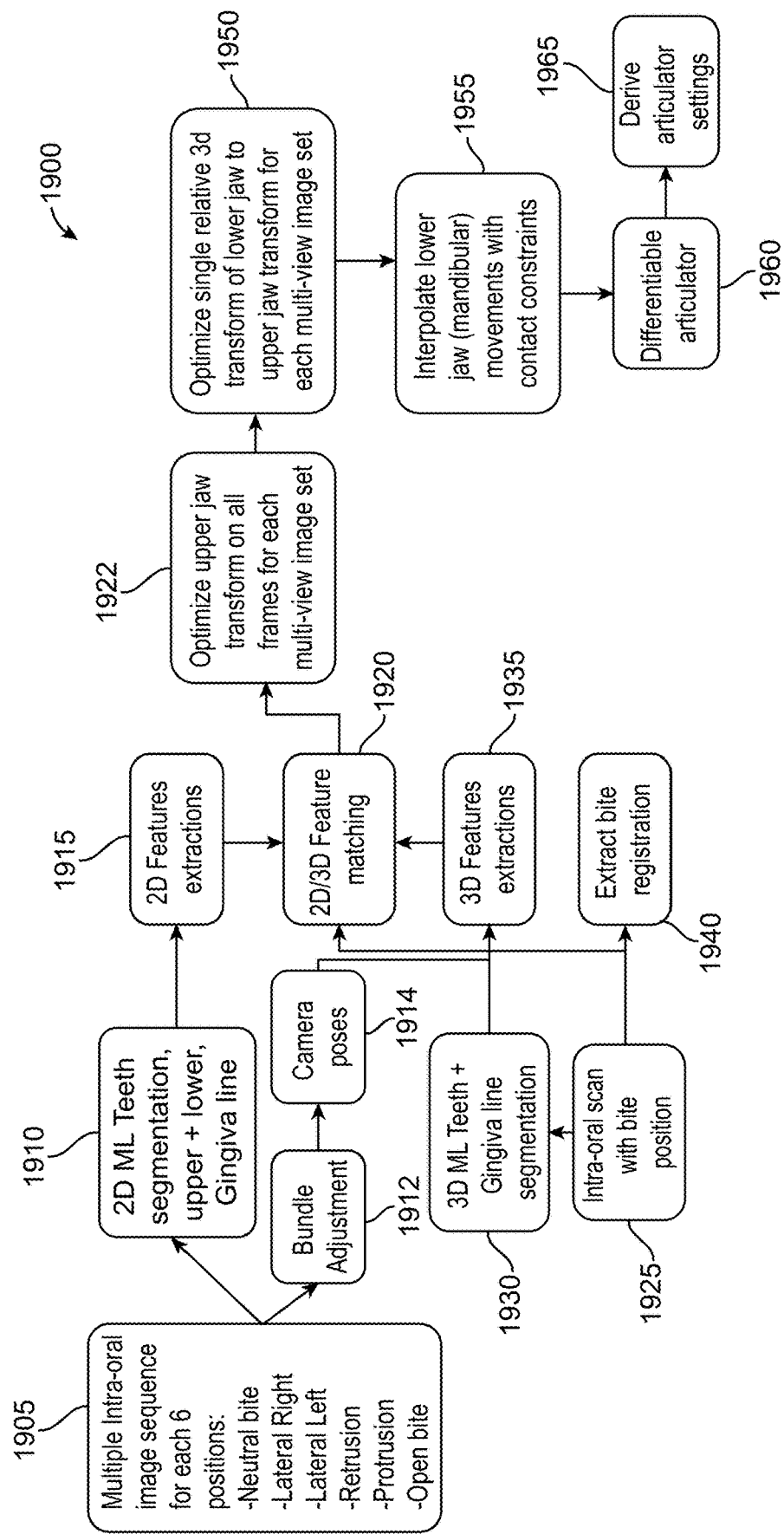
FIG. 19 shows a flow diagram for a method for generating a dynamic occlusion model of a patient's dentition, in accordance with some embodiments.

FIG. 19 shows a flow diagram for a method 1900 for generating a dynamic occlusion model of lower jaw dynamics of a patient's dentition from images of a patient's dentition with cheek retractors taken from multiple angles, such as multiple camera positions, at different times, such as more than 1 second apart and may be taken with the same camera.

At block 1905 intra-oral images of the patient's dentition are generated. The images of the patient's intraoral cavity may be captured while a patient wears a cheek retractor 1514, such as a rubber cheek retractor. The images may be received from an extra oral imaging device, or other dental imaging system, such as imaging device 260. In order to determine the articulation movements of the patient's dentition, multiple images, each from a different camera position or location are taken of each of the patient's dentition while the patient holds the position of their lower jaw in different positions. The positions may be one or more of the six positions shown and described with respect to FIG. 15. The different positions may aid in determining the close contact articulation of the patient's dentition. Dental close contact articulation refers to the way in which the upper and lower teeth come into contact or fit together when the jaws are closed. Achieving proper dental close contact articulation is provides for optimal oral function, comfort, and overall oral health for the patient.

At block 1910 the teeth in the images captured at block 1905 are segmented to generate segmented tooth data. The teeth may be segmented by the segmentation module 212. The segmentation module 212 may segment the teeth using a machine learning model trained with tagged or labeled images of teeth. Tooth segmentation of a 2D image may include determining which teeth are in the image and/or which pixels in the image correspond to each of the teeth. The shape, area, edge, or outline of the teeth in the image may be determined during tooth segmentation. In some embodiments, the gingiva, such as the gingiva line may also be segmented from the image. The gingiva may be segmented for each tooth and each gingiva segment may be assigned to a corresponding tooth of the patient.

At block 1915, 2D features are extracted from the segmented tooth data. The 2D features may include the center points of each tooth. The center points may include the centroid of the tooth in the captured image. The 2D features may also include the contours or edges of the teeth in the image.

At block 1912 bundle adjustment is carried out for the images captured at block 1905 to adjust the images for variations in focal length, distance between camera and teeth, etc. In some embodiments, bundle adjustment includes determining the focal length, the distance between the camera and the teeth, lens distortions, and other properties of image capture system used to capture the image sequence in 1905.

At block 1914 the camera poses, including camera positions are determined based on the bundle adjustment.

At block 1925 intra-oral 3D scan data of the patient's dentition is generated. The 3D scan data may include a 3D model of the intraoral cavity of the patient and may include the teeth and gingiva of the patient. The images may be received from a scanner, such as scanner 250 and may be carried out by the 3D scanning module 204.

At block 1930 the teeth in the 3D scan data captured at block 1925 are segmented to generate segmented tooth data. The teeth may be segmented by the segmentation module 212. The segmentation module 212 may segment the teeth using a machine learning model trained with tagged or labeled 3D images or scan data of teeth. Tooth segmentation of a 3D image may include determining which teeth are in the 3D scan data and/or which locations in the scan data (such as point cloud points) correspond to each of the teeth and then generating a 3D model of each individual tooth in the dentition. In some embodiments, the gingiva, such as the gingiva line may also be segmented from the 3D scan data. The gingiva may be segmented for each tooth and each gingiva segment may be assigned to a corresponding tooth of the patient.

In some embodiments, the upper and lower arches of the patient are scanned separating and an upper arch model is built from the upper arch 3D scan data and a lower arch model is build from the lower arch 3D scan data. In some embodiments, the teeth of the patient may be scanned while in occlusion to align the upper and lower arches in occlusion in order to determine the occlusal relationship, such as tooth contacts, between the upper and lower teeth. At block 1940, bite registration data, including tooth contacts and occlusal distances or an occlusal map (a map for each location on the teeth of the distance between corresponding teeth in occlusion) may be extracted from the intra-oral scan data.

At block 1935 3D features are extracted from the segmented tooth data. The 3D features may include the center points of each tooth. The center points may include the centroid of each tooth as shown in a 2D projection of a 3D model of the segmented teeth. The 3D features may also include the contours or edges of each tooth as shown in a 2D projection of a 3D model of the segmented teeth. The projection may be based on a virtual camera focal length, field of view, and/or distance between the virtual camera and the teeth and other properties of the image capture system. In some embodiments, the projection may be made based on data from the 2D images. The process at block 1935 may use the camera poses determined at block 1914 to generate a 2D projection for extracting the 3D features. In some embodiments, the 2D images may include meta data, such as the focal length and focus distance, which may be used for projecting the 3D image. For example, the virtual camera may have the focal length of the focal length in the 2D images and the distance between the virtual camera and the 3D model may be the focus distance in the meta data of the 2D images.

At block 1920 the segmented 3D teeth are matched with the segmented 2D teeth in each of the intra-oral images for each set of images, a set including multiple camera views of a jaw position. In some embodiments, the segmented teeth are aligned based on the extracted 2D features and the extracted 3D features. Aligning the extracted 3D features with the extracted 2D features may include attempting to align the center points of each tooth, the contours of each tooth, the edges of each tooth, and/or the gingiva associated with each tooth in the 3D data with the corresponding features in the 2D data.

Matching the segmented 3D teeth are matched with the segmented 2D teeth in each of the intra-oral images may be performed for an entire arch at once, such as for the upper arch separately from the lower arch.

Aligning a whole arch may be contrasted with aligning each tooth in the segmented 3D data with the location of the corresponding tooth in the 2D data on a tooth by tooth basis. When aligning on a tooth-by-tooth basis, the relative positions of the teeth in the arch may change. However, when aligning an entire arch the relative positions of the teeth may not change. For example, when the 2D images are captured close in time with the 3D scan or otherwise without tooth movement between capturing the 2D images and the 3D scan, then an arch may be considered static. Aligning the data may include finding a best fit of the 3D features with the visible 2D features.

At block 1922 the upper arch position from each of the multi-view images sets are aligned. Since the lower jaw moves relative to the upper jaw, aligning the upper jaw in the images sets the upper jaw position. Then, the differences in the lower jaw between the images provides the occlusion positions.

At block 1950, the optimized lower jaw positions relative to the upper jaw for each of the six images from block 1922 are saved. These may be 3D models of the positions or data that represented the relative positions of the jaws in 3D space.

At block 1955, the jaw movements between each of the positions of the optimized lower jaw positions relative to the upper jaw may be interpolated and adjusted based on contact constraints. For example, to simulate the movement of the lower jaw from the right to the left or from the front to the back, the lower jaw may be incrementally moved from left to right or front to back. In each incremental position, the 3D models of the teeth of the lower and upper arch are checked to put them in contact and for any penetration of the models of the teeth of the lower jaw into the teeth of the upper jaw. Since the teeth are solid in real life, they cannot penetrate one another. If a penetration is detected, the lower jaw may be moved away from the upper jaw until the teeth contact without penetration. In some embodiments, a minimal amount of penetration may be allowed, such as less than 0.1 mm of penetration. The interpolation may be between lateral left and neutral bite, later right and neutral bite, retraction and neutral bite, and protrusion and neutral bite.

In some embodiments, at block 1960, the dynamic occlusion of the upper and lower teeth and jaws may be modeled based on the upper and lower jaw transform from block 1950 and the interpolations at block 1955. The modeling may result in one or more occlusal maps for different arrangements of the upper and lower jaw. The modeling and the resulting occlusal maps may be used during treatment planning. For example, the upper or lower arch of the patient may be modified with a crown and bridge or other prosthetic or the teeth or jaw position may be changed based on a proposed orthodontic treatment. These modifications and changes to the upper and lower arch may then be modeled based on the upper and lower jaw transform, taking into account the change in contacts between the upper and lower arches caused by the changed tooth positions or prosthetics.

At block 1960 the interpolated movement of the upper arch and lower arch may be used in a virtual articular, such as the virtual articulator shown in FIG. 14B. The movement of the lower arch relative to the upper arch within the articular may be used to derive the articular settings output at block 1965. The articular settings may include the range of motion of the patient's condyle, which is the surface for articulation with the articular disk of the temporomandibular joint and play a role in defining the patient's jaw movements. These settings may be used for treatment planning and progress tracking. For example, a crown or bridge may be placed on the patient's arches using the 3D models and the derived articular settings to determine the jaw to jaw tooth contacts. In some embodiments, a patient's teeth may be captured with 2D images during orthodontic treatment to track the patient's treatment progress. The individual teeth in the 3D data may be aligned with the teeth in the 2D progress tracking images to generate a model of the patient's upper and lower arch during treatment. This model may be used in a virtual articular with the derived settings from block 1965 to perform analysis of the patient's bite during treatment.

Figure 20:
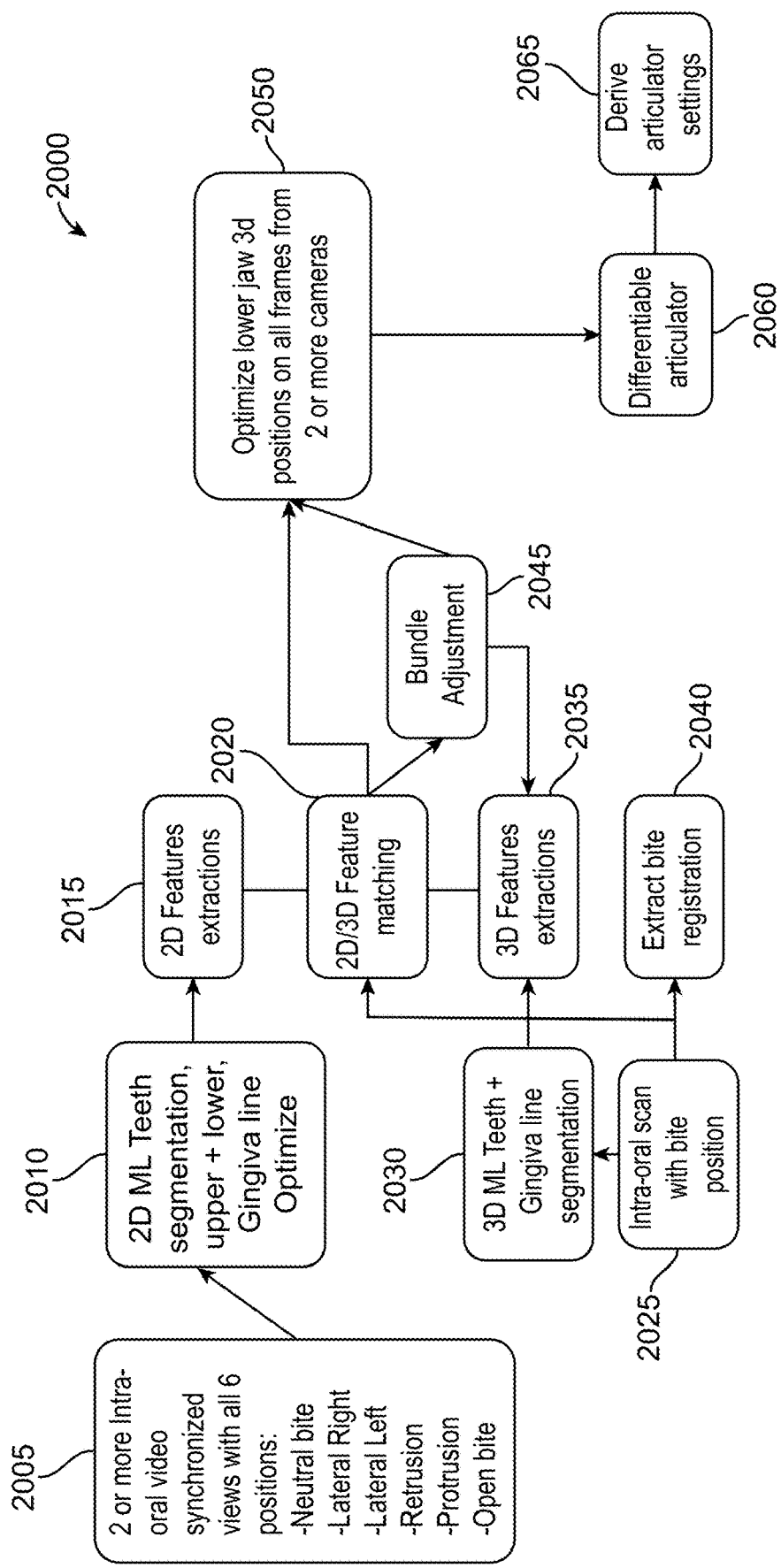
FIG. 20 shows a flow diagram for a method for generating a dynamic occlusion model of a patient's dentition, in accordance with some embodiments.

FIG. 20 shows a flow diagram for a method for generating a dynamic occlusion model of a patient's dentition. At block 2005 multiple intra-oral videos of the patient's dentition are generated in a synchronized manner. Each frame from each of the imaging devices used to capture the videos may be captured at the same time. In some embodiments the frames of the videos may be time stamped and the frames from each video may be synchronized based on their times stamp, such that a frame from a first of the videos may be synchronized with the frame from each of the other videos with the closest time stamp. The videos of the patient's intraoral cavity may be captured while a patient wears a cheek retractor, such as a rubber cheek retractor. The videos may be received from one or more extra oral imaging devices having one or more image sensors, or other dental imaging system, such as imaging device 260. In order to determine the articulation movements of the patient's dentition, the video may be recorded or otherwise generated as the patient moves their detention in occlusion through the five occlusion positions plus the open bite, as shown and described with reference to FIG. 15. The movement through the positions may aid in determining the close contact articulation of the patient's dentition.

At block 2010 the teeth in the videos captured at block 2005 are segmented to generate segmented tooth data. In some embodiments, the teeth in each frame of the videos or in a plurality of frames in the videos between each of the six positions are extracted. The teeth may be segmented by the segmentation module 212. The segmentation module 212 may segment the teeth using a machine learning model trained with tagged or labeled images or video of teeth. Tooth segmentation of the 2D videos may include determining which teeth are in the video and/or which pixels in the video correspond to each of the teeth. The shape, area, edge, or outline of the teeth in the video or each frame of the video may be determined during tooth segmentation. In some embodiments, the gingiva, such as the gingiva line may also be segmented from the video. The gingiva may be segmented for each tooth and each gingiva segment may be assigned to a corresponding tooth of the patient.

At block 2015, 2D features are extracted from the segmented tooth data. The 2D features may include the center points of each tooth in each frame of the videos. The center points may include the centroid of the tooth in the captured videos. The 2D features may also include the contours or edges of the teeth in each frame of the videos.

At block 2025 intra-oral 3D scan data of the patient's dentition is generated. The 3D scan data may include a 3D model of the intraoral cavity of the patient and may include the teeth and gingiva of the patient. The images may be received from a scanner, such as scanner 250 and may be carried out by the 3D scanning module 204.

At block 2030 the teeth in the 3D scan data captured at block 2025 are segmented to generate segmented tooth data. The teeth may be segmented by the segmentation module 212. The segmentation module 212 may segment the teeth using a machine learning model trained with tagged or labeled 3D images or scan data of teeth. Tooth segmentation of a 3D image may include determining which teeth are in the 3D scan data and/or which locations in the scan data (such as point cloud points) correspond to each of the teeth and then generating a 3D model of each individual tooth in the dentition. In some embodiments, the gingiva, such as the gingiva line may also be segmented from the 3D scan data. The gingiva may be segmented for each tooth and each gingiva segment may be assigned to a corresponding tooth of the patient.

In some embodiments, the upper and lower arches of the patient are scanned separating and an upper arch model is built from the upper arch 3D scan data and a lower arch model is build from the lower arch 3D scan data. In some embodiments, the teeth of the patient may be scanned while in occlusion to align the upper and lower arches in occlusion in order to determine the occlusal relationship, such as tooth contacts, between the upper and lower teeth. At block 2040, bite registration data, including tooth contacts and occlusal distances or an occlusal map (a map for each location on the teeth of the distance between corresponding teeth in occlusion) may be extracted from the intra-oral scan data.

At block 2035 3D features are extracted from the segmented tooth data. The 3D features may include the center points of each tooth. The center points may include the centroid of each tooth as shown in a 2D projection of a 3D model of the segmented teeth. The 3D features may also include the contours or edges of each tooth as shown in a 2D projection of a 3D model of the segmented teeth. The projection may be based on a virtual camera focal length, field of view, and/or distance between the virtual camera and the teeth. In some embodiments, the projection may be made based on data from the 2D video. For example, the 2D video may include meta data, such as the focal length and focus distance, which may be used for projecting the 3D image. For example, the virtual camera may have the focal length of the focal length in the 2D video and the distance between the virtual camera and the 3D model may be the focus distance in the meta data of the 2D video.

At block 2020 the segmented 3D teeth are matched with the segmented 2D teeth in each frame of the 2D video. In some embodiments, the segmented teeth are aligned based on the extracted 2D features and the extracted 3D features. Aligning the extracted 3D features with the extracted 2D features may include attempting to align the center points of each tooth, the contours of each tooth, the edges of each tooth, and/or the gingiva associated with each tooth in the 3D data with the corresponding features in the 2D data.

Matching the segmented 3D teeth are matched with the segmented 2D teeth in each of the frames of the 2D video may be performed for an entire arch at once, such as for the upper arch separately from the lower arch.

Aligning a whole arch may be contrasted with aligning each tooth in the segmented 3D data with the location of the corresponding tooth in the 2D data on a tooth by tooth basis. When aligning on a tooth-by-tooth basis, the relative positions of the teeth in the arch may change. However, when aligning an entire arch the relative positions of the teeth may not change. For example, when the 2D video is captured close in time with the 3D scan or otherwise without tooth movement between capturing the 2D video and the 3D scan, then an arch may be considered static. Aligning the data may include finding a best fit of the 3D features with the visible 2D features.

If the alignment is successful, the process may proceed to block 2050. If the alignment is not successful, then the process may proceed to block 2045.

At block 2045, a bundle adjustment may be performed on the 3D segmented data. Bundle adjustment may include making adjustments to the projection of the 3D data and/or 3D features on the 2D image plane of the frames of the 2D video. The adjustments may include adjusting one or more of the focal length of the virtual camera, the field of view of the virtual camera, the distance between the virtual camera and the 3D model of the teeth, and/or changes to the optical or lens distortion of the projection. For example, if it is determined that that virtual camera was too close or too far from the 3D model, then the distance may be increased or decreased accordingly. Similarly, if the projection is wide or too narrow, the field of view or the focal length may be changed.

After the bundle adjustment is completed, the process may proceed to block 2035 for feature extraction and then to block 2020 for feature matching again. The process may iterate through blocks 2045, 2035, and 2020 until the features are matched within an acceptable margin of error.

In some embodiments, the 2D features of the teeth may be combined and/or triangulated from each of the synchronized frames of each video. For example, the center points of the teeth, may be determined for each frame of each video and then the location in space may be triangulated based on the different camera angles from the different imaging devices. Similarly, tooth edges or contours and the gingival edges or contours gingival edges or contours may be triangulated. In some embodiments, different parts of the gingival edges or contours and the tooth edges and contours may be visible from different cameras. The data related to the edges and contours may be used combined to form ore complete edges or contours. The data may also be triangulated to determine the location in space of the edges and contours.

At block 2050, the optimized lower jaw positions relative to the upper jaw for each of the frames of the 2D videos from block 2020 are saved. These may be 3D models of the positions or data that represented the relative positions of the jaws in 3D space.

Because the video includes images of the jaw as it moves between each of the position in occlusion, the process 2000 may not include interpolation, such as described at block 1455 of process 1400.

At block 2060 the movement of the upper arch and lower arch captured in the video and the corresponding 3D models of the positions or data that represent the relative positions of the jaws in 3D space may be used in a virtual articular, such as the virtual articulator 1401 shown in FIG. 14B. The movement of the lower arch 1404 relative to the upper arch 1403 within the articular may be used to derive the articular settings output at block 2065. The articular settings may include the range of motion of the patient's condyle, which is the surface for articulation with the articular disk of the temporomandibular joint and play a role in defining the patient's jaw movements. These settings may be used for treatment planning and progress tracking. For example, a crown or bridge may be placed on the patient's arches using the 3D models and the derived articular settings to determine the jaw to jaw tooth contacts. In some embodiments, a patient's teeth may be captured with 2D video during orthodontic treatment to track the patient's treatment progress. The individual teeth in the 3D data may be aligned with the teeth in the 2D progress tracking images or video to generate a model of the patient's upper and lower arch during treatment. This model may be used in a virtual articular with the derived settings from block 2065 to perform analysis of the patient's bite during treatment.

In some embodiments, at block 2060, the dynamic occlusion of the upper and lower teeth and jaws may be modeled based on the optimized lower jaw positions from block 2050. The modeling may result in one or more occlusal maps for different arrangements of the upper and lower jaw. The modeling and the resulting occlusal maps may be used during treatment planning. For example, the upper or lower arch of the patient may be modified with a crown and bridge or other prosthetic or the teeth or jaw position may be changed based on a proposed orthodontic treatment. These modifications and changes to the upper and lower arch may then be modeled based on the upper and lower jaw transform, taking into account the change in contacts between the upper and lower arches caused by the changed tooth positions or prosthetics.

Figure 21:
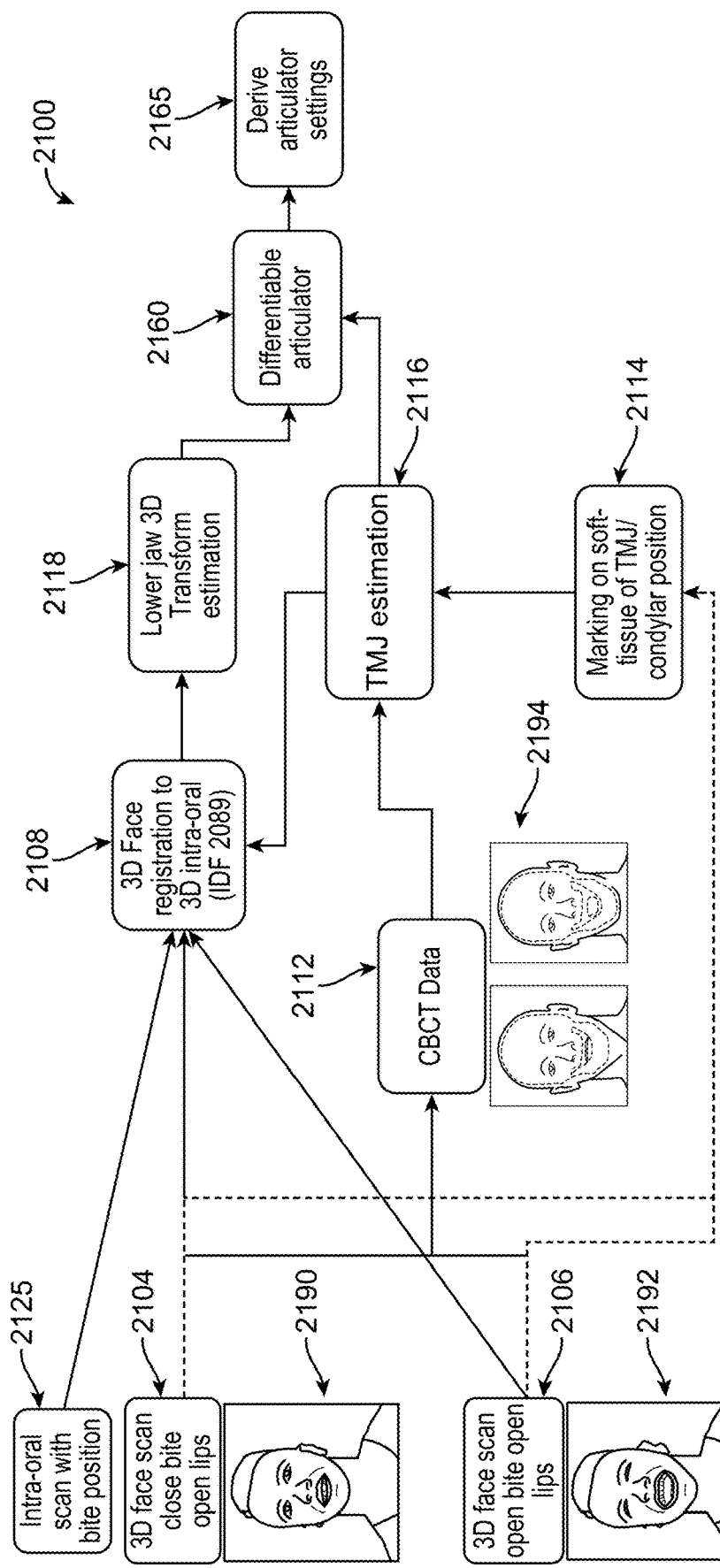
FIG. 21 shows a flow diagram for a method for generating a dynamic occlusion model of a patient's dentition, in accordance with some embodiments.

FIG. 21 shows a flow diagram for a method for generating a dynamic occlusion model of a patient's dentition using a 3D face scan and an intraoral scan. At block 2125 intra-oral 3D scan data of the patient's dentition is generated. The 3D scan data may include a 3D model of the intraoral cavity of the patient and may include the teeth and gingiva of the patient. The images may be received from a scanner, such as scanner 250 and may be carried out by the 3D scanning module 204.

At block 2104, a 3D face scan of the patient with a closed bite and open lips is captured. At block 2104, an imaging device may capture images of patient from multiple angles. The images may be received from an extraoral imaging device, or other dental imaging system, such as imaging device 260. In some embodiments, the extraoral aiming device may be a camera on a portable device, such as a smartphone. The images can be a still images/photographs of the head and face of patient or could be a video of the head and face of patient. Throughout this disclosure, any reference to a patient's face may also include the head of the patient as well. The images may be captured by a built-in camera of mobile device and/or an external media capturing devices coupled (physically or communicatively) to mobile device and sent to and received by a system for processing the images.

The images may be transformed into 3D representation of the head and face of patient 2190. The transformation of images and videos into the 3D representation may be performed according to any known or to be developed signal and image processing technique for generating 3D representation of objects.

At block 2106, a 3D face scan of the patient with an open bite and open lips is captured. At block 2106, an imaging device may capture images of patient from multiple angle. The images may be received from an extraoral imaging device, or other dental imaging system, such as imaging device 260. In some embodiments, the extraoral aiming device may be a camera on a portable device, such as a smartphone. The images can be a still images/photographs of the head and face of patient or could be a video of the head and face of patient. Throughout this disclosure, any reference to a patient's face may also include the head of the patient as well. The images may be captured by a built-in camera of mobile device and/or an external media capturing devices coupled (physically or communicatively) to mobile device.

The images may be transformed into 3D representation of the head and face of patient 2192. The transformation of images and videos into the 3D representation may be performed according to any known or to be developed signal and image processing technique for generating 3D representation of objects.

At block 2108 the 3D model of the of the patient's detention from block 2125 is registered to the 3D model of the patient's face from block 2104 to generate a 3D model of the patient's face and teeth in the correct spatial relationship. The location of the teeth, such as the upper teeth and the upper jaw in the 3D model of block 2104 may be used for registering the 3D model of the teeth, such as the upper teeth and upper jaw from block 2125 in the correct special relationship with the model of the face. In some embodiments, the 3D model of the of the patient's detention from block 2125 is registered to the 3D model of the patient's face from block 2106 to generate a 3D model of the patient's face and teeth in the correct spatial relationship. The location of the teeth in the 3D model of block 2106 may be used for registering the 3D model of the teeth from block 2125 in the correct special relationship with the model of the face.

At block 2112, CBCT data may be generated. CBCT data may include surface and subsurface 2D and 3D data of the patient's head and face 2194, such as the location and orientation of roots of the patient's teeth, the shape of the mandible bone, the location and shape of the TMJ and other subsurface anatomy. The CBCT data may be integrated into the 3D model of the patient's face from blocks 2104 and 2106.

At block 2114, facial landmarks including the TMJ and condylar position are located or marked on the 3D model of the patient's face in one or both of the open bite and closed bite 3D face scan models.

At block 2116, an estimate of the TMJ position, geometry, and/or movement constraints is generated based on the 3D face models, CBCT data, and the marking of the facial landmarks, or any combination thereof. The estimate of the TMJ position may be used at block 2108 in the registration process. In some embodiments, the registration includes the registration of subsurface anatomy including CBCT data. For example, facial features such as the tanrgus, canthus, and other features that are extracted using a facebow device on a physical patient. The 3D features are features used to initialize a face bow device, such as the frankfurt and camper planes. Based on these features, an estimate of the location of the left and right condyle of the TMJ in 3D space.

At block 2118 the lower jaw 3D transform is estimated based on the 3D face registration to 3D intraoral scan data form block 2108. For example, After the upper jaw is registered to the face and skull at block 2108, the lower jaw may be registered to the 3D model with respect to the upper jaw. At block 2118 the 3D model of the of the patient's lower detention from block 2125 is registered to the 3D model of the patient's face from block 2104 to generate a 3D model of the patient's face and teeth in the correct spatial relationship. For example, the 3D model with the upper jaw registered to the face at block 2108 may be used with the lower jaw to register the lower jaw to the face. The location of the teeth, such as the lower teeth and the lower jaw in the 3D model of block 2104 or the registered model of block 2108 may be used for registering the 3D model of the teeth, such as the lower teeth and lower jaw from block 2125 in the correct special relationship with the model of the face. In some embodiments, the 3D model of the of the patient's detention from block 2125 is registered to the 3D model of the patient's face from block 2106 to generate a 3D model of the patient's face and teeth in the correct spatial relationship. The location of the teeth in the 3D model of block 2106 may be used for registering the 3D model of the teeth from block 2125 in the correct special relationship with the model of the face.

The lower jaw 3D transform may include an estimate of the occlusal contacts and articulation of the lower jaw relative to the upper jaw as the jaw moves between the six positions discussed herein.

At block 2160 the movement of the upper arch and lower arch from block 2118 may be used in a virtual articular, such as the virtual articulator shown in FIG. 14B. The movement of the lower arch relative to the upper arch within the articular may be used to derive the articular settings output at block 2165. The articular settings may include the range of motion of the patient's condyle, which is the surface for articulation with the articular disk of the temporomandibular joint and play a role in defining the patient's jaw movements. These settings may be used for treatment planning and progress tracking. For example, a crown or bridge may be placed on the patient's arches using the 3D models and the derived articular settings to determine the jaw to jaw tooth contacts. In some embodiments, a patient's teeth may be captured with 2D images during orthodontic treatment to track the patient's treatment progress. The individual teeth in the 3D data may be aligned with the teeth in the 2D progress tracking images to generate a model of the patient's upper and lower arch during treatment. This model may be used in a virtual articular with the derived settings from block 2165 to perform analysis of the patient's bite during treatment.

In some embodiments, at block 2160, the dynamic occlusion of the upper and lower teeth and jaws may be modeled based on the upper and lower jaw transform from blocks 2108 and 2118. The modeling may result in one or more occlusal maps for different arrangements of the upper and lower jaw. The modeling and the resulting occlusal maps may be used during treatment planning. For example, the upper or lower arch of the patient may be modified with a crown and bridge or other prosthetic or the teeth or jaw position may be changed based on a proposed orthodontic treatment. These modifications and changes to the upper and lower arch may then be modeled based on the upper and lower jaw transform, taking into account the change in contacts between the upper and lower arches caused by the changed tooth positions or prosthetics.

Figure 22:
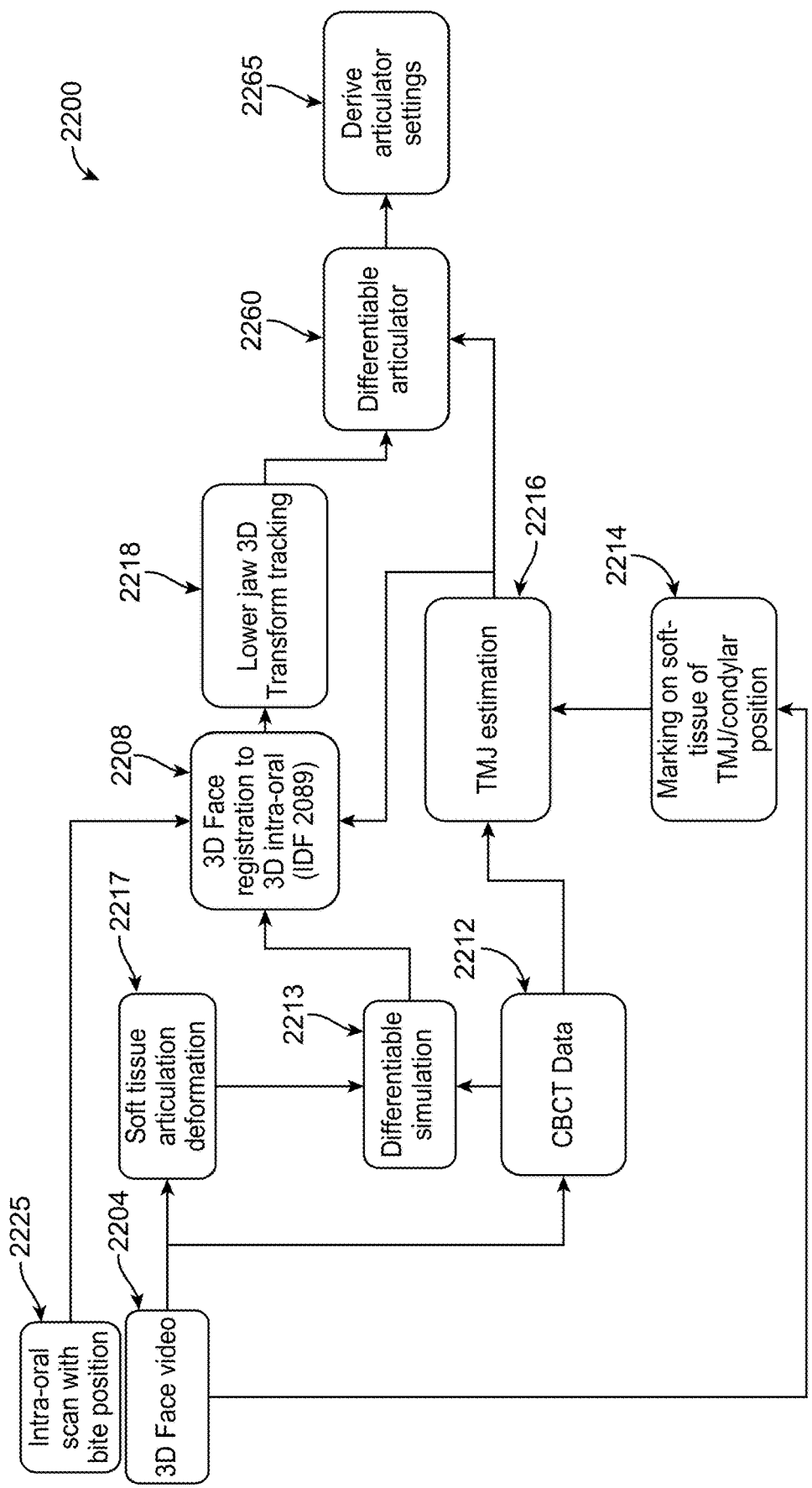
FIG. 22 shows a flow diagram for a method for generating a dynamic occlusion model of a patient's dentition, in accordance with some embodiments.

FIG. 22 shows a flow diagram for a method for generating a dynamic occlusion model of a patient's dentition. At block 2225 intra-oral 3D scan data of the patient's dentition is generated. The 3D scan data may include a 3D model of the intraoral cavity of the patient and may include the teeth and gingiva of the patient. The images may be received from a scanner, such as scanner 250 and may be carried out by the 3D scanning module 204.

At block 2204, a 3D face scan of video the patient with a closed bite and open lips is captured. In some embodiments, the video may include talking and chewing motions. The images may be received from an extraoral imaging device, or other dental imaging system, such as imaging device 260. In some embodiments, the extraoral aiming device may be a camera on a portable device, such as a smartphone. At block 2204, an imaging device may capture video of patient from multiple angles. The images can be a video of the head and face of patient. The video may be captured by a built-in camera of mobile device and/or an external media capturing devices coupled (physically or wirelessly communicatively) to mobile device.

The video may be transformed into a video 3D representation of the head and face of patient 2190. The transformation of videos into the 3D representation may be performed according to any known or to be developed signal and image processing technique for generating 3D representation of objects.

At block 2217 soft tissue movements from the video of the 3D representation of the head and face of the patient may be used to generate the soft tissue deformation during jaw articulation. The process may include mapping the movements and/or deformation of multiple points on the patient's soft tissue with the movements of the jaw.

At block 2213 a differential simulation based on the CBCT data and the soft tissue articulation may be generated. The differential simulation derives the lower mandible movements based on the mapped movements of soft tissue along with the CBCT data, which includes a model of the mandible.

At block 2208 the 3D model of the of the patient's detention from block 2225 is registered to the 3D model of the patient's face from block 2104 based on the differential simulation 2213 to generate a 3D model of the patient's face and teeth in the correct spatial relationship. The location of the teeth in the 3D model of block 2104 may be used for registering the 3D model of the teeth from block 2225 in the correct special relationship with the model of the face.

At block 2212, CBCT data may be generated. CBCT data may include surface and subsurface 2D and 3D data of the patient's head and face, such as the location and orientation of roots of the patient's teeth, the shape of the mandible bone, the location and shape of the TMJ and other subsurface anatomy. The CBCT data may be integrated into the 3D model of the patient's face from block 2204.

At block 2214, facial landmarks including the TMJ and condylar position are located or marked on the 3D model of the patient's face in one or both of the open bite and closed bite 3D face scan models.

At block 2216, an estimate of the TMJ position, geometry, and/or movement constraints is generated based on the 3D face models, CBCT data, and the marking of the facial landmarks, or any combination thereof. The estimate of the TMJ position may be used at block 2108 in the registration process. In some embodiments, the registration includes the registration of subsurface anatomy including CBCT data. For example, facial features such as the tanrgus, canthus, and other features that are extracted using a facebow device on a physical patient. The 3D features are features used to initialize a face bow device, such as the frankfurt and camper planes. Based on these features, an estimate of the location of the left and right condyle of the TMJ in 3D space.

At block 2218 the lower jaw 3D transform is estimated based on the 3D face registration to 3D intraoral scan data form block 2208. For example, After the upper jaw is registered to the face and skull at block 2108, the lower jaw may be registered to the 3D model with respect to the upper jaw. At block 2118 the 3D model of the of the patient's lower detention from block 2125 is registered to the 3D model of the patient's face from block 2104 to generate a 3D model of the patient's face and teeth in the correct spatial relationship. For example, the 3D model with the upper jaw registered to the face at block 2108 may be used with the lower jaw to register the lower jaw to the face. The location of the teeth, such as the lower teeth and the lower jaw in the 3D model of block 2104 or the registered model of block 2108 may be used for registering the 3D model of the teeth, such as the lower teeth and lower jaw from block 2125 in the correct special relationship with the model of the face. In some embodiments, the 3D model of the of the patient's detention from block 2125 is registered to the 3D model of the patient's face from block 2106 to generate a 3D model of the patient's face and teeth in the correct spatial relationship. The location of the teeth in the 3D model of block 2106 may be used for registering the 3D model of the teeth from block 2125 in the correct special relationship with the model of the face.

The lower jaw 3D transform may include an estimate of the occlusal contacts and articulation of the lower jaw relative to the upper jaw as the jaw moves between the six positions discussed herein.

At block 2260 the movement of the upper arch and lower arch from block 2218 may be used in a virtual articular, such as the virtual articulator shown in FIG. 14B. The movement of the lower arch relative to the upper arch within the articular may be used to derive the articular settings output at block 2265. The articular settings may include the range of motion of the patient's condyle, which is the surface for articulation with the articular disk of the temporomandibular joint and play a role in defining the patient's jaw movements. These settings may be used for treatment planning and progress tracking. For example, a crown or bridge may be placed on the patient's arches using the 3D models and the derived articular settings to determine the jaw to jaw tooth contacts. In some embodiments, a patient's teeth may be captured with 2D images during orthodontic treatment to track the patient's treatment progress. The individual teeth in the 3D data may be aligned with the teeth in the 2D progress tracking images to generate a model of the patient's upper and lower arch during treatment. This model may be used in a virtual articular with the derived settings from block 2265 to perform analysis of the patient's bite during treatment.

In some embodiments, at block 2260, the dynamic occlusion of the upper and lower teeth and jaws may be modeled based on the upper and lower jaw transform from blocks 2208 and 2218. The modeling may result in one or more occlusal maps for different arrangements of the upper and lower jaw. The modeling and the resulting occlusal maps may be used during treatment planning. For example, the upper or lower arch of the patient may be modified with a crown and bridge or other prosthetic or the teeth or jaw position may be changed based on a proposed orthodontic treatment. These modifications and changes to the upper and lower arch may then be modeled based on the upper and lower jaw transform, taking into account the change in contacts between the upper and lower arches caused by the changed tooth positions or prosthetics.

Figure 23:
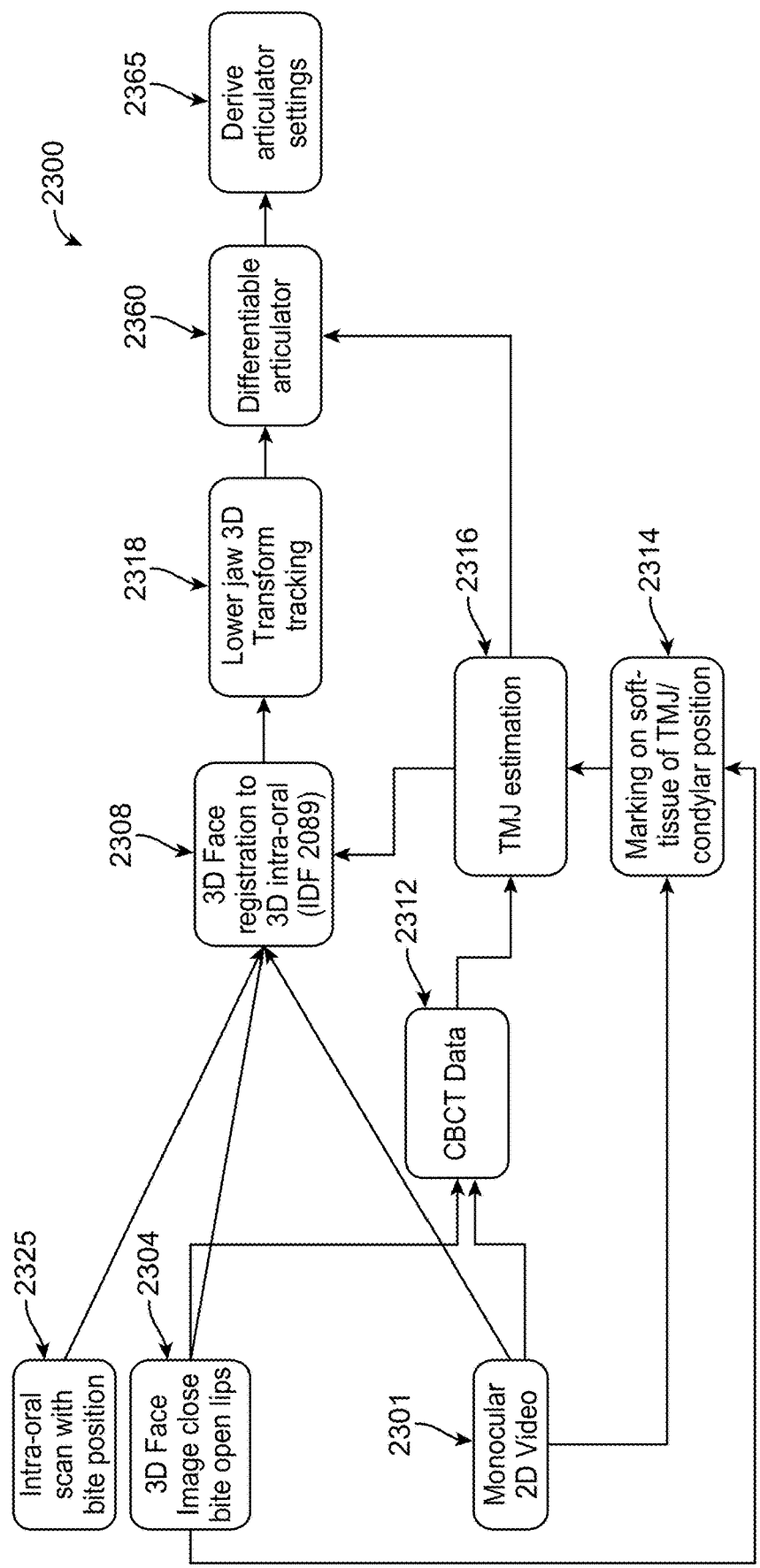
FIG. 23 shows a flow diagram for a method for generating a dynamic occlusion model of a patient's dentition, in accordance with some embodiments.

FIG. 23 shows a flow diagram for a method for generating a dynamic occlusion model of a patient's dentition.

At block 2325 intra-oral 3D scan data of the patient's dentition is generated. The 3D scan data may include a 3D model of the intraoral cavity of the patient and may include the teeth and gingiva of the patient. The images may be received from a scanner, such as scanner 250 and may be carried out by the 3D scanning module 204.

At block 2304, a 3D face scan of video the patient with a closed bite and open lips is captured. In some embodiments, the video may include talking and chewing motions. The images may be received from an extraoral imaging device, or other dental imaging system, such as imaging device 260. In some embodiments, the extraoral aiming device may be a camera on a portable device, such as a smartphone. At block 2304, an imaging device may capture video of patient from multiple angles. The images can be a video of the head and face of patient. The video may be captured by a built-in camera of mobile device and/or an external media capturing devices coupled (physically or communicatively) to mobile device and sent to and received by a system for processing the images.

The video may be transformed into a video 3D representation of the head and face of patient 2190. The transformation of videos into the 3D representation may be performed according to any known or to be developed signal and image processing technique for generating 3D representation of objects.

At block 2301 monocular 2D video form a single camera may be captured of the patient talking, chewing, and moving between and in the six jaw positions discussed herein. In some embodiments, the video may include talking and chewing motions. The images may be received from an extraoral imaging device, or other dental imaging system, such as imaging device 260. In some embodiments, the extraoral aiming device may be a camera on a portable device, such as a smartphone. At block 2304, an imaging device may capture video of patient from multiple angles. The images can be a video of the head and face of patient. The video may be captured by a built-in camera of mobile device and/or an external media capturing devices coupled (physically or communicatively) to mobile device and sent to and received by a system for processing the images.

At block 2308 the 3D model of the of the patient's detention from block 2325 is registered to the 3D model of the patient's face from block 2304 to generate a 3D model of the patient's face and teeth in the correct spatial relationship. The location of the teeth in the 3D model of block 2104 may be used for registering the 3D model of the teeth from block 2225 in the correct special relationship with the model of the face. The registration may also use the monocular video and facial landmarks and their movement from block 2301 to generate a moveable 3D model of the face and intraoral structure. The landmarks in the video and their positions may be used to determine how the model changes with movement.

At block 2312, CBCT data may be generated. CBCT data may include surface and subsurface 2D and 3D data of the patient's head and face, such as the location and orientation of roots of the patient's teeth, the shape of the mandible bone, the location and shape of the TMJ and other subsurface anatomy. The CBCT data may be integrated into the 3D model of the patient's face from block 2304.

At block 2314, facial landmarks including the TMJ and condylar position are located or marked on the 3D model of the patient's face in one or both of the open bite and closed bite 3D face scan models.

At block 2316, an estimate of the TMJ position, geometry, and/or movement constraints is generated based on the 3D face models, CBCT data, monocular video, and the marking of the facial landmarks, or any combination thereof. The estimate of the TMJ position may be used at block 2108 in the registration process. In some embodiments, the registration includes the registration of subsurface anatomy including CBCT data.

At block 2318 the lower jaw 3D transform is estimated based on the 3D face registration to 3D intraoral scan data form block 2308. The lower jaw 3D transform is an estimate of the occlusal contacts and articulation of the lower jaw relative to the upper jaw as the jaw moves between the six positions discussed herein.

At block 2360 the movement of the upper arch and lower arch from block 2318 may be used in a virtual articular, such as the virtual articulator shown in FIG. 14B. The movement of the lower arch relative to the upper arch within the articular may be used to derive the articular settings output at block 2365. The articular settings may include the range of motion of the patient's condyle, which is the surface for articulation with the articular disk of the temporomandibular joint and play a role in defining the patient's jaw movements. These settings may be used for treatment planning and progress tracking. For example, a crown or bridge may be placed on the patient's arches using the 3D models and the derived articular settings to determine the jaw to jaw tooth contacts. In some embodiments, a patient's teeth may be captured with 2D images during orthodontic treatment to track the patient's treatment progress. The individual teeth in the 3D data may be aligned with the teeth in the 2D progress tracking images to generate a model of the patient's upper and lower arch during treatment. This model may be used in a virtual articular with the derived settings from block 2365 to perform analysis of the patient's bite during treatment.

In some embodiments, at block 2360, the dynamic occlusion of the upper and lower teeth and jaws may be modeled based on the upper and lower jaw transform from blocks 2308 and 2318. The modeling may result in one or more occlusal maps for different arrangements of the upper and lower jaw. The modeling and the resulting occlusal maps may be used during treatment planning. For example, the upper or lower arch of the patient may be modified with a crown and bridge or other prosthetic or the teeth or jaw position may be changed based on a proposed orthodontic treatment. These modifications and changes to the upper and lower arch may then be modeled based on the upper and lower jaw transform, taking into account the change in contacts between the upper and lower arches caused by the changed tooth positions or prosthetics.

Figure 24:
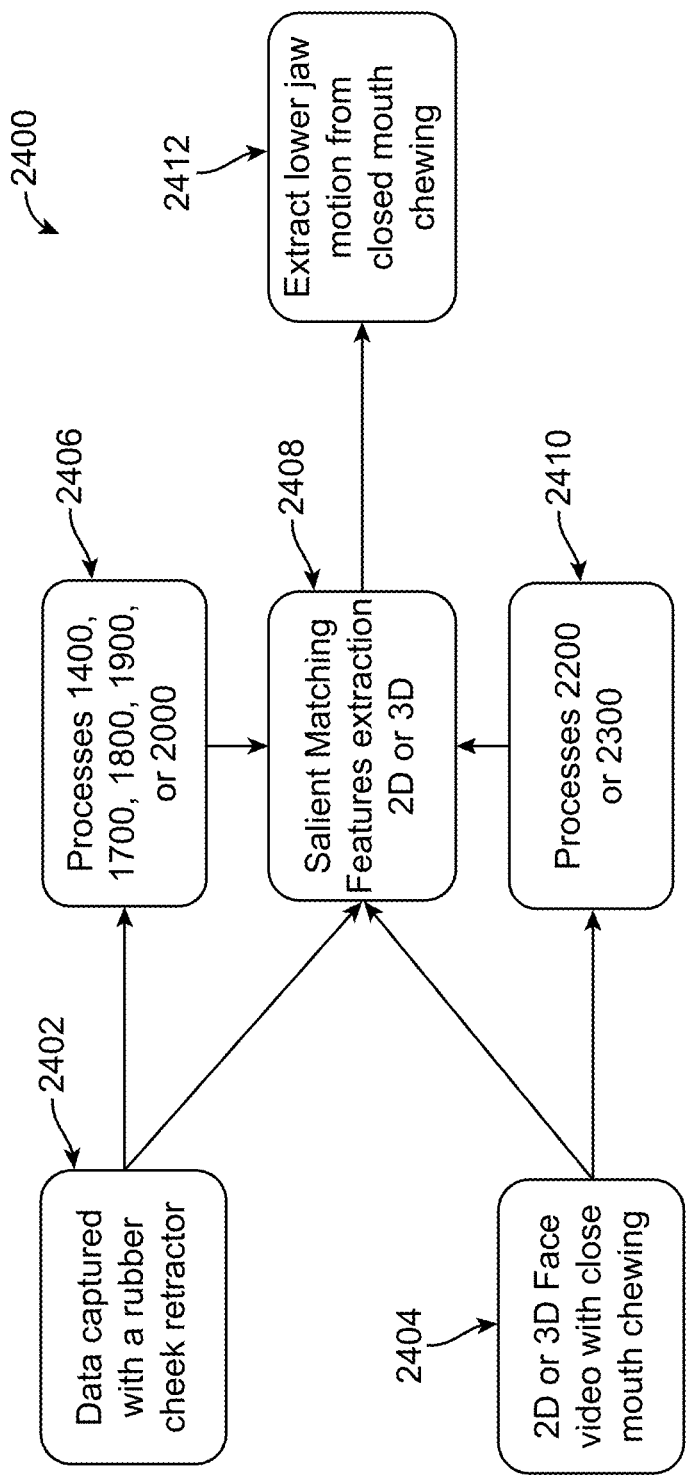
FIG. 24 shows a process for extracting lower jaw motion from closed mouth chewing data, in accordance with some embodiments.

FIG. 24 shows a method 2400 of determining lower jaw motion from closed moth chewing. At block 2402 intraoral images or video, such as described with respect to block 1405, 1705, 1805, 1905, and 2015 are captured as described herein. At block 2404 2D and/or 3D face video with closed mouth chewing is captured. In some embodiments, the video may include talking and chewing motions. The images may be received from an extraoral imaging device, or other dental imaging system, such as imaging device 260. In some embodiments, the extraoral aiming device may be a camera on a portable device, such as a smartphone. An imaging device may capture video of patient from multiple angles. The images can be a video of the head and face of patient. The video may be captured by a built-in camera of mobile device and/or an external media capturing devices coupled (physically or communicatively) to mobile device and sent to and received by a system for processing the images.

At block 2406, one of processes 1400, 1700, 1800, 1900, or 2000 are carried out. The result of these processes may be a digital articulator model of the patient's teeth.

At block 2410 processes 2200 or 2300 may be carried out. The result of these processes may be additional articular models including the patient's external features, such as the facial features.

Figure 25:
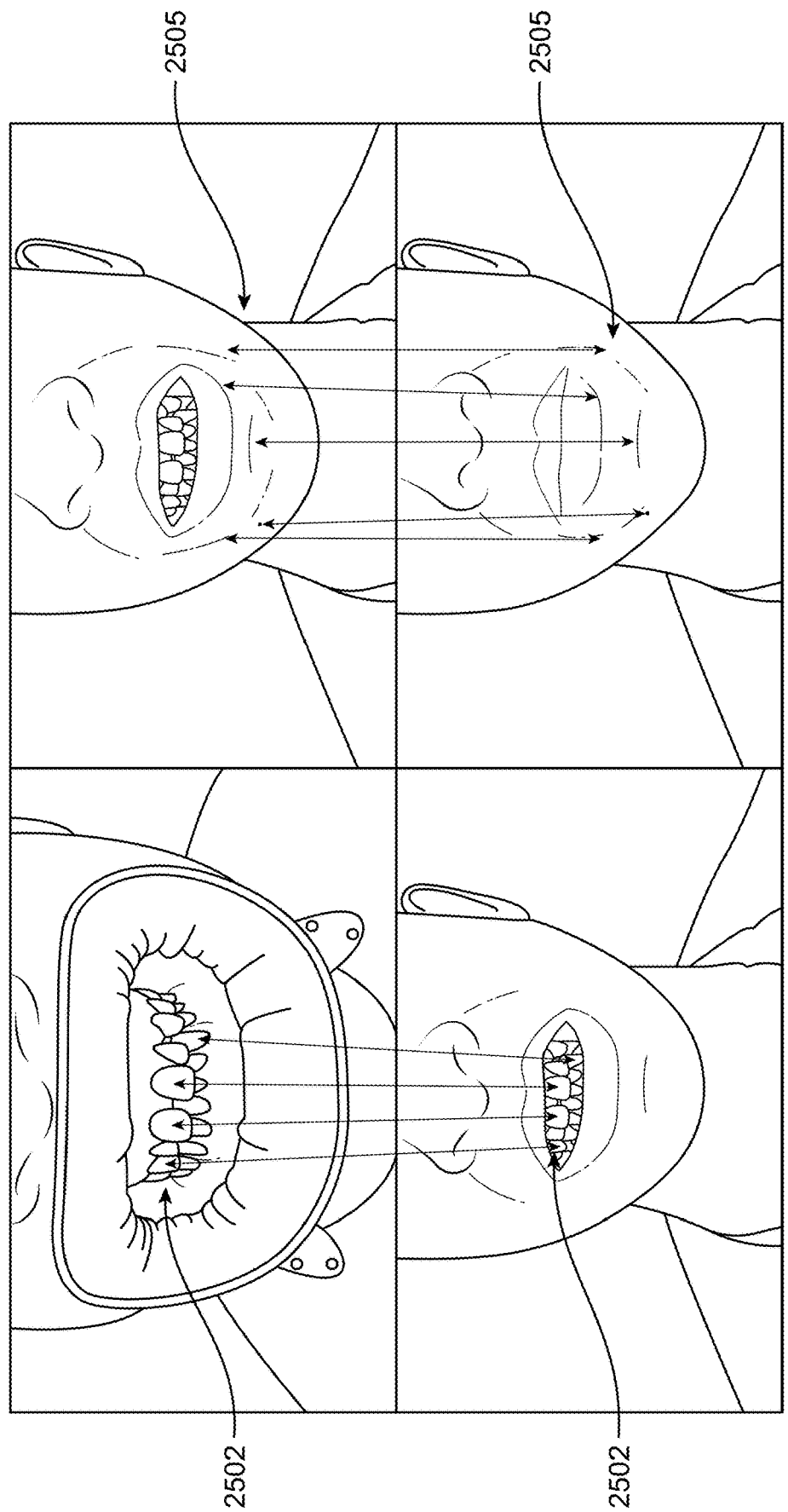
FIG. 25 shows matching of facial features and landmarks, in accordance with some embodiments.

At block 2408 the data from block 2402, the 2D or 3D video with mouth chewing 2404, the results from block 2406, and the results from block 2410 are used to match features extracted from the various 2D and 3D data and models described herein to generate lower jaw motion based on closed mouth chewing. The extracted features are stored at block 2412. FIG. 25 depicts the matching of features, such as tooth edges and contours and tooth centers between the various images and videos with the patient's jaws in a single position. For example, intra-oral features 2502 are matched between the cheek retractor image and the non-cheek retractor images with open lips. Extra-oral features 2505, such as soft tissue features that may include lip edges or features, color features on the skin, such so moles, and folds or other soft tissue features may be mapped between the closed mouth and open mouth images. Such matching may occur at multiple lower jaw positions, such as the six positions describe herein. From this matching, a later video of the patient chewing food and talking may be used with the extracted data of block 2412 to determine the articular and occlusal relationship when the patient's mouth is closed and in real-world use without the interference of a facebow or other device, instead, a video of the patient having the extracted features may be used.

Figure 26:
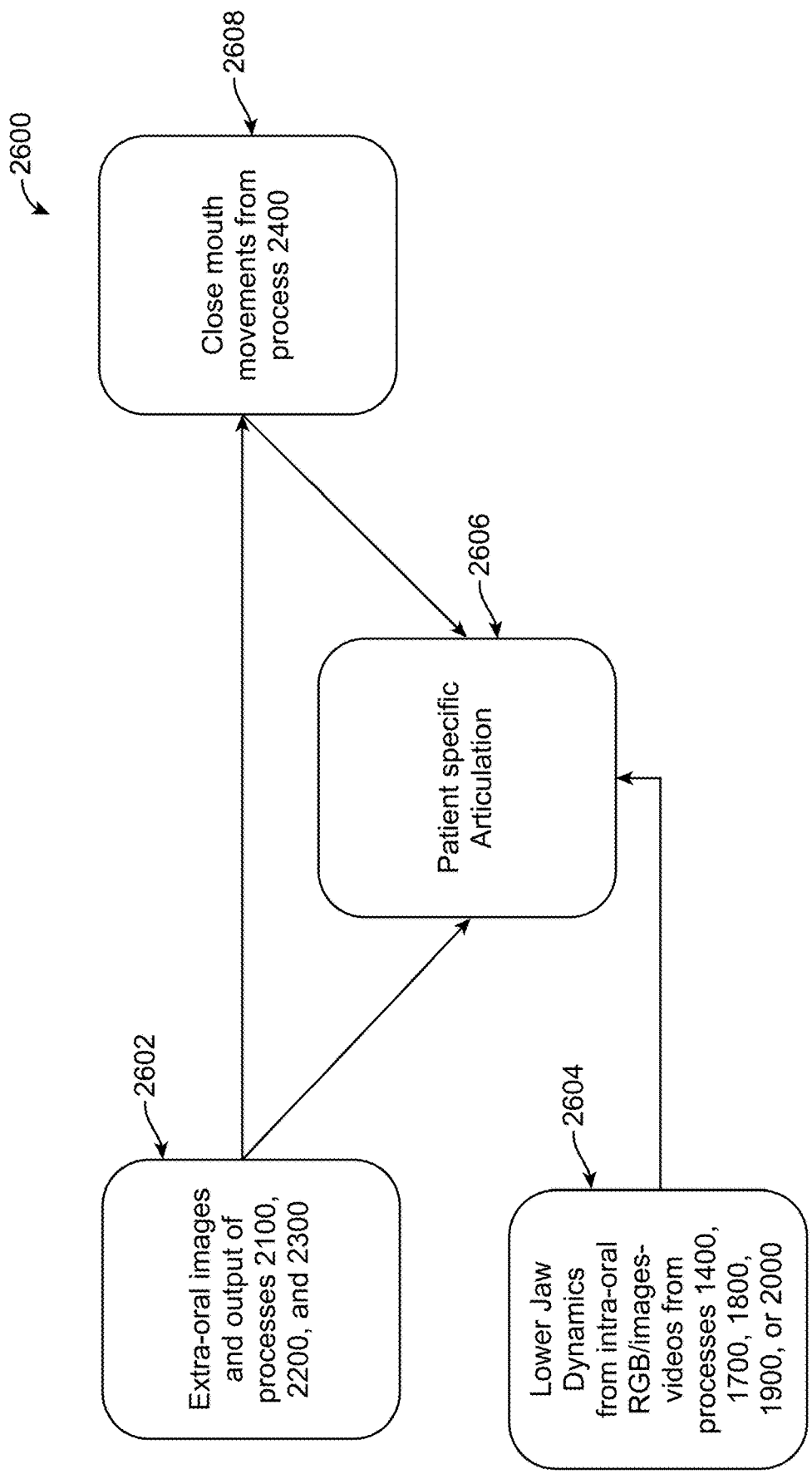
FIG. 26 shows a process of generating patient specific articulation simulations, in accordance with some embodiments.

Other combinations of the processes discussed herein can be performed. FIG. 26 depicts a method 2600 of combining those processes to generate a patient specific articulation model. The outputs from blocks 2602, 2604, and 2608 may be used to generate a patient specific articulation model at block 2606. For example, based on the outputs from block 2602, 2604, and 2608, where patient specific information regarding 3D Condyle (TMJ) location, 2D Planes (Frankfurt/Camper), 3D registration of Lower/Upper mandible to Skull, 3D physiological movements of lower jaw are determined, a full model of dental articulation of a patient can be simulated, including positions and movements between protrusion, retrusion, laterotrusion. The articulation model may be used for treatment planning, progress tracking and other dental uses. For example, the final position of an orthodontic treatment may be used as the tooth model in the patient specific articulation model to determine how the patient's jaw may articulate after treatment.

Figure 27:
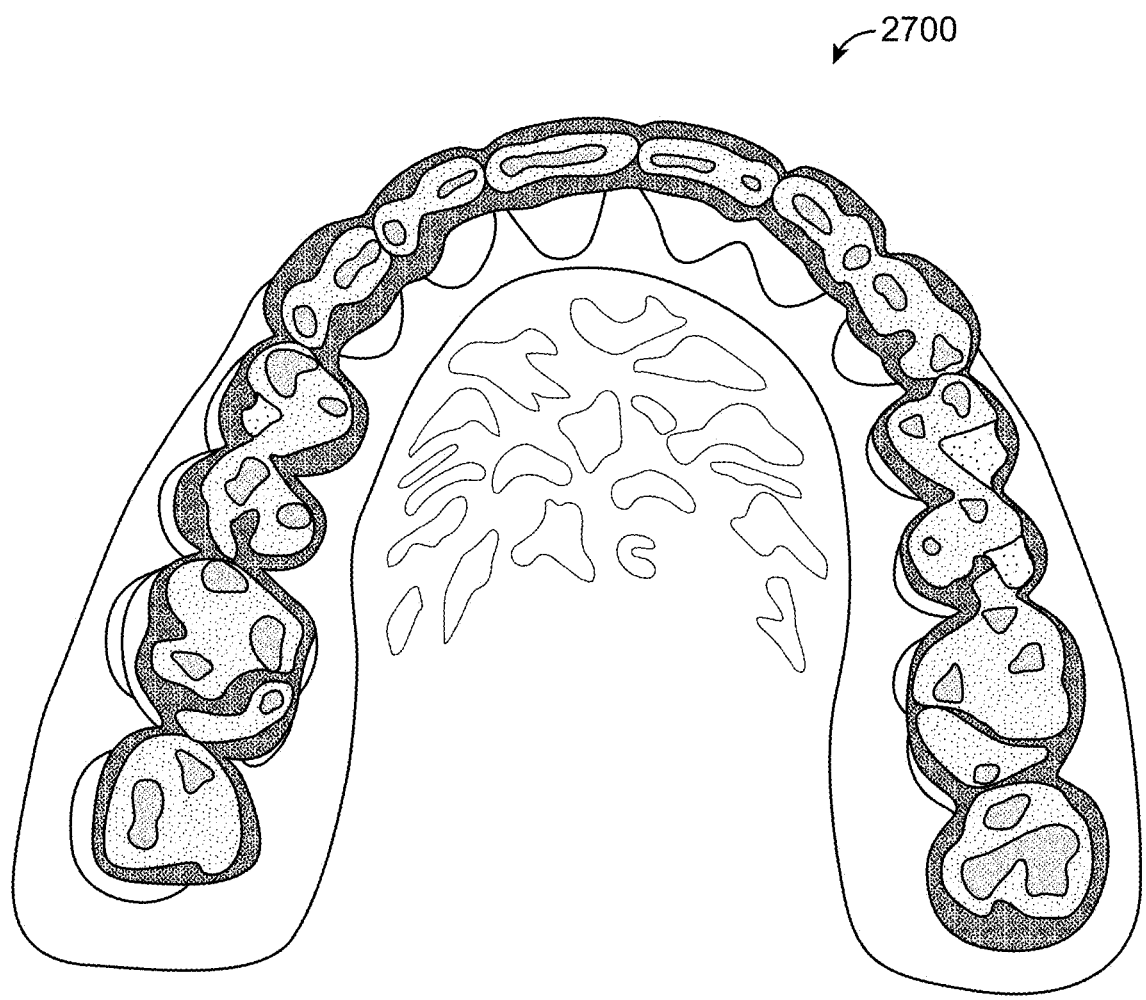
FIG. 27 shows example occlusal mapping.

FIG. 27 depicts a visualization of occlusal contacts. The occlusal map 2700 may include color coded data that depicts the location and extent of the occlusal contacts at different jaw positions. Occlusal maps may be generated for each jaw position and the movements between the jaw positions, as described herein based on the articular models and articulation settings herein. To improve usage of lower jaw dynamics during treatment planning, the occlusal contacts during dynamic mandibular motions. The computed values would identify areas with high contacts. The contacts can be used to visualize the accumulated force during the motion by normalizing the force values in the color space.

The occlusal maps can also visualize footprints of the motion on the surface of the teeth and color code it based on intensity of the contact.

Computing System

FIG. 12 is a block diagram of an example computing system 1010 capable of implementing one or more of the embodiments described and/or illustrated herein. For example, all or a portion of computing system 1010 may perform and/or be a means for performing, either alone or in combination with other elements, one or more of the steps described herein (such as one or more of the steps illustrated in FIG. 1). All or a portion of computing system 1010 may also perform and/or be a means for performing any other steps, methods, or processes described and/or illustrated herein.

Computing system 1010 broadly represents any single or multi-processor computing device or system capable of executing computer-readable instructions. Examples of computing system 1010 include, without limitation, workstations, laptops, client-side terminals, servers, distributed computing systems, handheld devices, or any other computing system or device. In its most basic configuration, computing system 1010 may include at least one processor 1014 and a system memory 1016.

Processor 1014 generally represents any type or form of physical processing unit (e.g., a hardware-implemented central processing unit) capable of processing data or interpreting and executing instructions. In certain embodiments, processor 1014 may receive instructions from a software application or module. These instructions may cause processor 1014 to perform the functions of one or more of the example embodiments described and/or illustrated herein.

System memory 1016 generally represents any type or form of volatile or non-volatile storage device or medium capable of storing data and/or other computer-readable instructions. Examples of system memory 1016 include, without limitation, Random Access Memory (RAM), Read Only Memory (ROM), flash memory, or any other suitable memory device. Although not required, in certain embodiments computing system 1010 may include both a volatile memory unit (such as, for example, system memory 1016) and a non-volatile storage device (such as, for example, primary storage device 1032, as described in detail below). In one example, one or more of modules 202 from FIG. 2 may be loaded into system memory 1016.

In some examples, system memory 1016 may store and/or load an operating system 1040 for execution by processor 1014. In one example, operating system 1040 may include and/or represent software that manages computer hardware and software resources and/or provides common services to computer programs and/or applications on computing system 1010. Examples of operating system 1040 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 1010 may also include one or more components or elements in addition to processor 1014 and system memory 1016. For example, as illustrated in FIG. 10, computing system 1010 may include a memory controller 1018, an Input/Output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an Industry Standard Architecture (ISA), Peripheral Component Interconnect (PCI), PCI Express (PCIe), or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012.

I/O controller 1020 generally represents any type or form of module capable of coordinating and/or controlling the input and output functions of a computing device. For example, in certain embodiments I/O controller 1020 may control or facilitate transfer of data between one or more elements of computing system 1010, such as processor 1014, system memory 1016, communication interface 1022, display adapter 1026, input interface 1030, and storage interface 1034.

As illustrated in FIG. 12, computing system 1010 may also include at least one display device 1024 coupled to I/O controller 1020 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer, as known in the art) for display on display device 1024.

As illustrated in FIG. 12, example computing system 1010 may also include at least one input device 1028 coupled to I/O controller 1020 via an input interface 1030. Input device 1028 generally represents any type or form of input device capable of providing input, either computer or human generated, to example computing system 1010. Examples of input device 1028 include, without limitation, a keyboard, a pointing device, a speech recognition device, variations or combinations of one or more of the same, and/or any other input device.

Additionally or alternatively, example computing system 1010 may include additional I/O devices. For example, example computing system 1010 may include I/O device 1036. In this example, I/O device 1036 may include and/or represent a user interface that facilitates human interaction with computing system 1010. Examples of I/O device 1036 include, without limitation, a computer mouse, a keyboard, a monitor, a printer, a modem, a camera, a scanner, a microphone, a touchscreen device, variations or combinations of one or more of the same, and/or any other I/O device.

Communication interface 1022 broadly represents any type or form of communication device or adapter capable of facilitating communication between example computing system 1010 and one or more additional devices. For example, in certain embodiments communication interface 1022 may facilitate communication between computing system 1010 and a private or public network including additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1022 may also allow computing system 1010 to engage in distributed or remote computing. For example, communication interface 1022 may receive instructions from a remote device or send instructions to a remote device for execution.

In some examples, system memory 1016 may store and/or load a network communication program 1038 for execution by processor 1014. In one example, network communication program 1038 may include and/or represent software that enables computing system 1010 to establish a network connection 1042 with another computing system (not illustrated in FIG. 12) and/or communicate with the other computing system by way of communication interface 1022. In this example, network communication program 1038 may direct the flow of outgoing traffic that is sent to the other computing system via network connection 1042. Additionally or alternatively, network communication program 1038 may direct the processing of incoming traffic that is received from the other computing system via network connection 1042 in connection with processor 1014.

Although not illustrated in this way in FIG. 12, network communication program 1038 may alternatively be stored and/or loaded in communication interface 1022. For example, network communication program 1038 may include and/or represent at least a portion of software and/or firmware that is executed by a processor and/or Application Specific Integrated Circuit (ASIC) incorporated in communication interface 1022.

As illustrated in FIG. 12, example computing system 1010 may also include a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a solid state drive, a floppy disk drive, a magnetic tape drive, an optical disk drive, a flash drive, or the like. Storage interface 1034 generally represents any type or form of interface or device for transferring data between storage devices 1032 and 1033 and other components of computing system 1010. In one example, additional elements 220 from FIG. 2 may be stored and/or loaded in primary storage device 1032.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also include other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

Many other devices or subsystems may be connected to computing system 1010. Conversely, all of the components and devices illustrated in FIG. 12 need not be present to practice the embodiments described and/or illustrated herein. The devices and subsystems referenced above may also be interconnected in different ways from that shown in FIG. 12. Computing system 1010 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1010. All or a portion of the computer program stored on the computer-readable medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 1010 may be configured as an Application Specific Integrated Circuit (ASIC) adapted to implement one or more of the example embodiments disclosed herein.

FIG. 13 is a block diagram of an example network architecture 1100 in which client systems 1110, 1120, and 1130 and servers 1140 and 1145 may be coupled to a network 1150. As detailed above, all or a portion of network architecture 1100 may perform and/or be a means for performing, either alone or in combination with other elements, one or more of the steps disclosed herein (such as one or more of the steps illustrated in FIG. 1 or the other figures herein). All or a portion of network architecture 1100 may also be used to perform and/or be a means for performing other steps and features set forth in the instant disclosure.

Client systems 1110, 1120, and 1130 generally represent any type or form of computing device or system, such as example computing system 1010 in FIG. 12. Similarly, servers 1140 and 1145 generally represent computing devices or systems, such as application servers or database servers, configured to provide various database services and/or run certain software applications. Network 1150 generally represents any telecommunication or computer network including, for example, an intranet, a WAN, a LAN, a PAN, or the Internet. In one example, client systems 1110, 1120, and/or 1130 and/or servers 1140 and/or 1145 may include all or a portion of system 200 from FIG. 2.

As illustrated in FIG. 13, one or more storage devices 1160(1)-(N) may be directly attached to server 1140. Similarly, one or more storage devices 1170(1)-(N) may be directly attached to server 1145. Storage devices 1160(1)-(N) and storage devices 1170(1)-(N) generally represent any type or form of storage device or medium capable of storing data and/or other computer-readable instructions. In certain embodiments, storage devices 1160(1)-(N) and storage devices 1170(1)-(N) may represent Network-Attached Storage (NAS) devices configured to communicate with servers 1140 and 1145 using various protocols, such as Network File System (NFS), Server Message Block (SMB), or Common Internet File System (CIFS).

Servers 1140 and 1145 may also be connected to a Storage Area Network (SAN) fabric 1180. SAN fabric 1180 generally represents any type or form of computer network or architecture capable of facilitating communication between a plurality of storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170(1)-(N), storage devices 1190(1)-(N) and intelligent storage array 1195 generally represent any type or form of storage device or medium capable of storing data and/or other computer-readable instructions.

In certain embodiments, and with reference to example computing system 1010 of FIG. 12, a communication interface, such as communication interface 1022 in FIG. 12, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1160(1)-(N), storage devices 1170(1)-(N), storage devices 1190(1)-(N), or intelligent storage array 1195. Although FIG. 13 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 1140, server 1145, storage devices 1160(1)-(N), storage devices 1170(1)-(N), storage devices 1190(1)-(N), intelligent storage array 1195, or any combination thereof. All or a portion of one or more of the example embodiments disclosed herein may also be encoded as a computer program, stored in server 1140, run by server 1145, and distributed to client systems 1110, 1120, and 1130 over network 1150.

As detailed above, computing system 1010 and/or one or more components of network architecture 1100 may perform and/or be a means for performing, either alone or in combination with other elements, one or more steps of an example method for virtual care.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 200 in FIG. 2 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 200 in FIG. 2 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 200 in FIG. 2 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 200 in FIG. 2 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 200 in FIG. 2 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 200 in FIG. 2 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

It will be understood that although the terms "first," "second," "third", etc. may be used herein to describe various layers, elements, components, regions or sections without referring to any particular order or sequence of events. These terms are merely used to distinguish one layer, element, component, region or section from another layer, element, component, region or section. A first layer, element, component, region or section as described herein could be referred to as a second layer, element, component, region or section without departing from the teachings of the present disclosure.

As used herein, the term "or" is used inclusively to refer items in the alternative and in combination.

As used herein, characters such as numerals refer to like elements.

The present disclosure includes the following numbered clauses.

Clause 1. A system for modeling dental articulation of a patient, the system comprising: a processor in electronic communication with an extraoral imaging device and an intraoral imaging device; and non-transitory computer readable medium having instructions stored thereon that when executed by the processor cause the system to: capture extraoral 2D images of the patient's dentition in a plurality of occlusion positions with the extraoral imaging device; capture a 3D model of the patient's dentition; align the 3D model of the patient's dentition with the patient's dentition in the extraoral 2D images for each of the plurality of occlusion positions; and derive digital articulator settings for a digital articulator based on the 3D model of the patient's dentition with the patient's dentition in the extraoral 2D images for each of the plurality of occlusion positions.

Clause 2. The system of clause 1, further comprising instructions to segment the patient's dentition in the extraoral 2D images.

Clause 3. The system of any one of the preceding clauses, further comprising instructions to extract 2D dental features from the segmented extraoral 2D images of the patient's dentition.

Clause 4. The system of any one of the preceding clauses, wherein the 2D dental features are one or more of tooth location, tooth outline, gingival line, and tooth centers.

Clause 5. The system of any one of the preceding clauses, further comprising instructions to segment the 3D model of the patient's dentition.

Clause 6. The system of any one of the preceding clauses, further comprising instructions to extract 3D dental features from the segmented 3D model of the patient's dentition.

Clause 7. The system of any one of the preceding clauses, wherein the 3D dental features are one or more of tooth location, tooth outline, gingival line, and tooth centers.

Clause 8. The system of any one of the preceding clauses, wherein the instructions to align the 3D model of the patient's dentition with the patient's dentition in the extraoral 2D images for each of the plurality of occlusion positions include instructions to align the 3D dental features with the 2D dental features.

Clause 9. The system of clause 8, wherein the instructions further cause the system to determine whether the alignment of the 3D dental features with the 2D dental features is within a threshold of alignment.

Clause 10. The system of clause 9, wherein the instructions further cause the system to repeatedly: adjust the 3D features; attempt to align the 3D features with the 2D features; and determine whether the alignment of the 3D dental features with the 2D dental features is within a threshold of alignment.

Clause 11. The system of clause 10, wherein the instructions to adjust the 3D features includes instructions to: adjust a 2D projection of the 3D features.

Clause 12. The system of clause 11, wherein the instruction to adjust a 2D projection of the 3D features includes instructions to: adjust a focal length, virtual camera distance, or lens distortion of the 2D projection of the 3D features.

Clause 13. The system of any one of the preceding clauses, further comprising instructions to: interpolate jaw movement between the plurality of occlusion positions.

Clause 14. The system of any one of the preceding clauses, wherein the instructions to interpolate jaw movement between the plurality of occlusion positions accounts for contact between teeth of the upper arch and teeth of the lower arch.

Clause 15. The system of any one of the preceding clauses, wherein the occlusion positions include occlusions positions wherein the lower jaw is in a neutral bite, a lateral right bite, a lateral left bite, a retraction bite, and a protrusion bite.

Clause 16. The system of clause 15, wherein the occlusion positions include on open bite.

Clause 17. The system of any one of the preceding clauses, wherein the extraoral 2D images of the patient's dentition are 2D still images in each of the occlusion positions.

Clause 18. The system of any one of the preceding clauses, wherein the extraoral 2D images of the patient's dentition extraoral 2D images of the patient's dentition includes a video as the patient moves their lower jaw between and to each of the occlusion positions.

Clause 19. The system of any one of the preceding clauses, wherein the extraoral 2D images of the patient's dentition includes 2D still images from multiple camera angles in each of the occlusion positions.

Clause 20. The system of any one of the preceding clauses, wherein the extraoral 2D images of the patient's dentition includes 2D video from multiple camera angles as the patient moves their lower jaw between and to each of the occlusion positions.

Clause 21. A system for modeling dental articulation of a patient, the system comprising: a processor in electronic communication with an extraoral imaging device and an intraoral imaging device; and non-transitory computer readable medium having instructions stored thereon that when executed by the processor cause the system to: capture 3D data of the patient's face in with the extraoral imaging device; capture a 3D model of the patient's dentition; align the 3D model of the patient's dentition with 3D data of the patient's face; and generate an estimate of the temporomandibular joint characteristics based on the 3D model of the patient's face; and derive digital articulator settings for a digital articulator based on the 3D model of the patient's dentition with the 3D data of the patient's face and the estimate of the temporomandibular joint characteristics.

Clause 22. The system of clause 21, wherein the 3D data of the patient's face includes 3D data of the patient's face in with a closed bite and open lips.

Clause 23. The system of clause 22, wherein the 3D data of the patient's face includes 3D data of the patient's face in with an open bite and open lips.

Clause 24. The system of clause 23, wherein the instruction to align the 3D model of the patient's dentition with 3D data of the patient's face includes aligning registering the 3D model of the patient's dentition to the 3D data of the patient's face.

Clause 25. The system of any one of clauses 21-24, further comprising instructions to generate CBCT data for the internal structure of the patient's face and jaw.

Clause 26. The system of clause 25, wherein the instructions to generate the estimate of the temporomandibular joint characteristics based on the 3D model of the patient's face further comprise instructions to include instructions to generate the estimate of the temporomandibular joint characteristics based on the 3D model of the patient's face and the CBCT data.

Clause 27. The system of clause 21, wherein the instructions includes receiving markings on the 3D model of the patient's face of the temporomandibular joint and the condylar position.

Clause 28. The system of clause 27, wherein the instructions to generate the estimate of the temporomandibular joint characteristics based on the 3D model of the patient's face further comprise instructions to include instructions to generate the estimate of the temporomandibular joint characteristics based on the 3D model of the patient's face and the markings of the temporomandibular joint and the condylar position.

Clause 29. The system of clause 21, wherein the 3D data of the patient's face includes 3D data of the patient's face in with a closed bite and open lips.

Clause 30. The system of clause 29, further comprising instructions to capture 2D video of the patient's face as the patient moves their lower jaw.

Clause 31. The system of clause 30, wherein the instructions to generate an estimate of the temporomandibular joint characteristics based on the 3D model of the patient's face include instructions to generate an estimate of the temporomandibular joint characteristics based on the 3D model of the patient's face and the 2D video of the patient's face.

Clause 32. The system of clause 21, wherein the 3D data of the patient's face includes 3D video of the patient's face.

Clause 33. A system for modeling dental articulation of a patient, the method comprising: a non-transitory computer readable medium having instructions stored thereon that when executed by one or more processors cause the one or more processors to perform a method including: receiving extraoral image data of the patient's dentition in a plurality of occlusion positions with the extraoral imaging device; receiving a 3D model of the patient's dentition; aligning the 3D model of the patient's dentition with the patient's dentition in the extraoral images for each of the plurality of occlusion positions; and modeling dynamic occlusion of upper and lower arches of the patient based on the 3D model of the patient's dentition aligned with the patient's dentition in the extraoral images for each of the plurality of occlusion positions.

Clause 34. The system of clause 33, wherein the modeling dynamic occlusion is further based on a model of a digital articulator generated based on occlusal contacts between an upper jaw and lower jaw of the 3D model of the patient's dentition during simulated movement of the lower jaw relative to the upper jaw.

Clause 35. The system of clause 33, wherein the method further comprises: determining a relationship between lower jaw position and the location of external soft tissue of the patient's face; capturing image data of the patient chewing with closed lips; and determining the position of the patient's jaw in the image data of the patient chewing with closed lips based on the relationship between lower jaw position and the location of external soft tissue of the patient's face.

Clause 36. The system of clause 35, wherein the image data of the patient chewing with closed lips is 2D image data.

Clause 37. The system of clause 35, wherein the image data of the patient chewing with closed lips is 3D image data.

Clause 38. The system of clause 33, wherein the method further comprises segmenting the patient's dentition in the extraoral image data.

Clause 39. The system of any one of clauses 33-38, wherein the method further comprises extracting 2D dental features from the segmented extraoral image data of the patient's dentition.

Clause 40. The system of any one of clauses 33-39, wherein the 2D dental features are one or more of tooth location, tooth outline, gingival line, and tooth centers.

Clause 41. The system of any one of clauses 33-40, wherein the method further comprises segmenting the 3D model of the patient's dentition.

Clause 42. The system of any one of clauses 33-41, wherein the method further comprises extracting 3D dental features from the segmented 2D model of the patient's dentition.

Clause 43. The system of any one of clauses 33-42, wherein the 3D dental features are one or more of tooth location, tooth outline, gingival line, and tooth centers.

Clause 44. The system of any one of clauses 33-43, wherein aligning the 3D model of the patient's dentition with the patient's dentition in the extraoral images for each of the plurality of occlusion positions includes aligning the 3D dental features with the 2D dental features.

Clause 45. The system of clause 44, wherein the method further comprises determining whether the alignment of the 3D dental features with the 2D dental features is within a threshold of alignment.

Clause 46. The system of clause 45, wherein the method further comprises repeatedly: adjusting the 3D features; attempting to align the 3D features with the 2D features; and determining whether the alignment of the 3D dental features with the 2D dental features is within a threshold of alignment.

Clause 47. The system of clause 46, wherein adjusting the 3D features includes adjusting a 2D projection of the 3D features.

Clause 48. The system of clause 47, wherein adjusting a 2D projection of the 3D features includes adjusting a focal length, virtual camera distance, or lens distortion of the 2D projection of the 3D features.

Clause 49. The system of any one of the preceding clauses, wherein the method further comprises interpolating jaw movement between the plurality of occlusion positions.

Clause 50. The system of any one of the preceding clauses, wherein interpolating jaw movement between the plurality of occlusion positions accounts for contact between teeth of the upper arch and teeth of the lower arch as the lower jaw moves relative to the upper jaw between the occlusion positions.

Clause 51. The system of any one of the preceding clauses, wherein the occlusion positions include occlusions positions wherein the lower jaw is in a neutral bite, a lateral right bite, a lateral left bite, a retraction bite, and a protrusion bite.

Clause 52. The system of clause 51, wherein the occlusion positions include on open bite.

Clause 53. The system of any one of the preceding clauses, wherein the extraoral image data of the patient's dentition are 2D still images in each of the occlusion positions.

Clause 54. The system of any one of the preceding clauses, wherein the extraoral images of the patient's dentition extraoral image data of the patient's dentition includes a video as the patient moves their lower jaw between and to each of the occlusion positions.

Clause 55. The system of any one of the preceding clauses, wherein the extraoral image data of the patient's dentition includes 2D still images from multiple camera angles in each of the occlusion positions.

Clause 56. The system of any one of the preceding clauses, wherein the extraoral image data of the patient's dentition includes 2D video from multiple camera angles as the patient moves their lower jaw between and to each of the occlusion positions.

Clause 57. A method for modeling dental articulation of a patient, the method comprising: capturing 3D data of the patient's face in with the extraoral imaging device; capturing a 3D model of the patient's dentition; aligning the 3D model of the patient's dentition with 3D data of the patient's face; and generating an estimate of the temporomandibular joint characteristics based on the 3D model of the patient's face; and deriving digital articulator settings for a digital articulator based on the 3D model of the patient's dentition with the 3D data of the patient's face and the estimate of the temporomandibular joint characteristics.

Clause 58. The method of clause 57, wherein the 3D data of the patient's face includes 3D data of the patient's face in with a closed bite and open lips.

Clause 59. The system of clause 58, wherein the 3D data of the patient's face includes 3D data of the patient's face in with an open bite and open lips.

Clause 60. The system of clause 59, wherein the instruction to align the 3D model of the patient's dentition with 3D data of the patient's face includes aligning registering the 3D model of the patient's dentition to the 3D data of the patient's face.

Clause 61. The system of any one of clauses 57-60, further comprising instructions to generate CBCT data for the internal structure of the patient's face and jaw.

Clause 62. The system of clause 61, wherein the instructions to generate the estimate of the temporomandibular joint characteristics based on the 3D model of the patient's face further comprise instructions to include instructions to generate the estimate of the temporomandibular joint characteristics based on the 3D model of the patient's face and the CBCT data.

Clause 63. The system of clause 57, wherein the instructions includes receiving markings on the 3D model of the patient's face of the temporomandibular joint and the condylar position.

Clause 64. The system of clause 63, wherein the instructions to generate the estimate of the temporomandibular joint characteristics based on the 3D model of the patient's face further comprise instructions to include instructions to generate the estimate of the temporomandibular joint characteristics based on the 3D model of the patient's face and the markings of the temporomandibular joint and the condylar position.

Clause 65. The system of clause 57, wherein the 3D data of the patient's face includes 3D data of the patient's face in with a closed bite and open lips.

Clause 66. The system of clause 65, further comprising instructions to capture 2D video of the patient's face as the patient moves their lower jaw.

Clause 67. The system of clause 66, wherein the instructions to generate an estimate of the temporomandibular joint characteristics based on the 3D model of the patient's face include instructions to generate an estimate of the temporomandibular joint characteristics based on the 3D model of the patient's face and the 2D video of the patient's face.

Clause 68. The system of clause 57, wherein the 3D data of the patient's face includes 3D video of the patient's face.

Clause 69. A method comprising: obtaining a first 3D model of an upper jaw of a patient using an intraoral scanner; obtaining a second 3D model of the lower jaw of the patient using the intraoral scanner; capturing a series of 2D images of the upper and lower jaws of the patient as the patient is moves the upper jaw and lower jaw in dynamic occlusion an imaging device; processing the captured series of 2D images to identify features associated with the upper jaw of the patient and the lower jaw of the patient; for each 2D image in the captured series of 2D images, identifying a relative position of the first 3D model and the second 3D model based on alignment of features in the first 3D model and second 3D model with the features identified in the 2D image in order to generate a series of relative positions of the first 3D model and the second 3D model; and modeling dynamic occlusion of the upper jaw and the lower jaw of the patient based on the series of relative positions of the first 3D model and the second 3D model.

Clause 70. The method of clause 69, wherein the series of 2D images comprise near-infrared images.

Clause 71. The method of clause 69, wherein the series of 2D images comprise white light images.

Clause 72. The method of clause 69, wherein the series of 2D images comprise fluorescence light images.

Clause 73. The method of clause 69, wherein the intraoral scanner comprises multiple cameras for capturing the jaw of the patient from different angles and wherein capturing the series of 2D images of the jaw of the patient comprises capturing a plurality of 2D images using the multiple cameras of the intraoral scanner.

Clause 74. The method of clause 69, wherein the features are anatomical features.

Clause 75. The method of clause 74, wherein the anatomical features are gingival tissue.

Clause 76. The method of clause 6, wherein the anatomical features are one or more apex of interdental papillia.

Clause 77. The method of clause 74, wherein the anatomical features are tooth surfaces.

Clause 78. The method of clause 74, wherein the features are subsurface features.

Clause 79. The method of clause 78, wherein the subsurface features are blood vessels.

Clause 80. The method of clause 69, wherein the features are artificial features.

Clause 81. The method of clause 80, wherein the artificial features are targets affixed to the patient's dentition.

Clause 82. The method of clause 81, wherein the targets are affixed with adhesive or suction.

Clause 83. The method of clause 80, wherein the artificial features are tooth stains.

Clause 84. The method of clause 81, wherein the stains are stained plaque, caries, or demineralized locations of the teeth.

Clause 85. The method of clause 69, wherein the captured series of 2D images includes images captured simultaneously from multiple locations.

Clause 86. The method of clause 85, wherein processing the captured series of 2D images to identify features includes processing the images simultaneously from multiple locations.

Clause 87. The method of clause 69, wherein capturing the series of 2D images comprises capturing images using multiple modalities and wherein the features are identified and their locations determined in the different modalities.

Clause 88. The method of clause 69, wherein the captured series of 2D images to identify features includes captured images of repeated motion of the patient's teeth and wherein processing, includes determining an average trajectory of motion of the patient's teeth based on determined locations of the patient's jaws.

Clause 89. The method of clause 69, wherein the imaging device is an extraoral imaging device.

Clause 90. The method of clause 69, wherein the imaging device is an intraoral scanner.

Clause 91. The method of clause 69, wherein processing includes: (a) determining a camera position of the 2D image; (b) determine positions of the teeth of the upper and lower jaws based on the camera position; (c) determining a difference in positions of the teeth of the upper and lower jaws based on the camera position to positions of teeth in a 3D model of the upper and lower jaws; (d) updating the camera position of the 2D model; and (e) repeating (a) through (d) until the difference is less than a threshold.

Clause 92. A system comprising: a processor; and non-transitory computer readable medium comprising instructions that when executed by the processor cause the system to carry out the method of any one of clauses 69-91.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. An intraoral scanning system for modeling dental articulation of a patient, the method comprising:
    an intraoral scanner;
    one or more processors configured to be in communication with the intraoral scanner; and
    a non-transitory computer readable medium having instructions stored thereon that when executed by the one or more processors cause the one or more processors to perform a method including:
    receiving 2D extraoral image data of the patient's dentition in a plurality of occlusion positions;
    receiving a 3D model of the patient's dentition;
    aligning the 3D model of the patient's dentition with the patient's dentition in the extraoral 2D image data for each of the plurality of occlusion positions;
    determining a relationship between lower jaw position and the location of external soft tissue of the patient's face;
    capturing image data of the patient chewing with closed lips;
    determining the position of the patient's lower jaw in the image data of the patient chewing with closed lips based on the relationship between lower jaw position and the location of external soft tissue of the patient's face; and
    modeling dynamic occlusion of upper and lower arches of the patient based on the 3D model of the patient's dentition aligned with the patient's dentition in the extraoral 2D image data for each of the plurality of occlusion positions.

2. The system of claim 1, wherein modeling dynamic occlusion is further based on a model of a digital articulator generated based on occlusal contacts between an upper jaw and lower jaw of the 3D model of the patient's dentition during simulated movement of the lower jaw relative to the upper jaw.

3. The system of claim 1, wherein the image data of the patient chewing with closed lips is 2D image data.

4. The system of claim 1, wherein the image data of the patient chewing with closed lips is 3D image data.

5. The system of claim 1, wherein the method further comprises segmenting the patient's dentition in the 2D extraoral image data.

6. The system of claim 5, wherein the method further comprises extracting 2D dental features from the segmented 2D extraoral image data of the patient's dentition.

7. The system of claim 6, wherein the 2D dental features are one or more of tooth location, tooth outline, gingival line, and tooth centers.

8. The system of claim 7, wherein the method further comprises segmenting the 3D model of the patient's dentition.

9. The system of claim 8, wherein the method further comprises extracting 3D dental features from the segmented 2D model of the patient's dentition.

10. The system of claim 9, wherein the 3D dental features are one or more of tooth location, tooth outline, gingival line, and tooth centers.

11. The system of claim 10, wherein aligning the 3D model of the patient's dentition with the patient's dentition in the extraoral 2D image data for each of the plurality of occlusion positions includes aligning the 3D dental features with the 2D dental features.

12. The system of claim 11, wherein the method further comprises determining whether the alignment of the 3D dental features with the 2D dental features is within a threshold of alignment.

13. The system of claim 12, wherein the method further comprises repeatedly:
  adjusting the 3D features;
  attempting to align the 3D features with the 2D dental features; and
  determining whether the alignment of the 3D dental features with the 2D dental features is within a threshold of alignment.

14. The system of claim 13, wherein adjusting the 3D features includes adjusting a 2D projection of the 3D features.

15. The system of claim 14, wherein adjusting a 2D projection of the 3D features includes adjusting a focal length, virtual camera distance, or lens distortion of the 2D projection of the 3D features.

16. The system of claim 15, wherein the method further comprises interpolating jaw movement between the plurality of occlusion positions.

17. The system of claim 16, wherein interpolating jaw movement between the plurality of occlusion positions accounts for contact between teeth of the upper arch and teeth of the lower arch as the lower jaw moves relative to the upper jaw between the occlusion positions.

18. The system of claim 1, wherein the 2D extraoral image data is captured by an intraoral scanner and wherein the 3D data is captured by the intraoral scanner.

19. The system of claim 1, wherein the 2D extraoral image data is captured by an extraoral imaging device.

* * * * *